April 9, 1935.   O. N. TEVANDER   1,997,351
BOTTLE CAPPING MACHINE
Filed Feb. 5, 1935   35 Sheets-Sheet 2
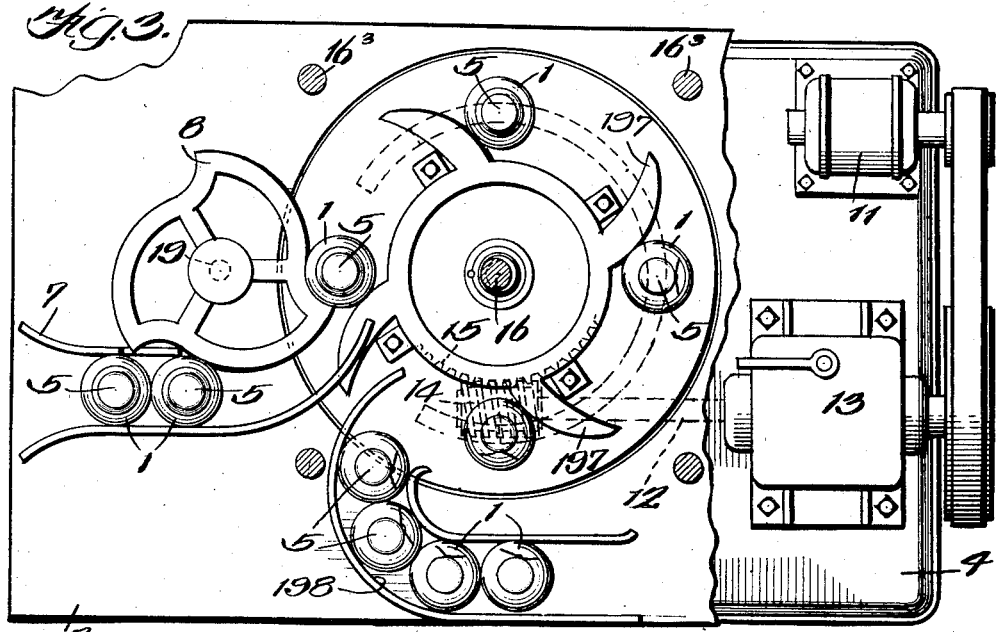
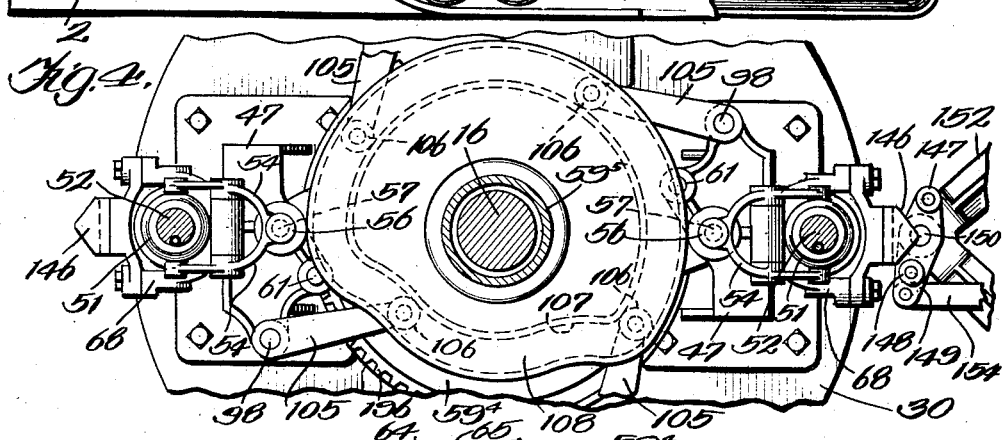
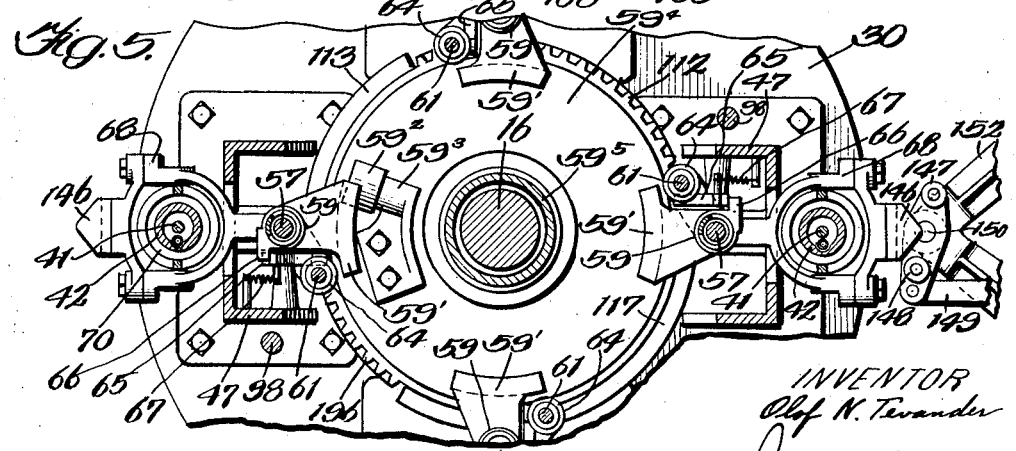

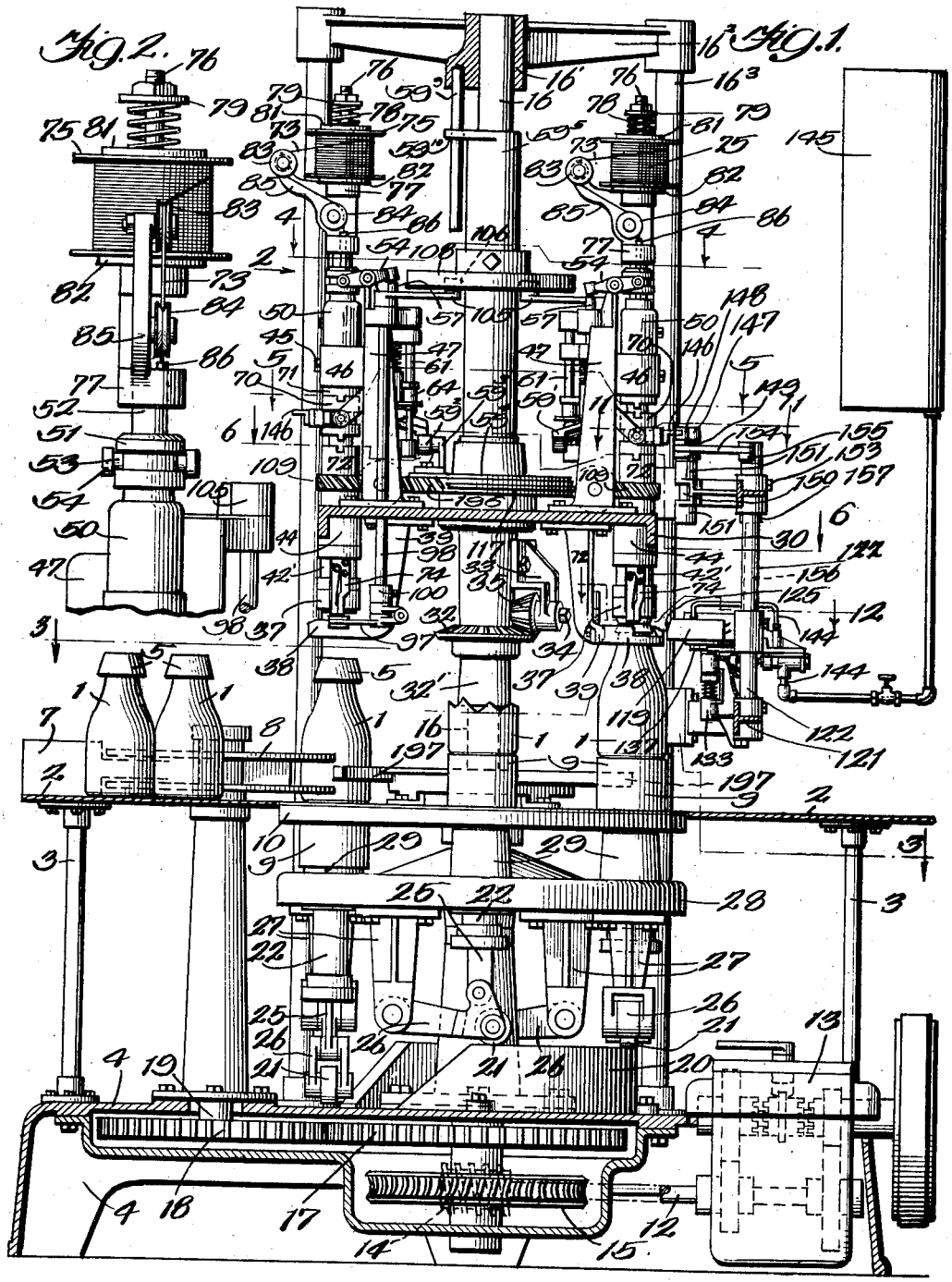

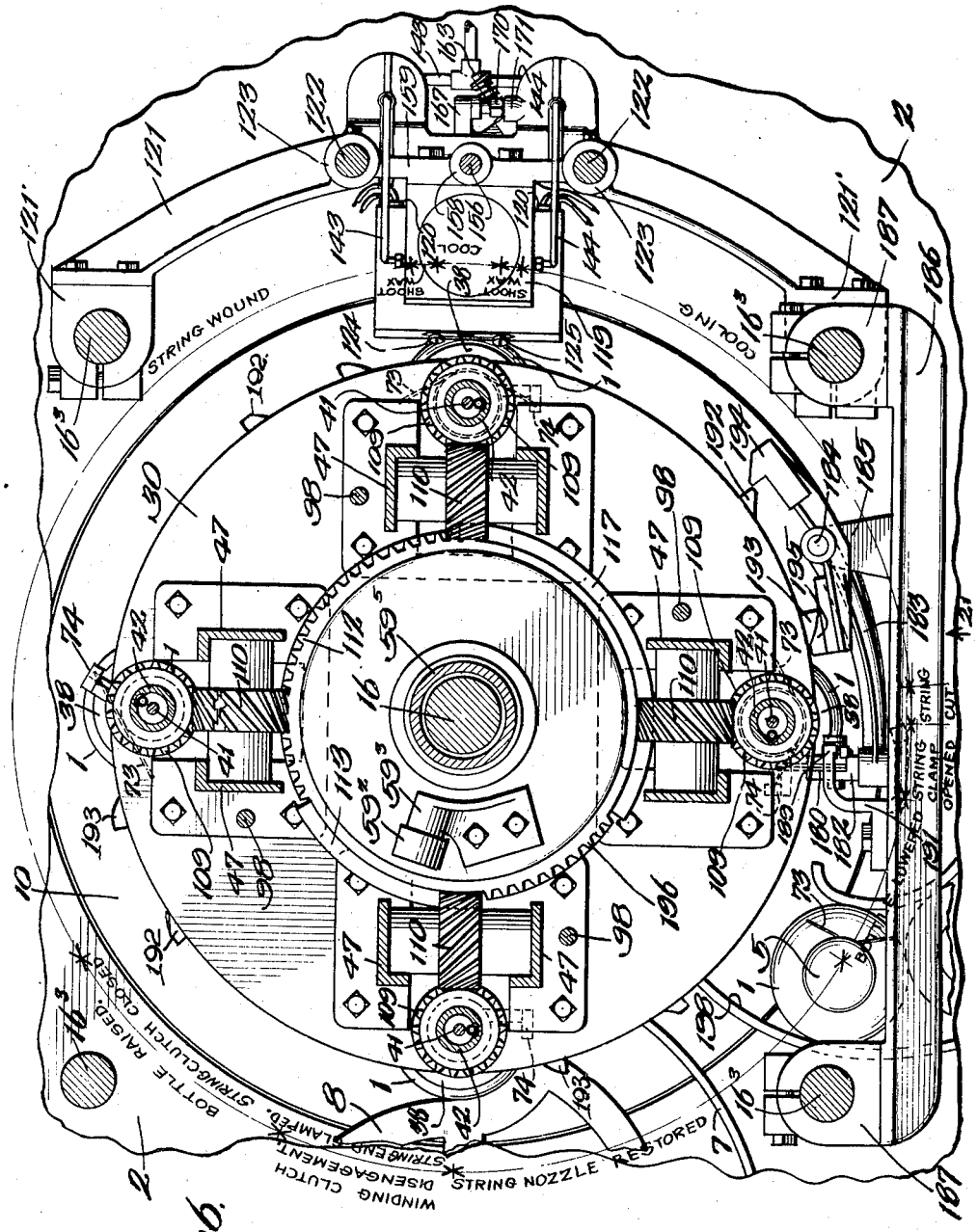

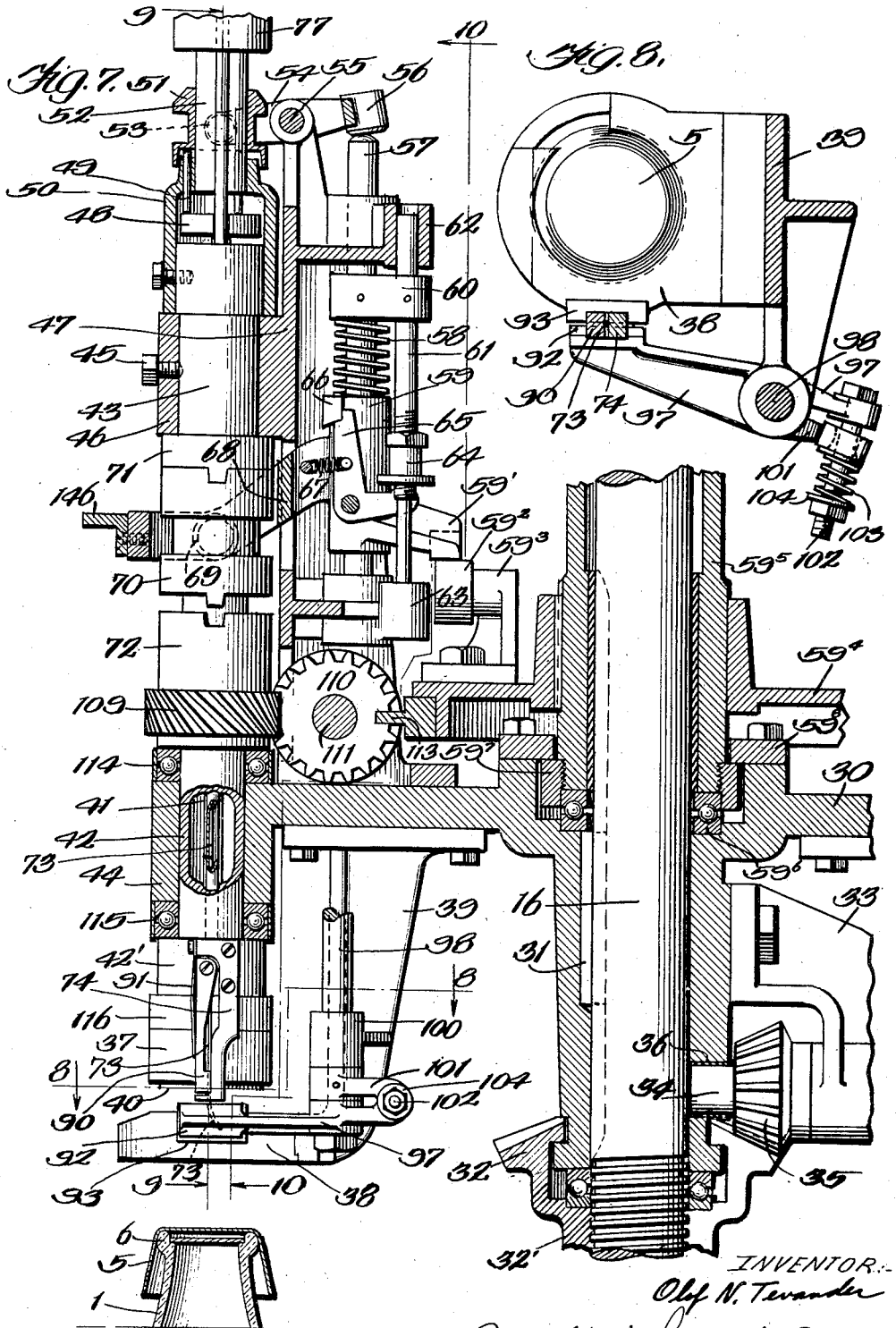

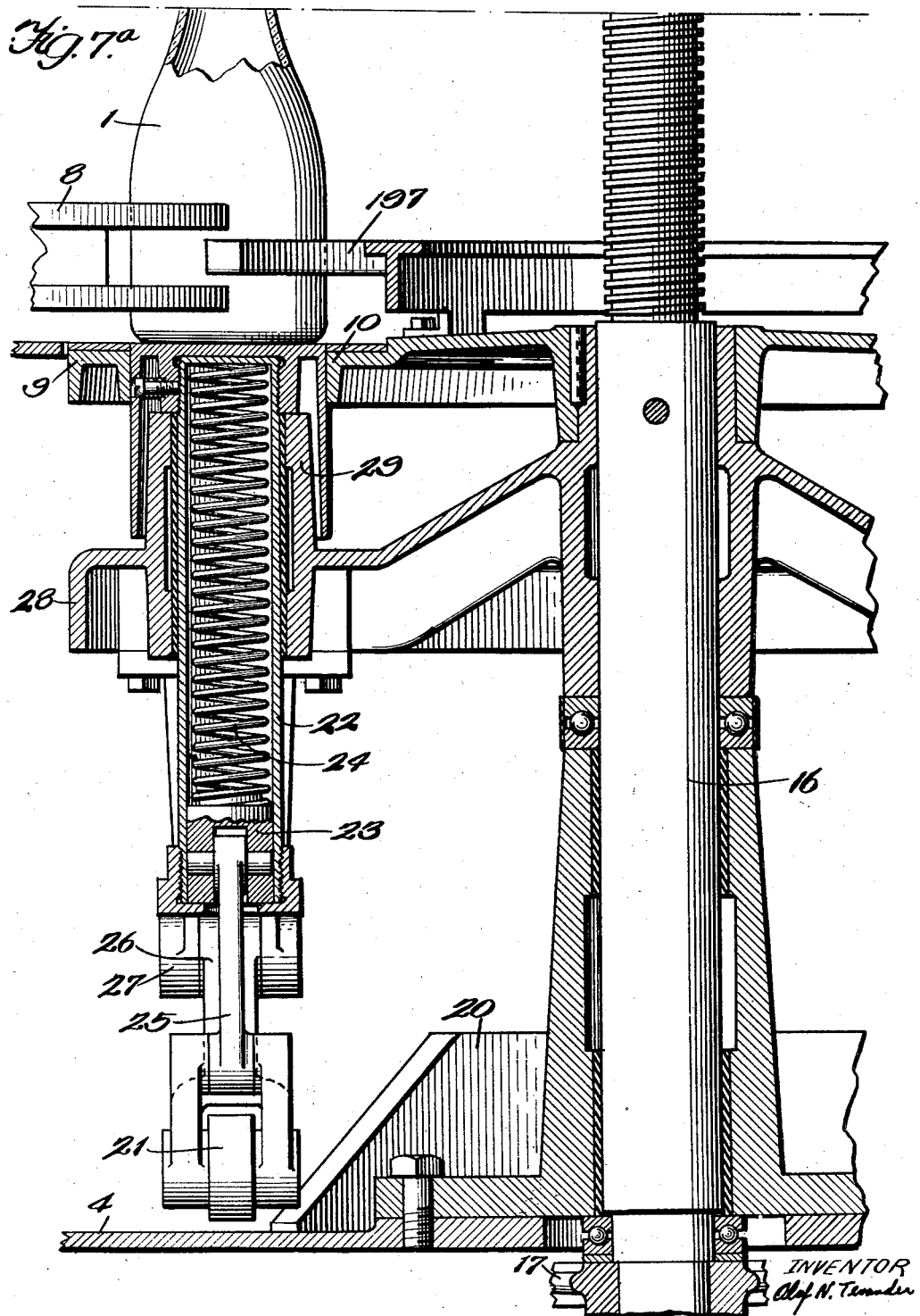

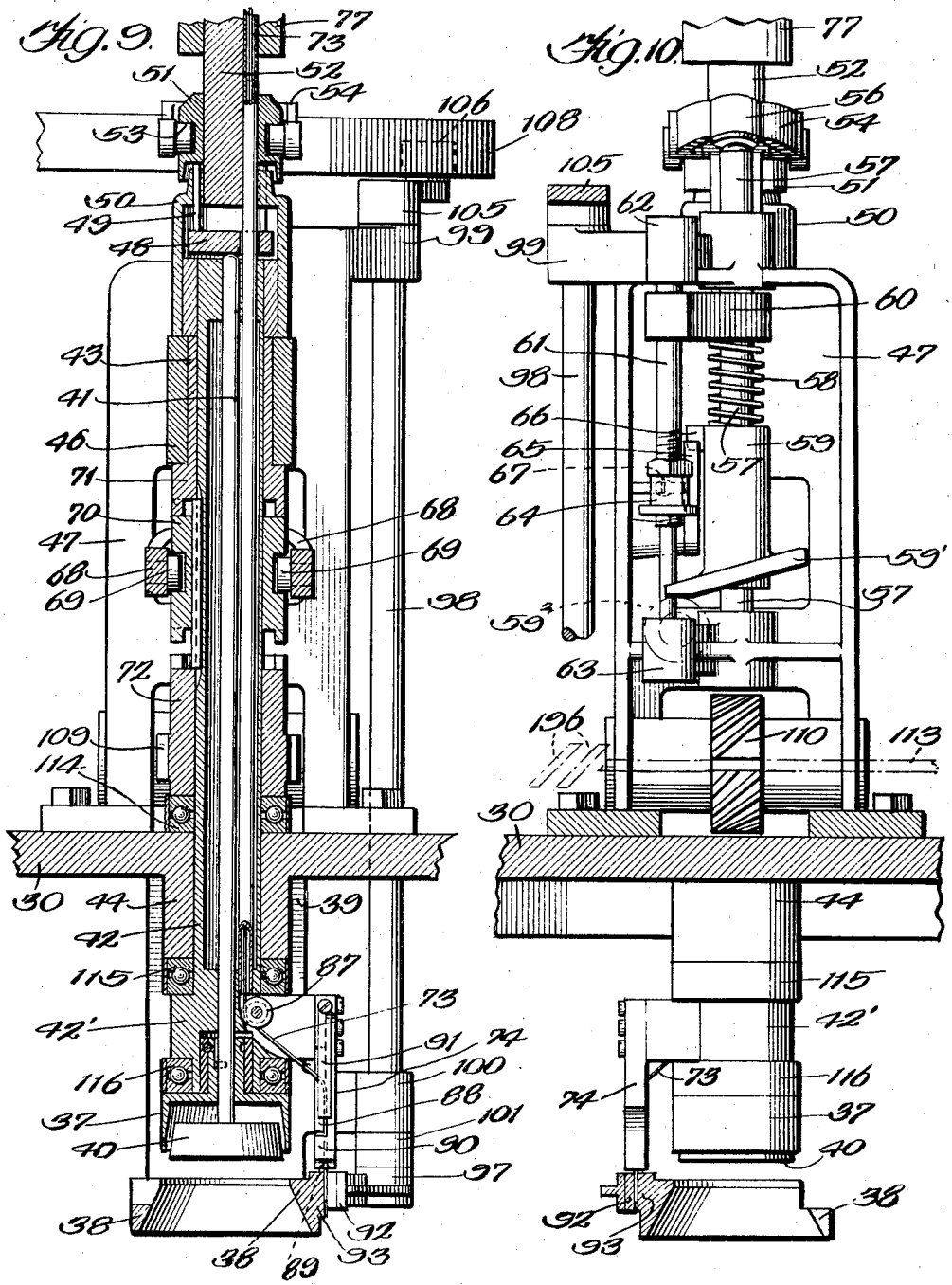

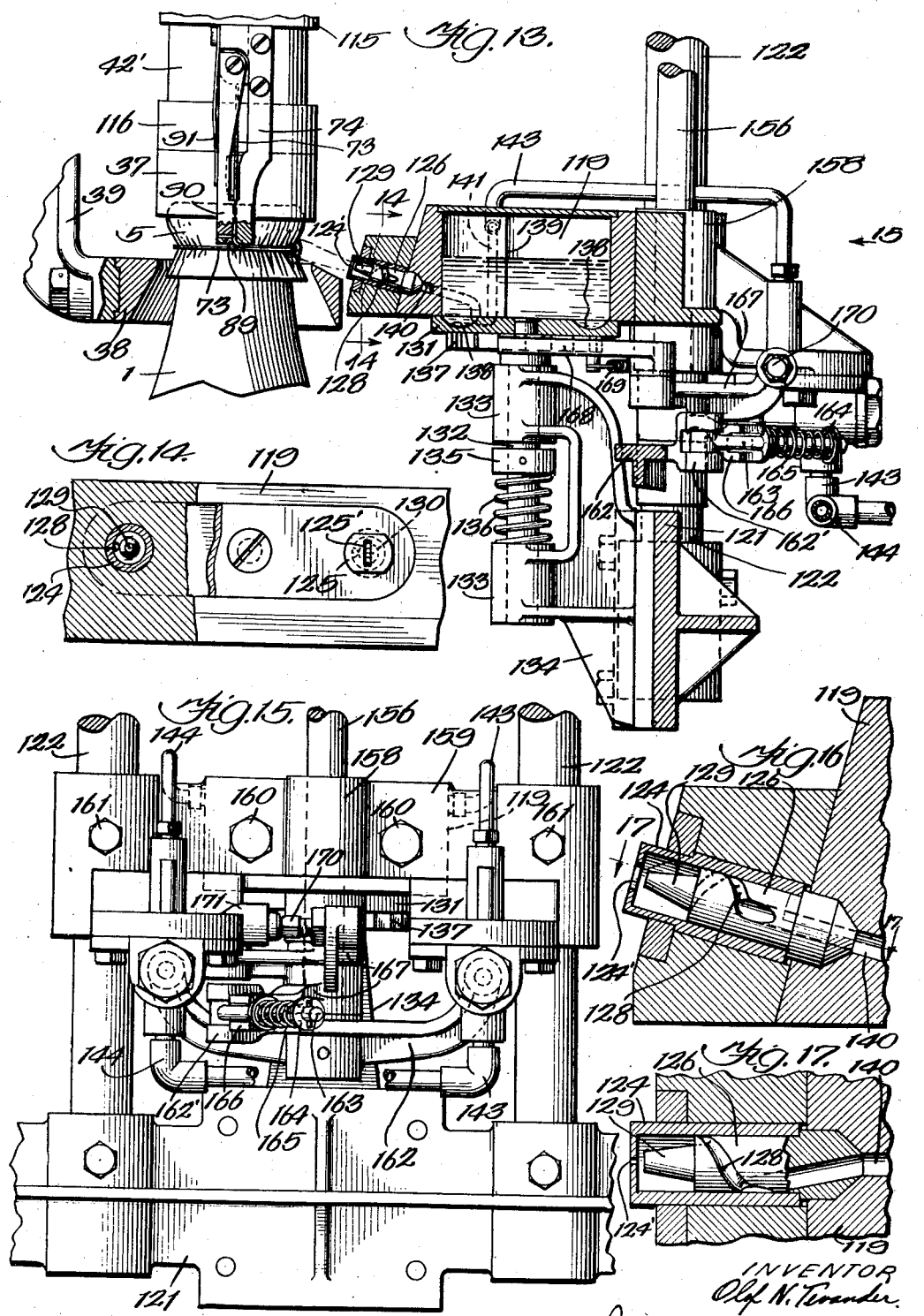

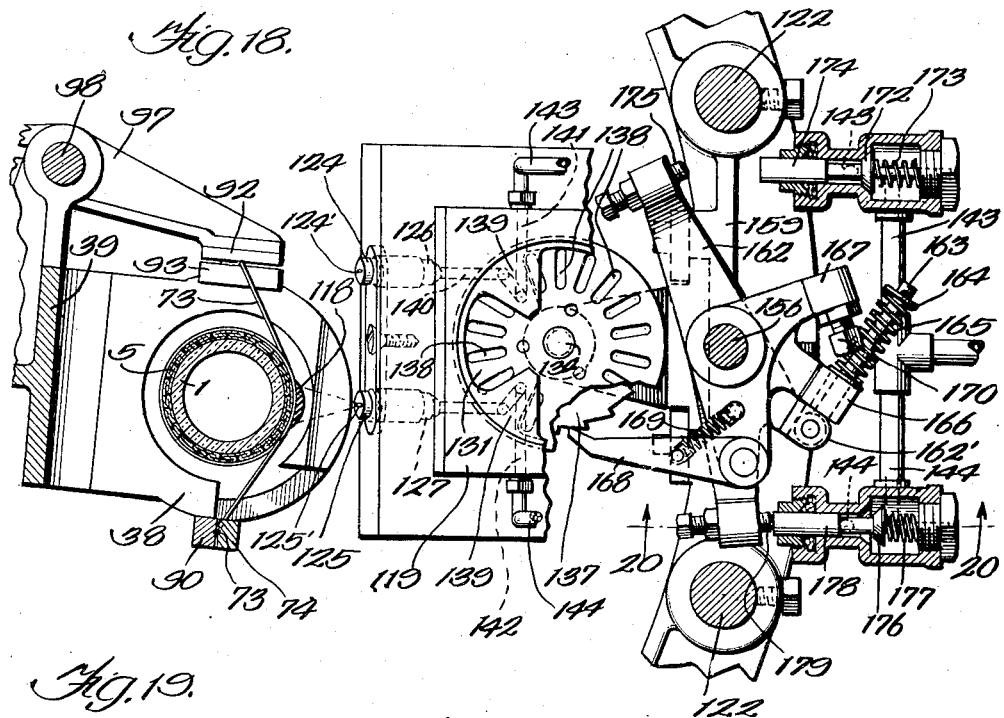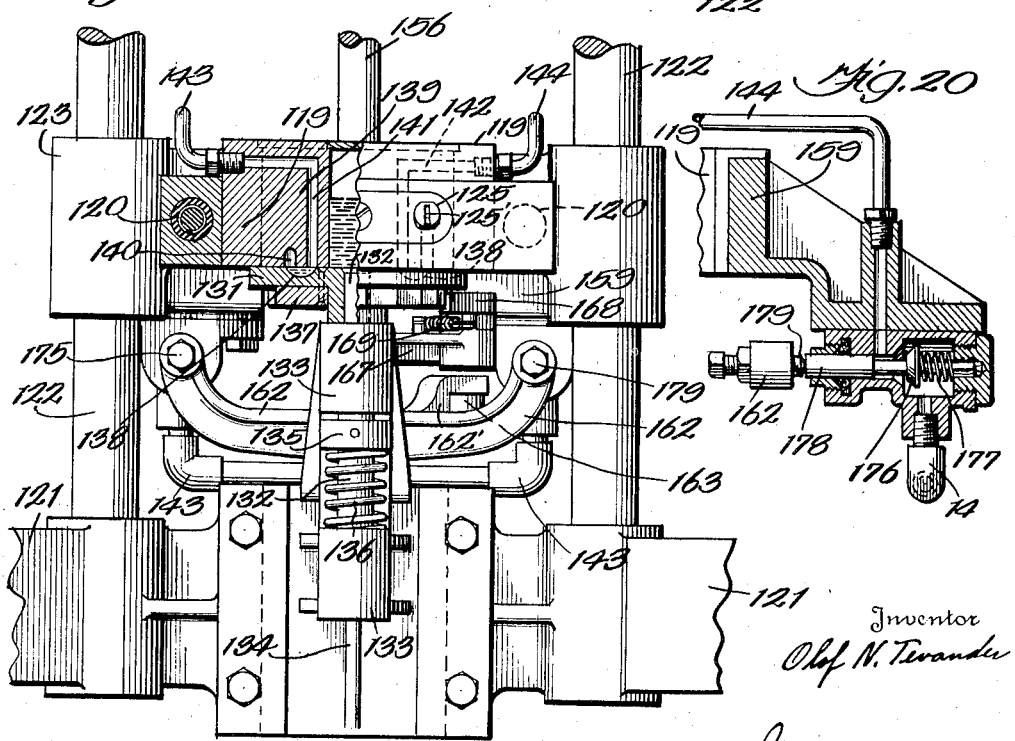

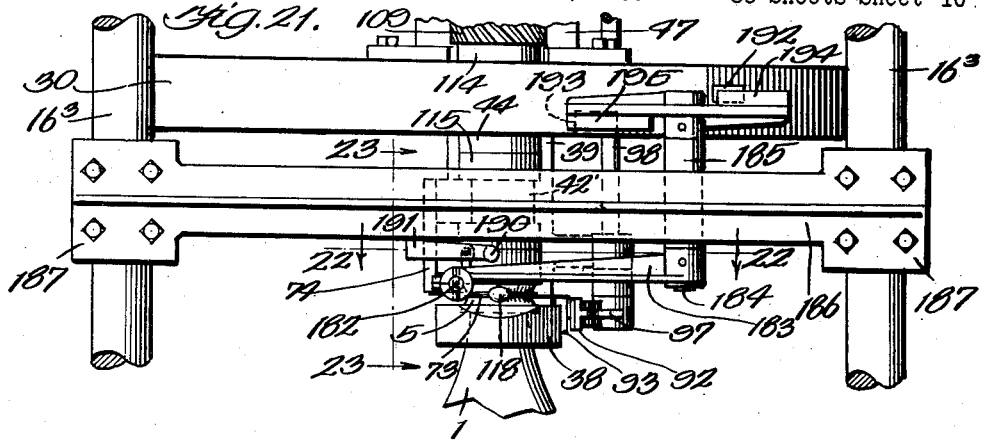

April 9, 1935. O. N. TEVANDER 1,997,351
BOTTLE CAPPING MACHINE
Filed Feb. 5, 1935 35 Sheets-Sheet 11
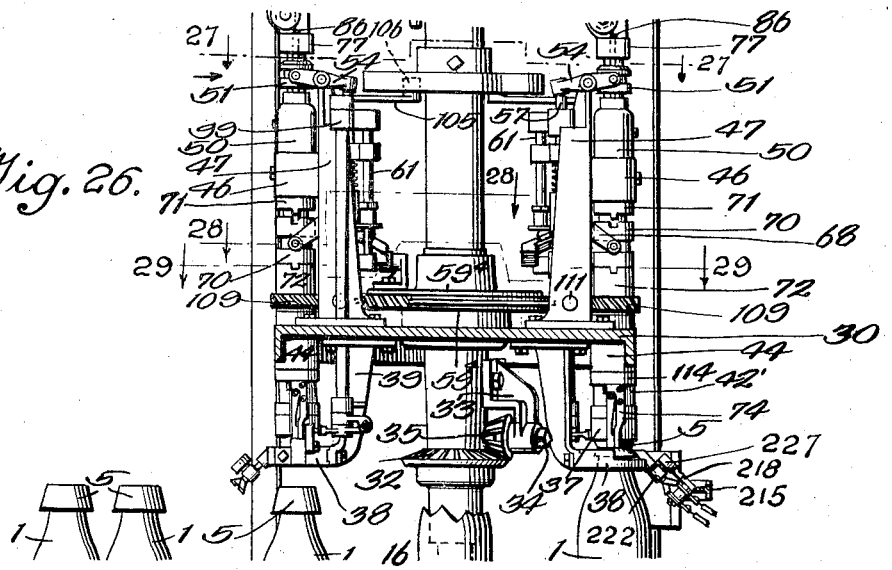
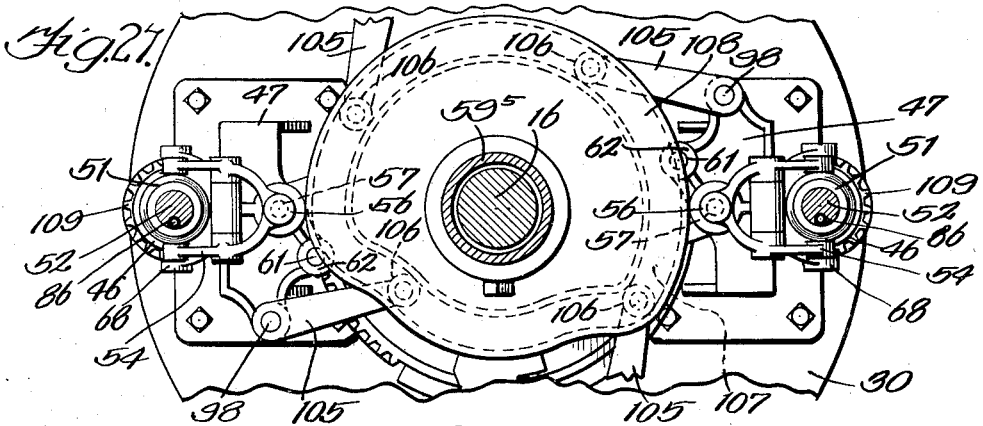
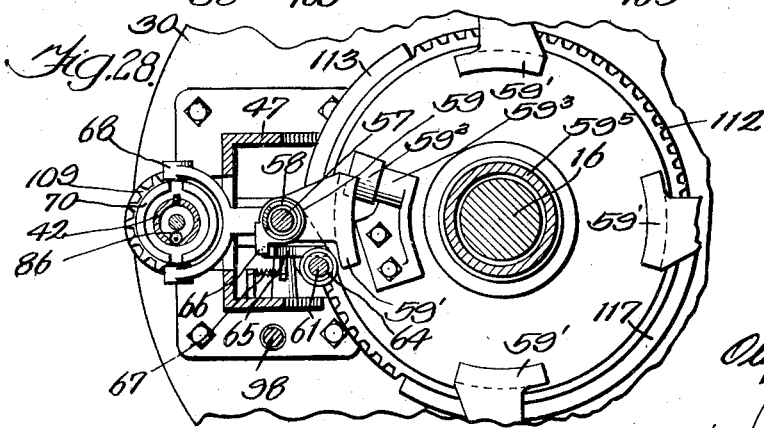

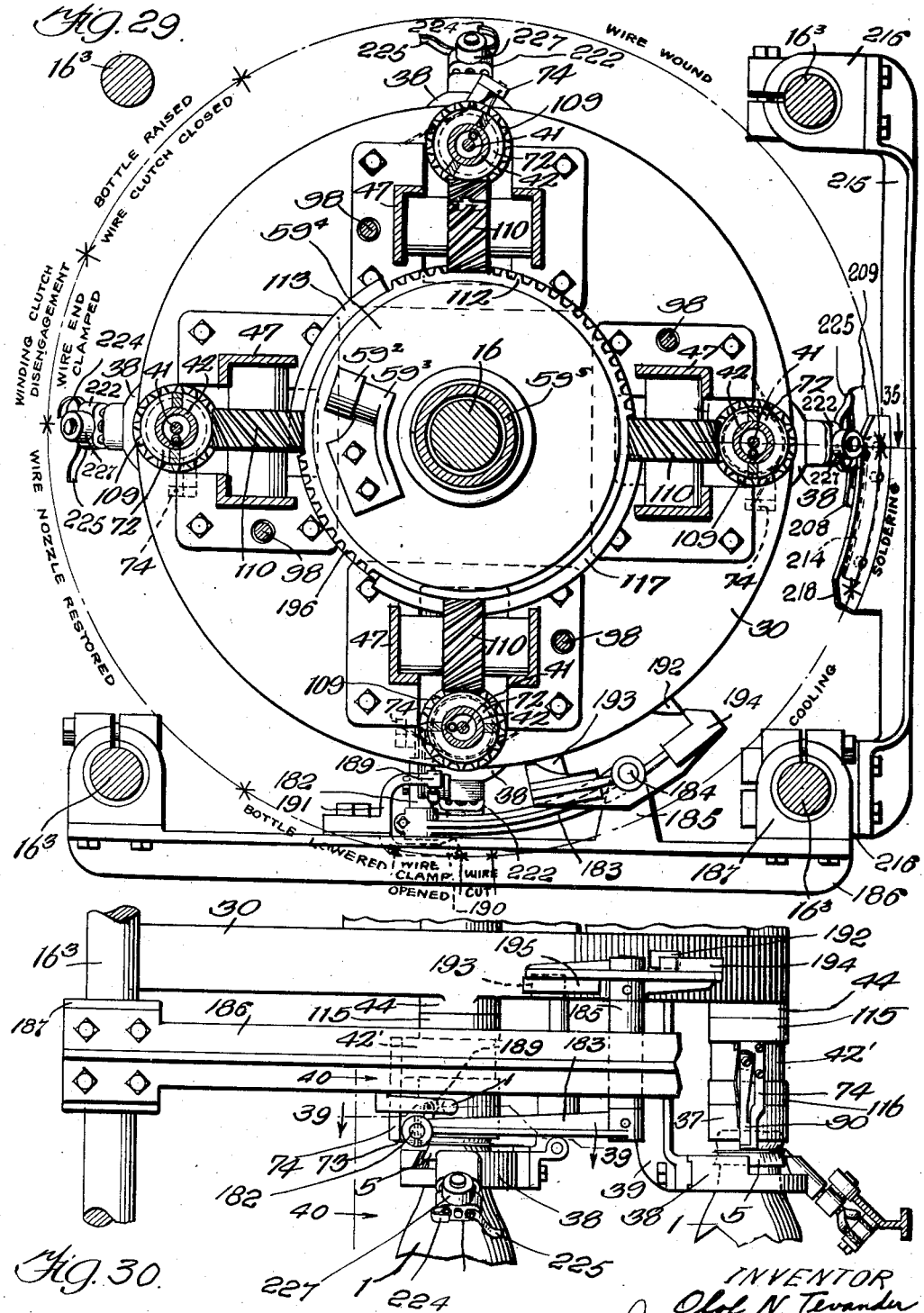

April 9, 1935.  O. N. TEVANDER  1,997,351
BOTTLE CAPPING MACHINE
Filed Feb. 5, 1935   35 Sheets-Sheet 13

Inventor
Olaf N. Tevander
By Braselton Whitcomb Davies
Attorney

April 9, 1935. O. N. TEVANDER 1,997,351
BOTTLE CAPPING MACHINE
Filed Feb. 5, 1935 35 Sheets-Sheet 14
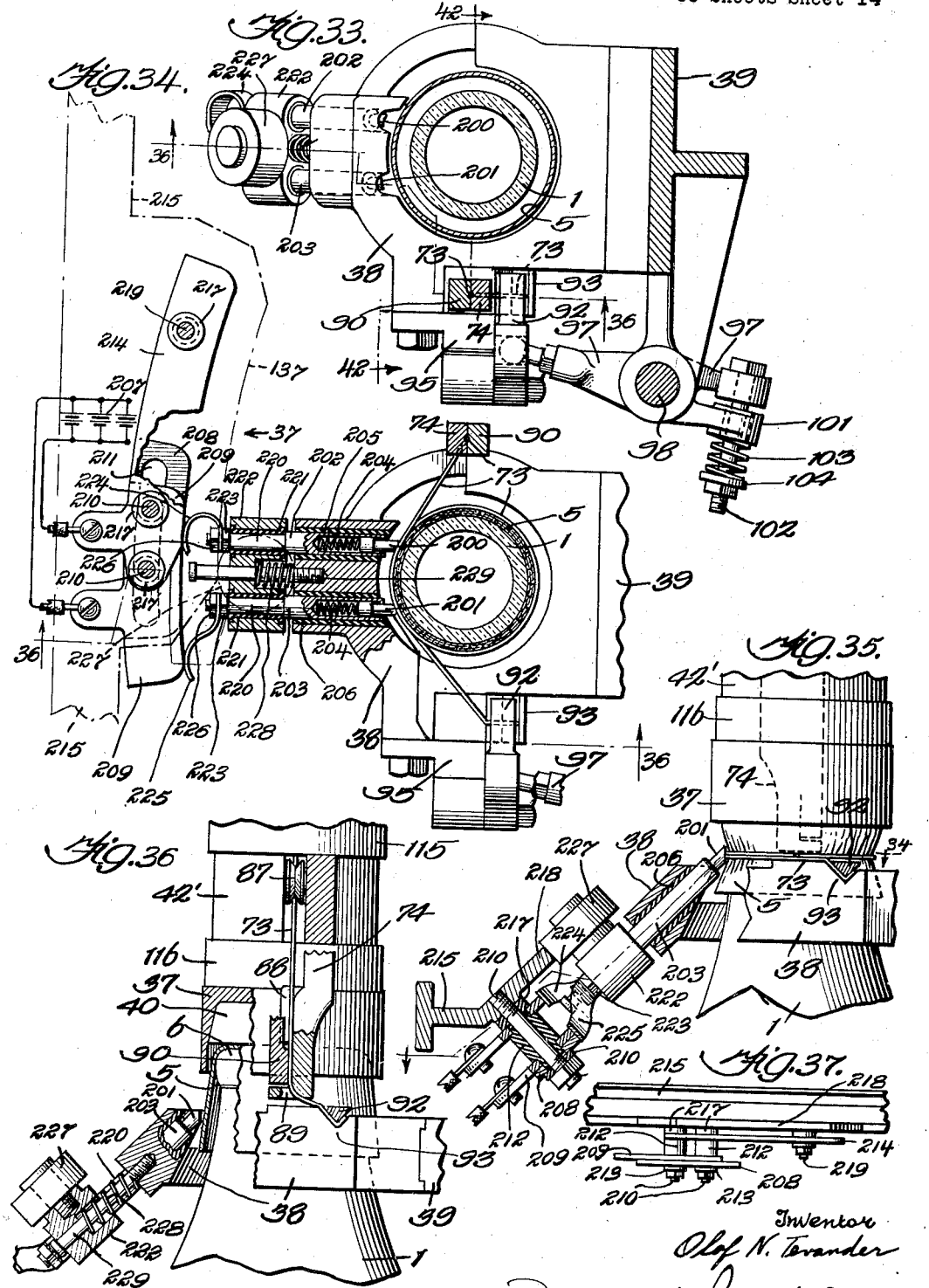

April 9, 1935. O. N. TEVANDER 1,997,351
BOTTLE CAPPING MACHINE
Filed Feb. 5, 1935 35 Sheets-Sheet 15
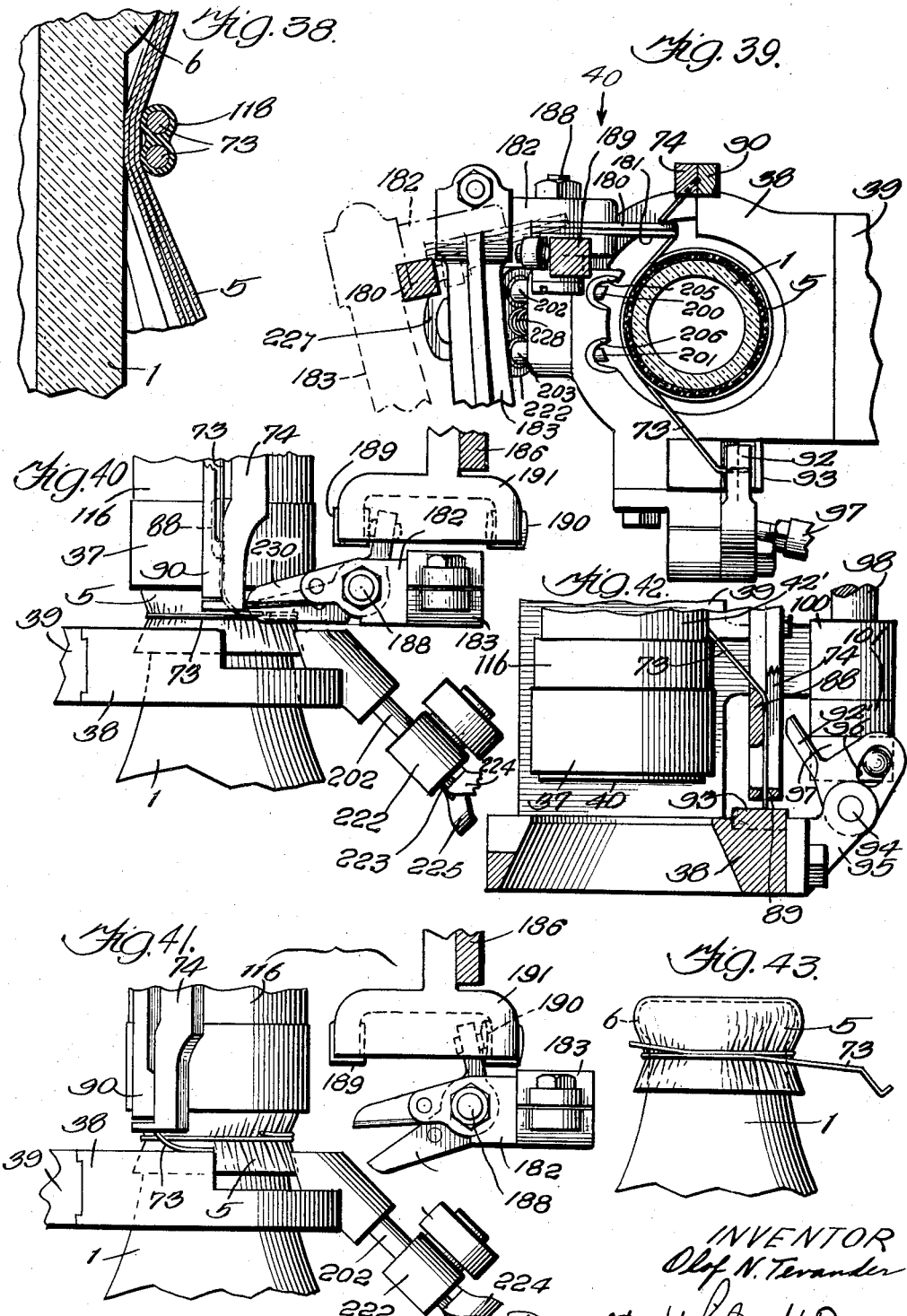

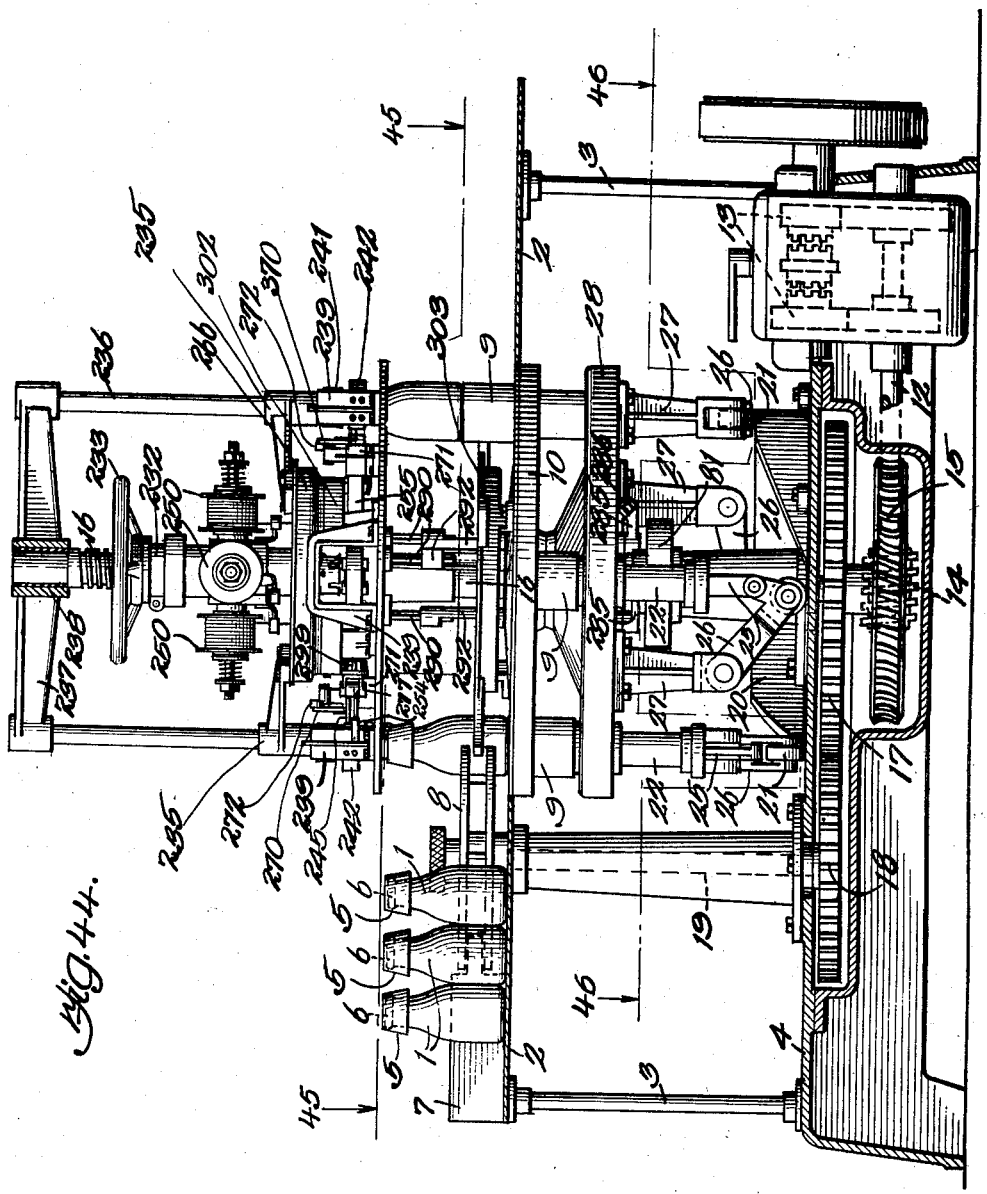

April 9, 1935.  O. N. TEVANDER  1,997,351

BOTTLE CAPPING MACHINE

Filed Feb. 5, 1935  35 Sheets-Sheet 17

April 9, 1935.  O. N. TEVANDER  1,997,351
BOTTLE CAPPING MACHINE
Filed Feb. 5, 1935  35 Sheets-Sheet 19

Inventor
Olof N. Tevander
By Braselton Whiteach & Davies
Attorney

April 9, 1935. O. N. TEVANDER 1,997,351
BOTTLE CAPPING MACHINE
Filed Feb. 5, 1935 35 Sheets-Sheet 20

Inventor
Olof N. Tevander
By Braselton Whitcomb & Davies
Attorneys

April 9, 1935.   O. N. TEVANDER   1,997,351
BOTTLE CAPPING MACHINE
Filed Feb. 5, 1935   35 Sheets-Sheet 21
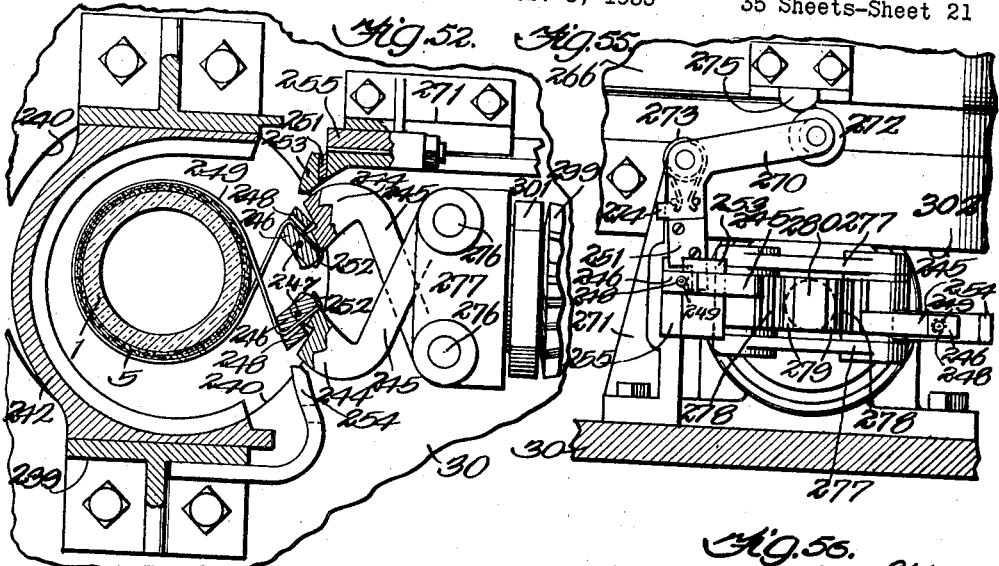
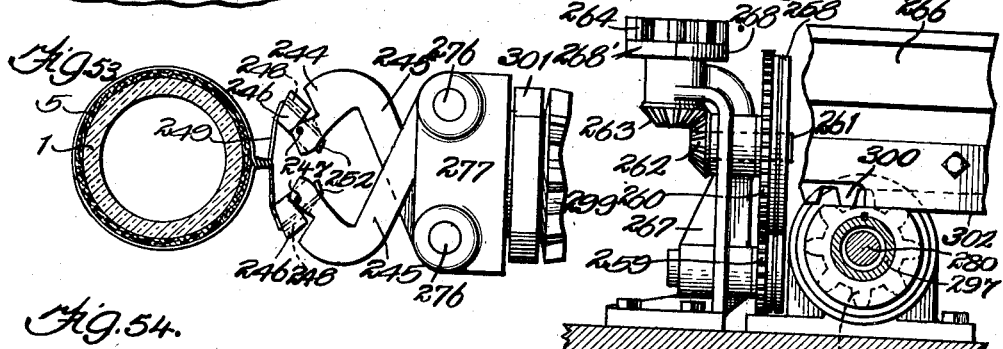
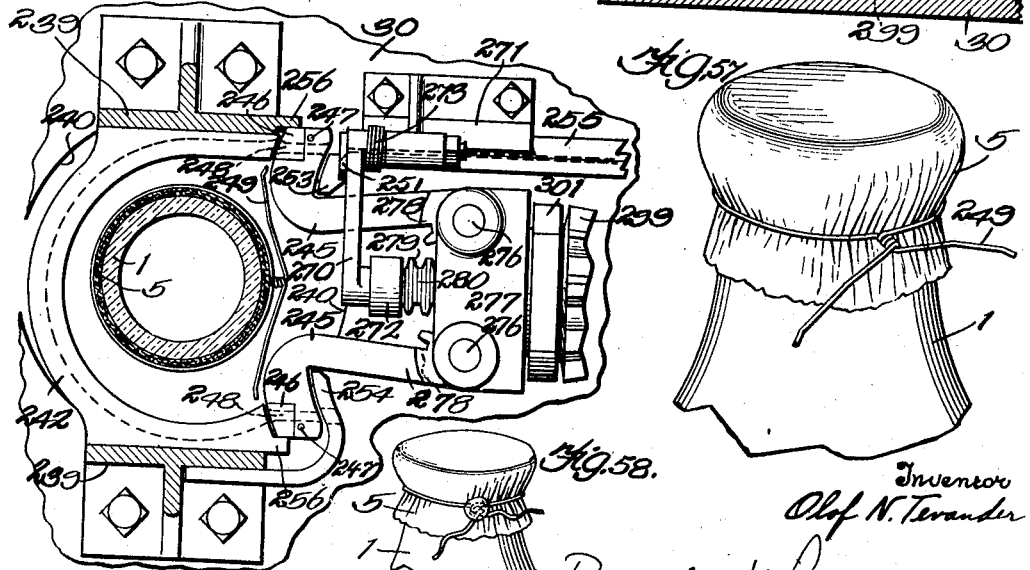
Inventor
Olof N. Tevander
By Braselton Whitcomb Davies
Attorneys April 9, 1935.  O. N. TEVANDER  1,997,351
BOTTLE CAPPING MACHINE
Filed Feb. 5, 1935   35 Sheets-Sheet 22

Inventor
Olof N. Tevander
By Braselton Whitcomb & Davies
Attorney

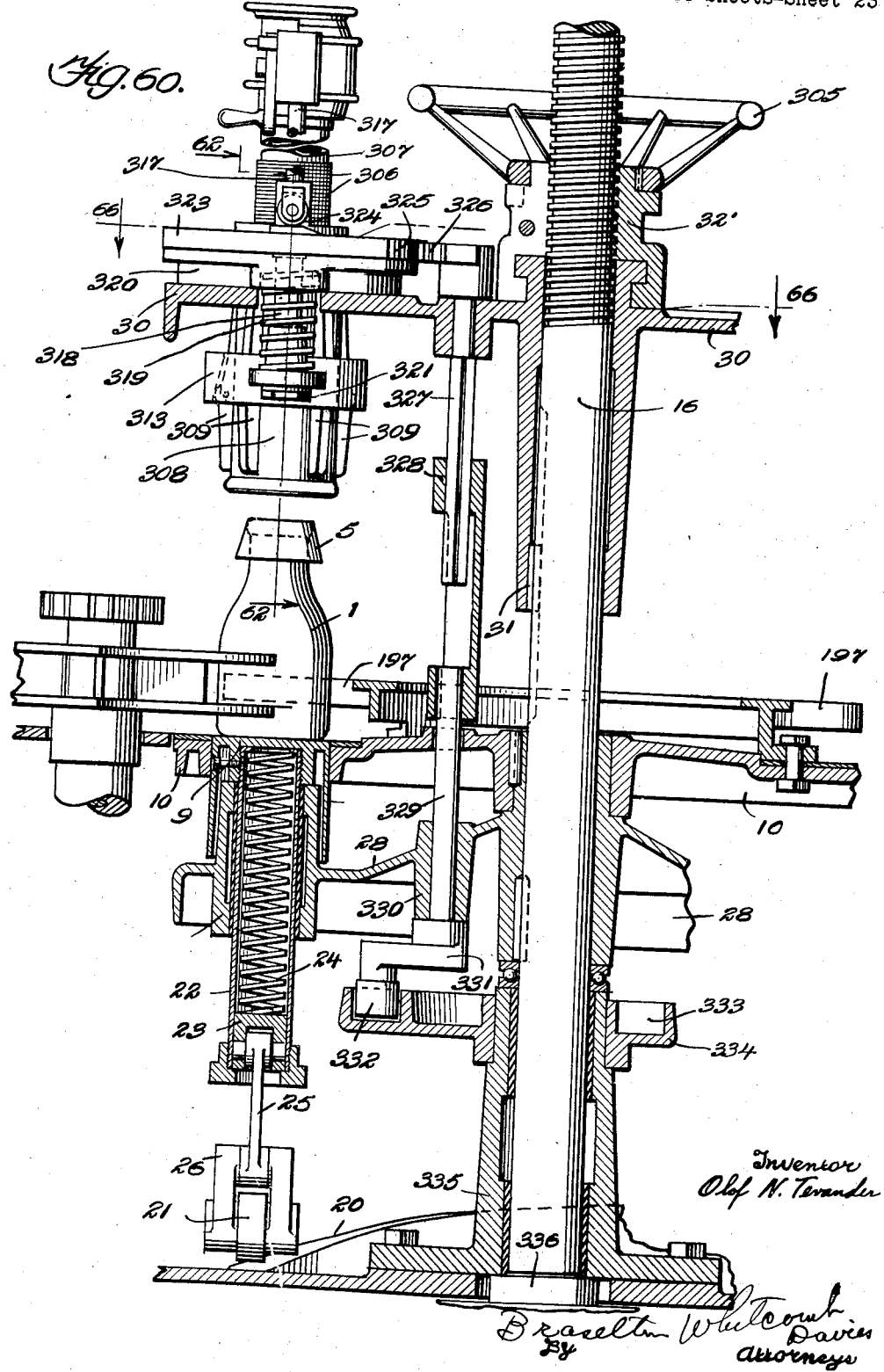

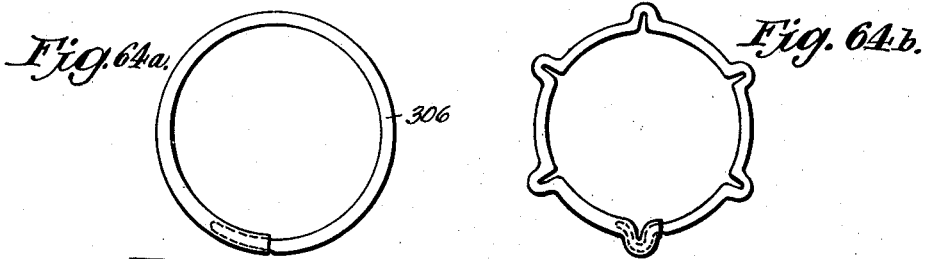
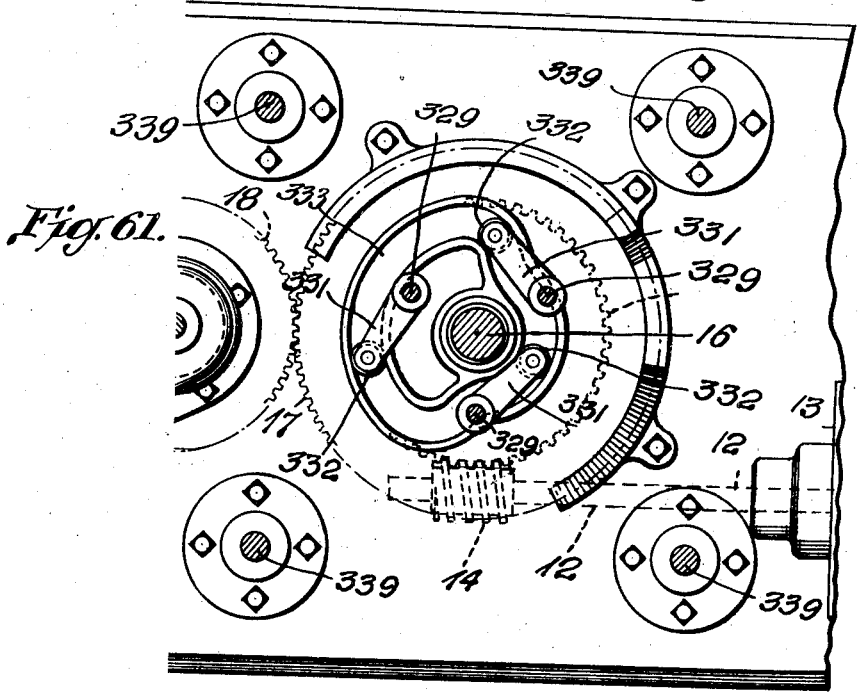
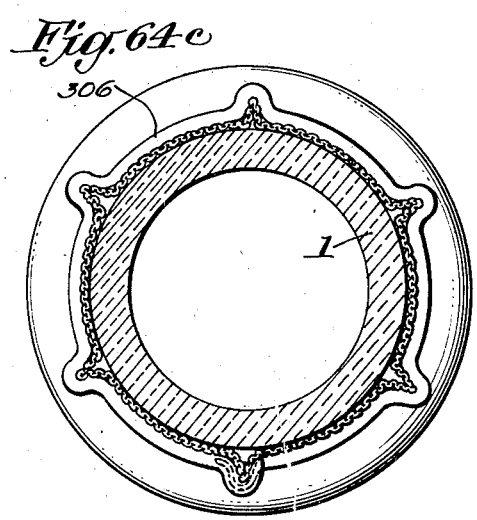
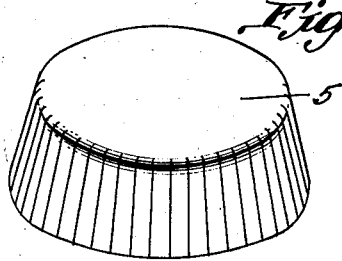

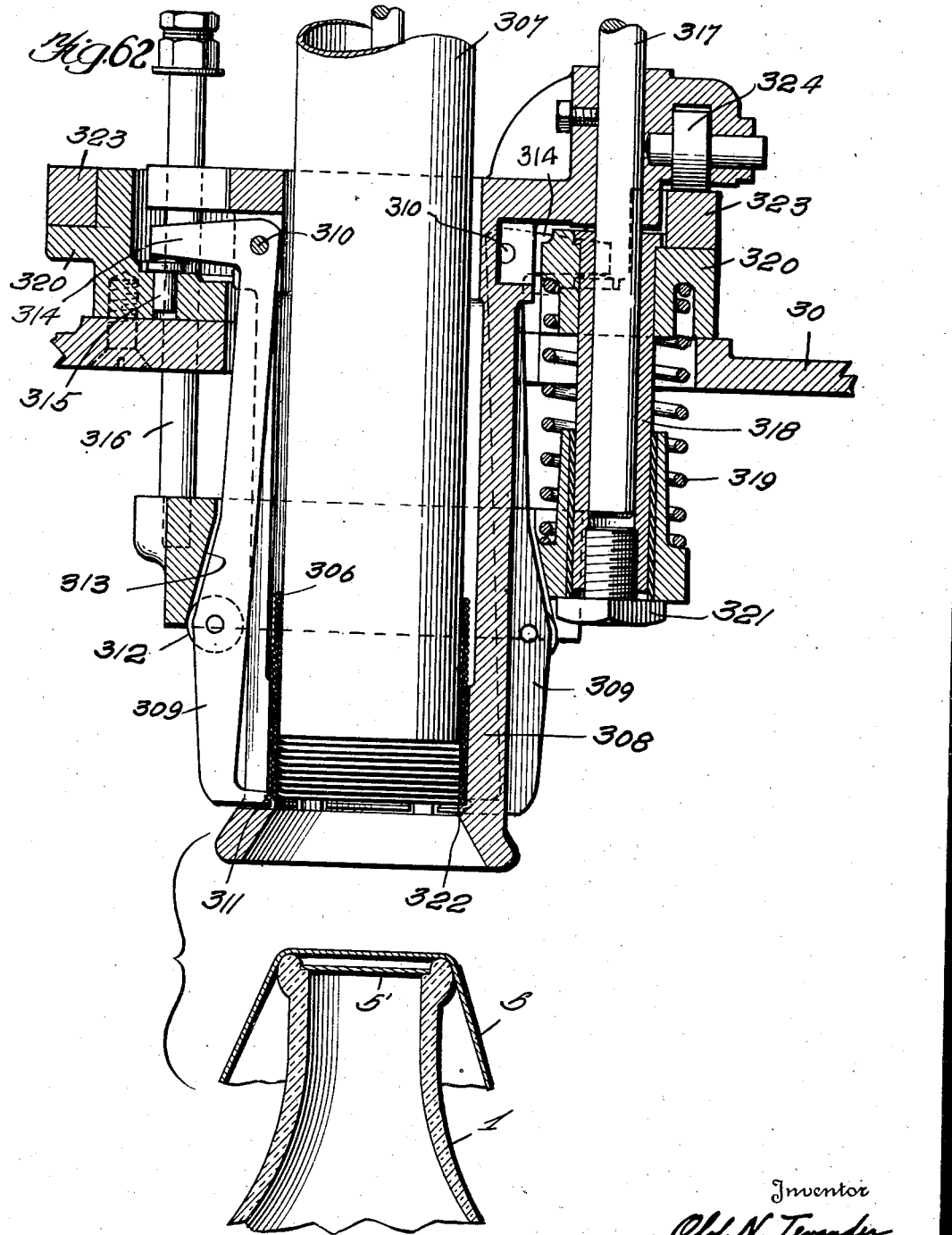

April 9, 1935.  O. N. TEVANDER  1,997,351
BOTTLE CAPPING MACHINE
Filed Feb. 5, 1935   35 Sheets-Sheet 26
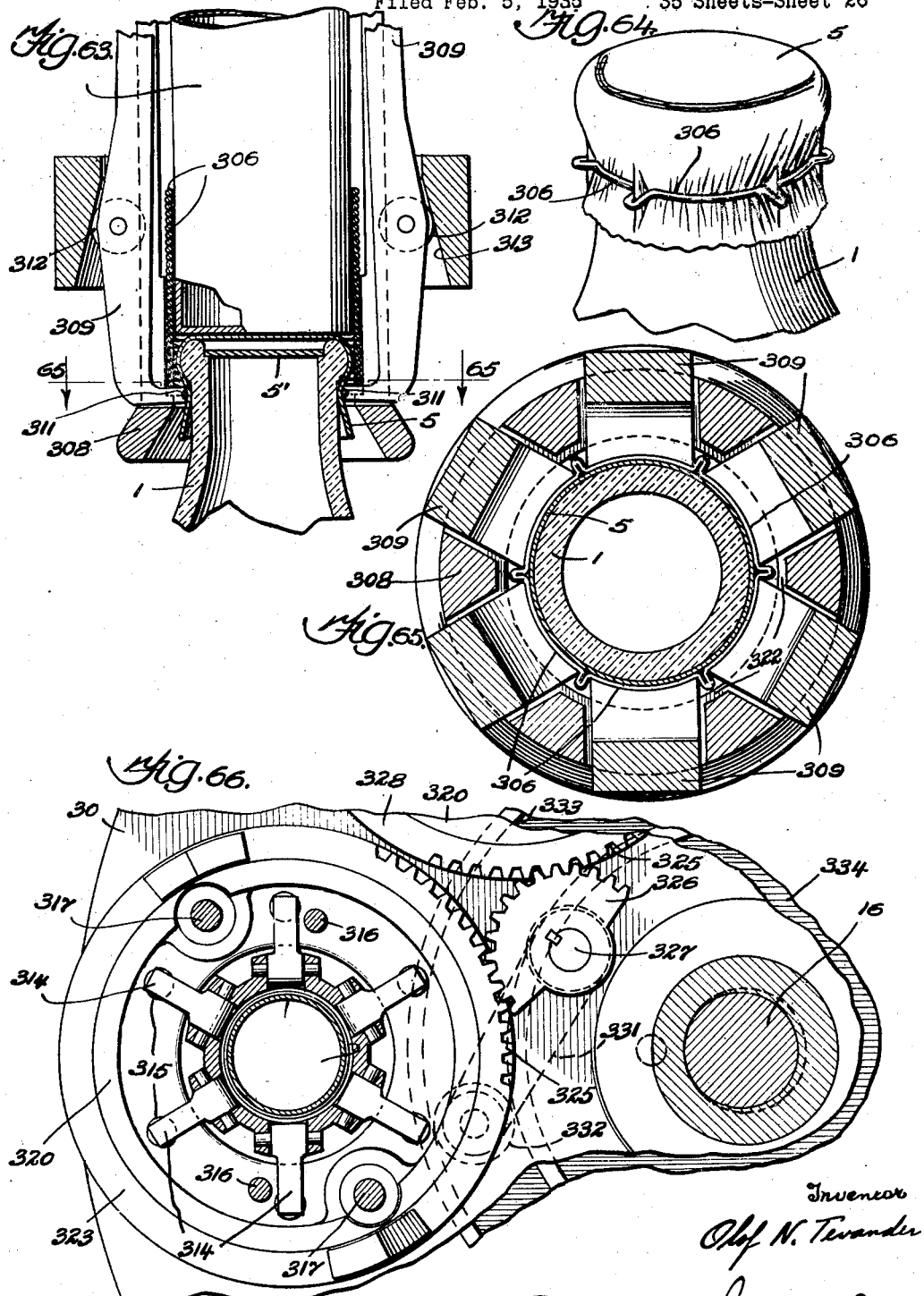
Inventor
Olof N. Tevander
By Braselton Whitcomb & Davies
Attorneys

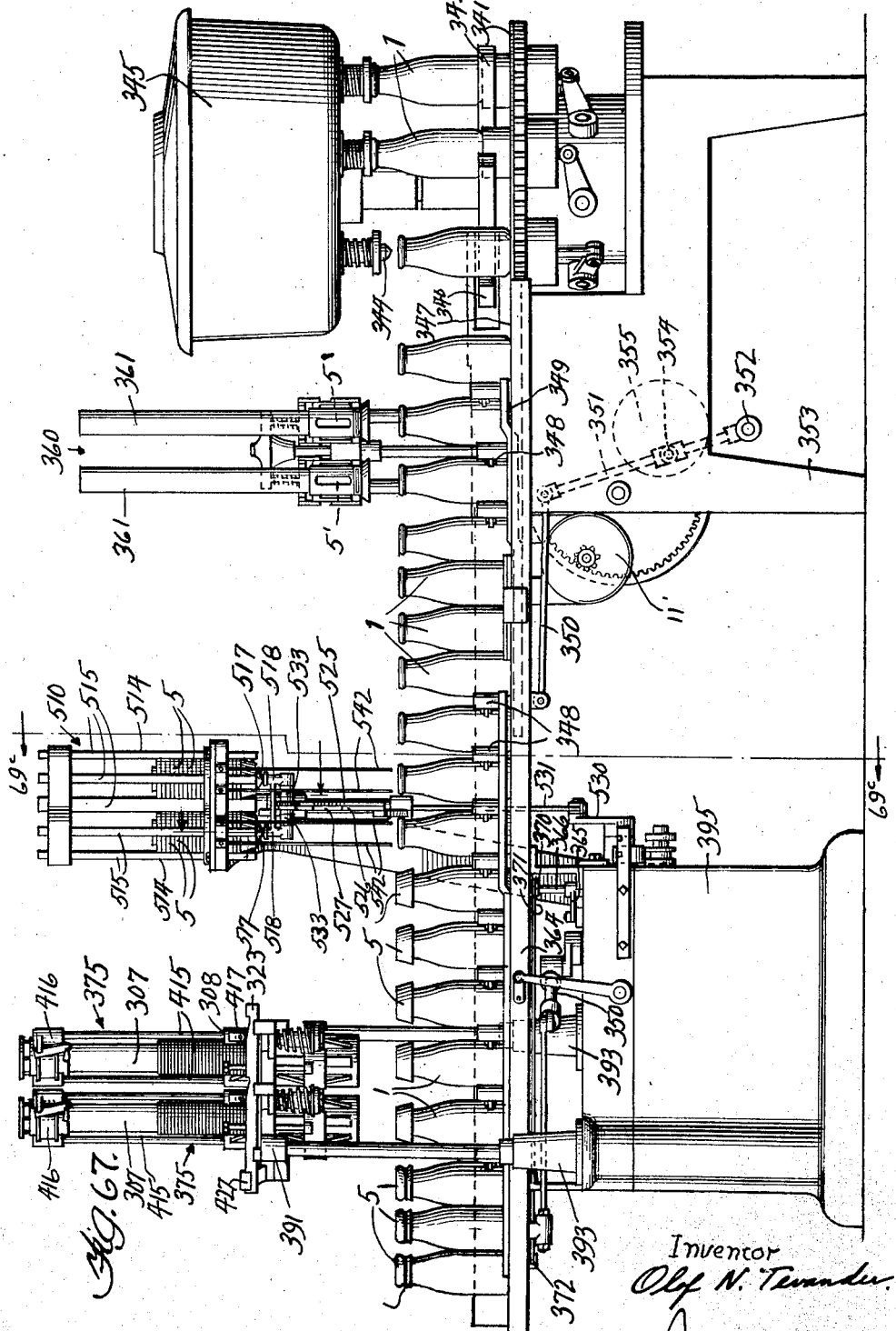

April 9, 1935. O. N. TEVANDER 1,997,351
BOTTLE CAPPING MACHINE
Filed Feb. 5, 1935   35 Sheets-Sheet 28
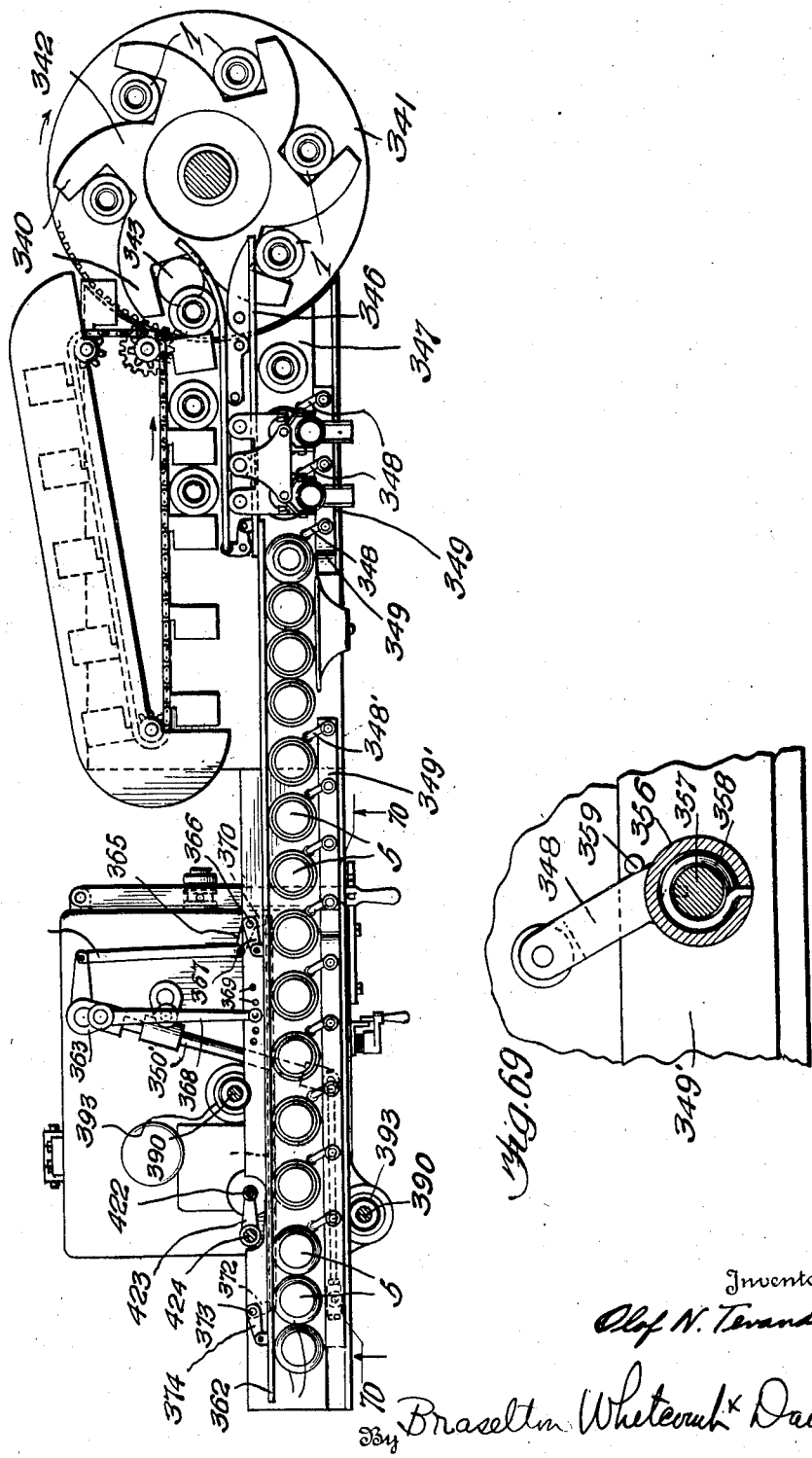

April 9, 1935.　　　O. N. TEVANDER　　　1,997,351
BOTTLE CAPPING MACHINE
Filed Feb. 5, 1935　　　35 Sheets-Sheet 29
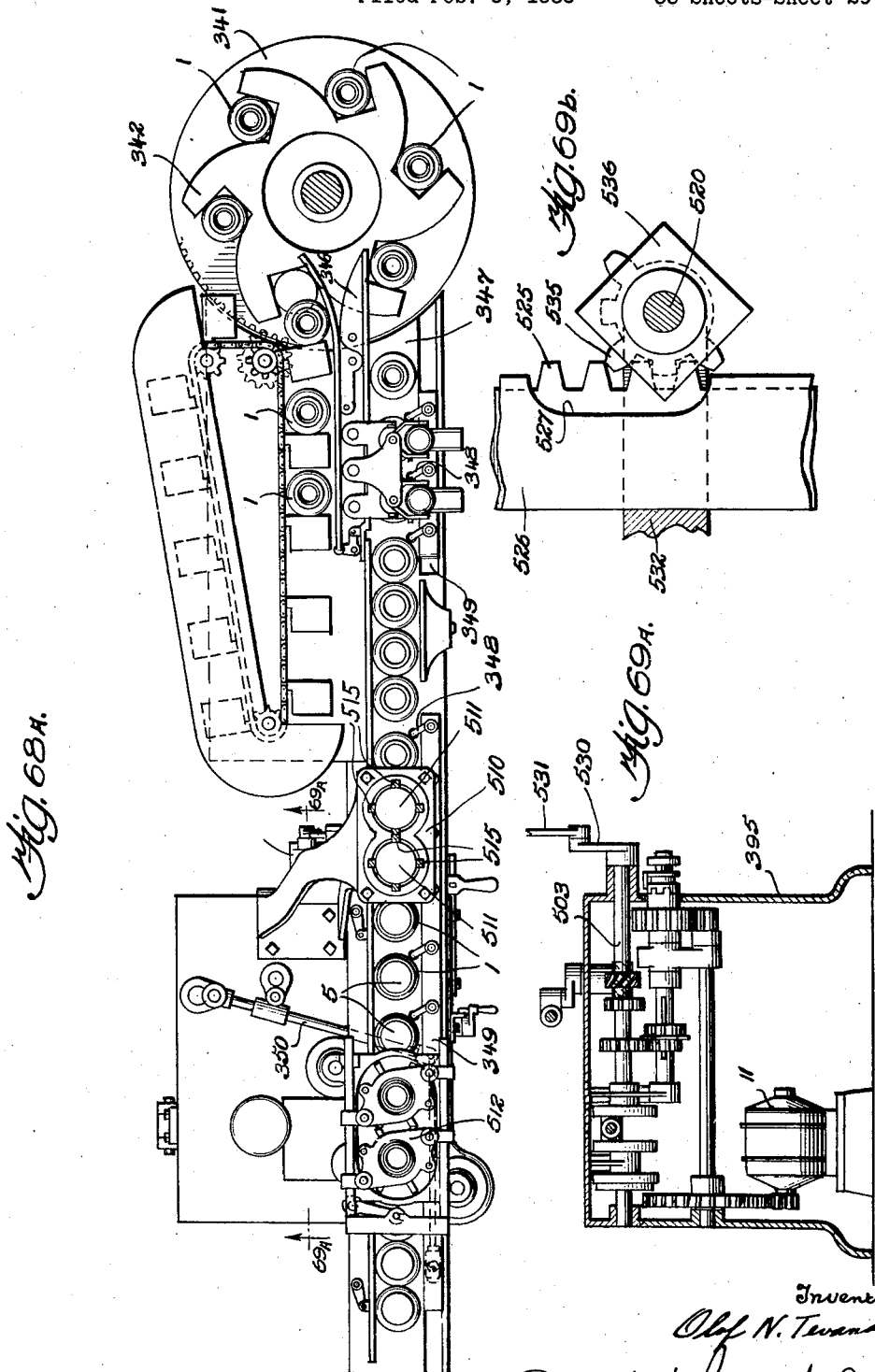

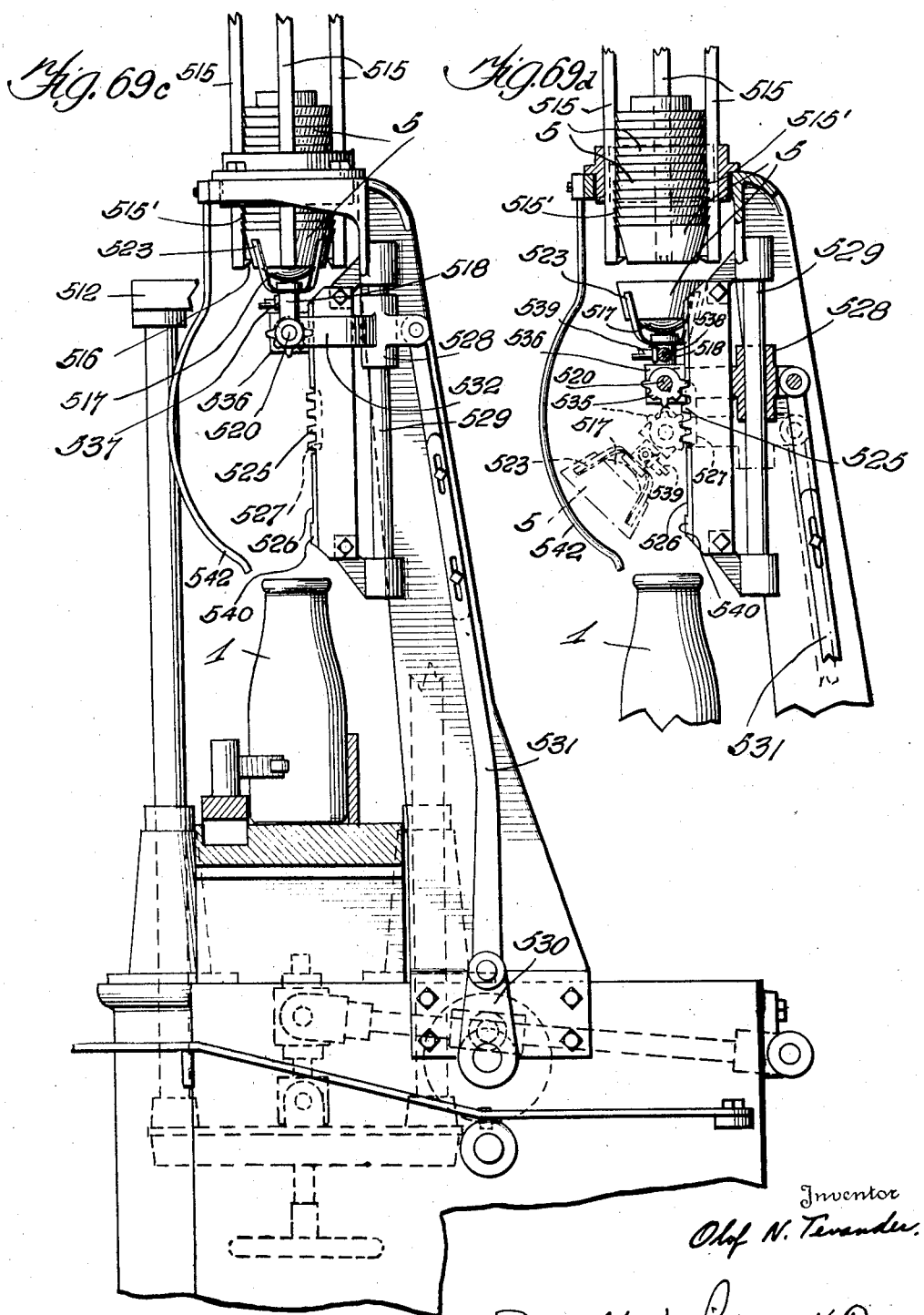

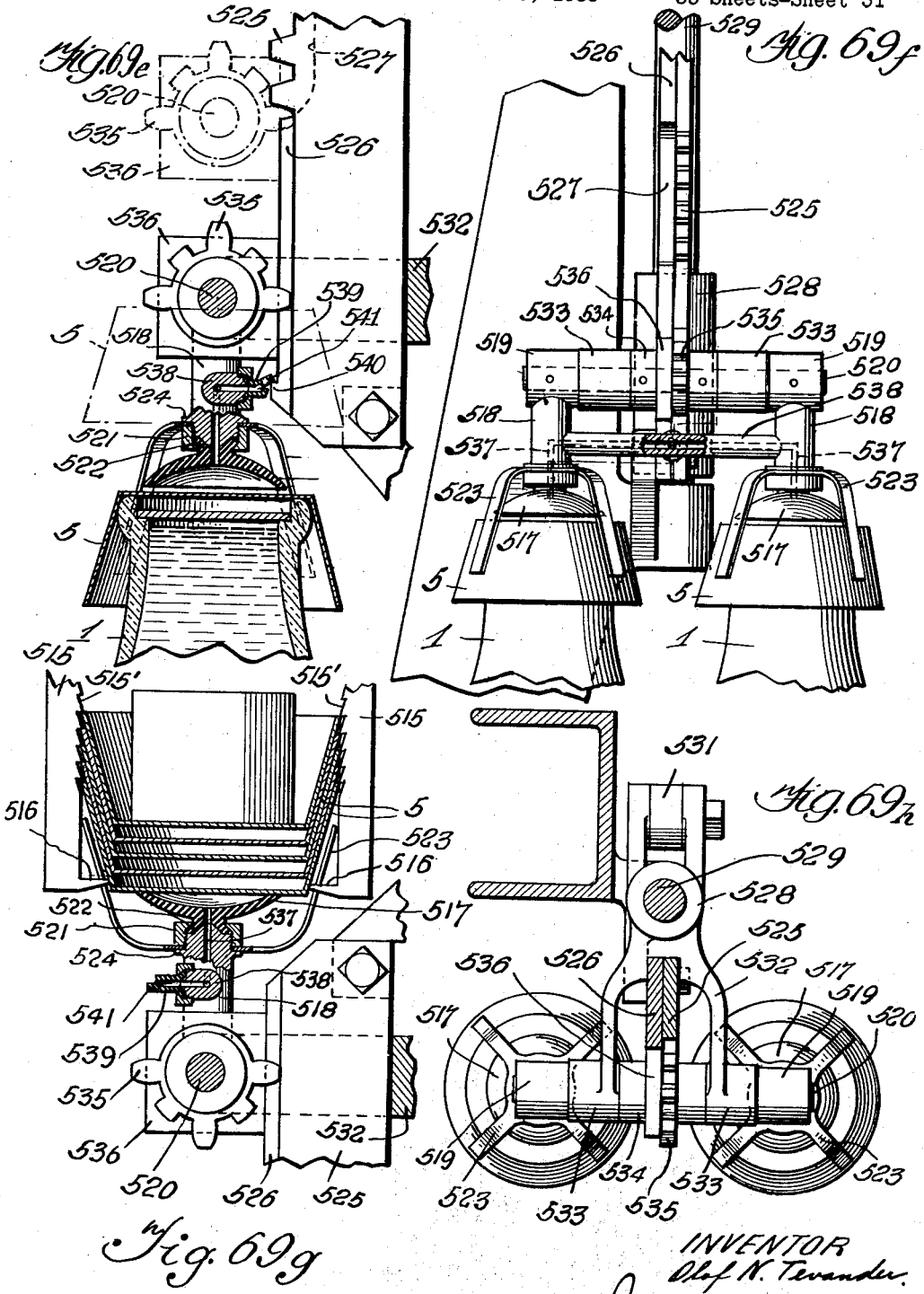

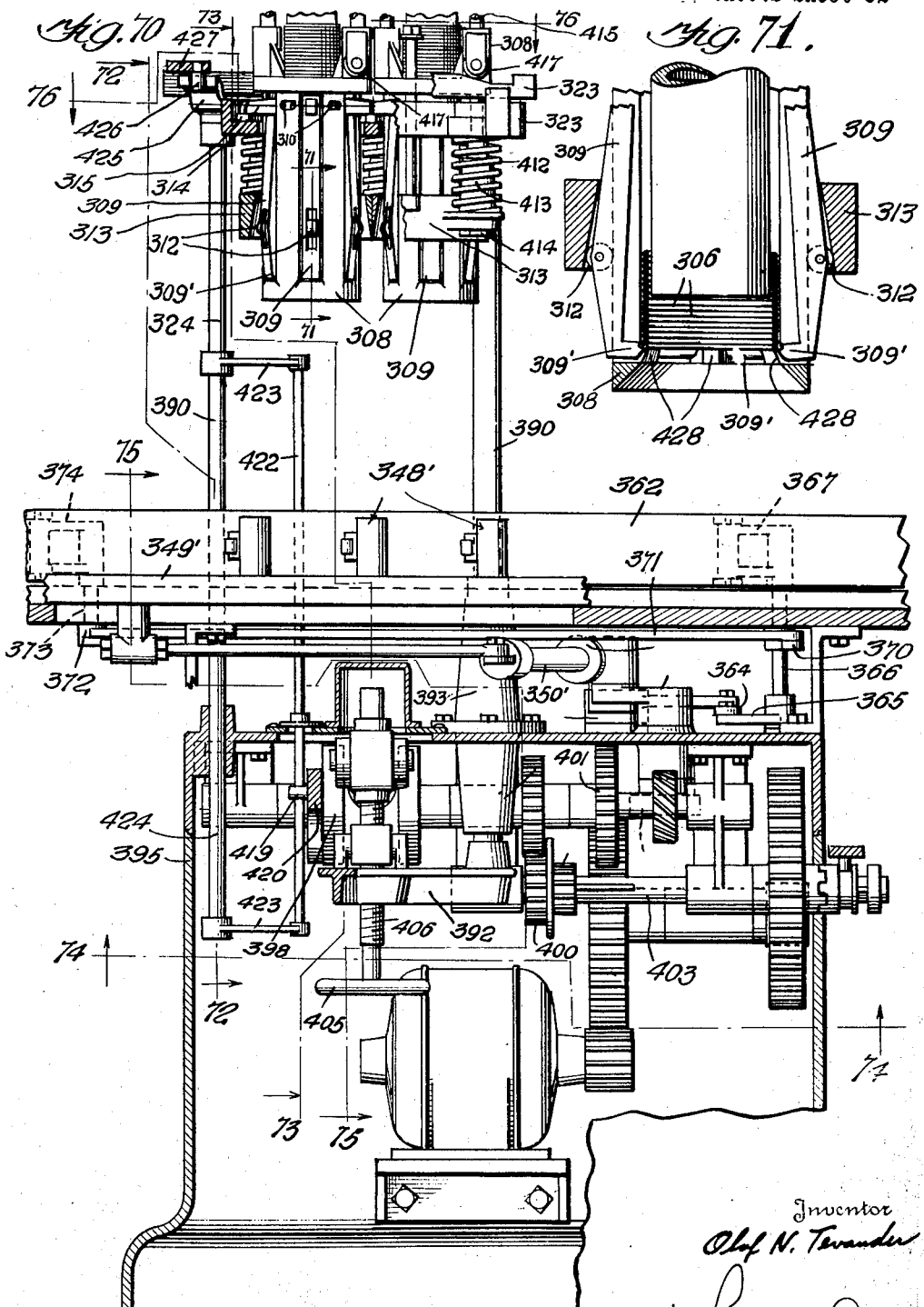

April 9, 1935.  O. N. TEVANDER  1,997,351
BOTTLE CAPPING MACHINE
Filed Feb. 5, 1935  35 Sheets-Sheet 33
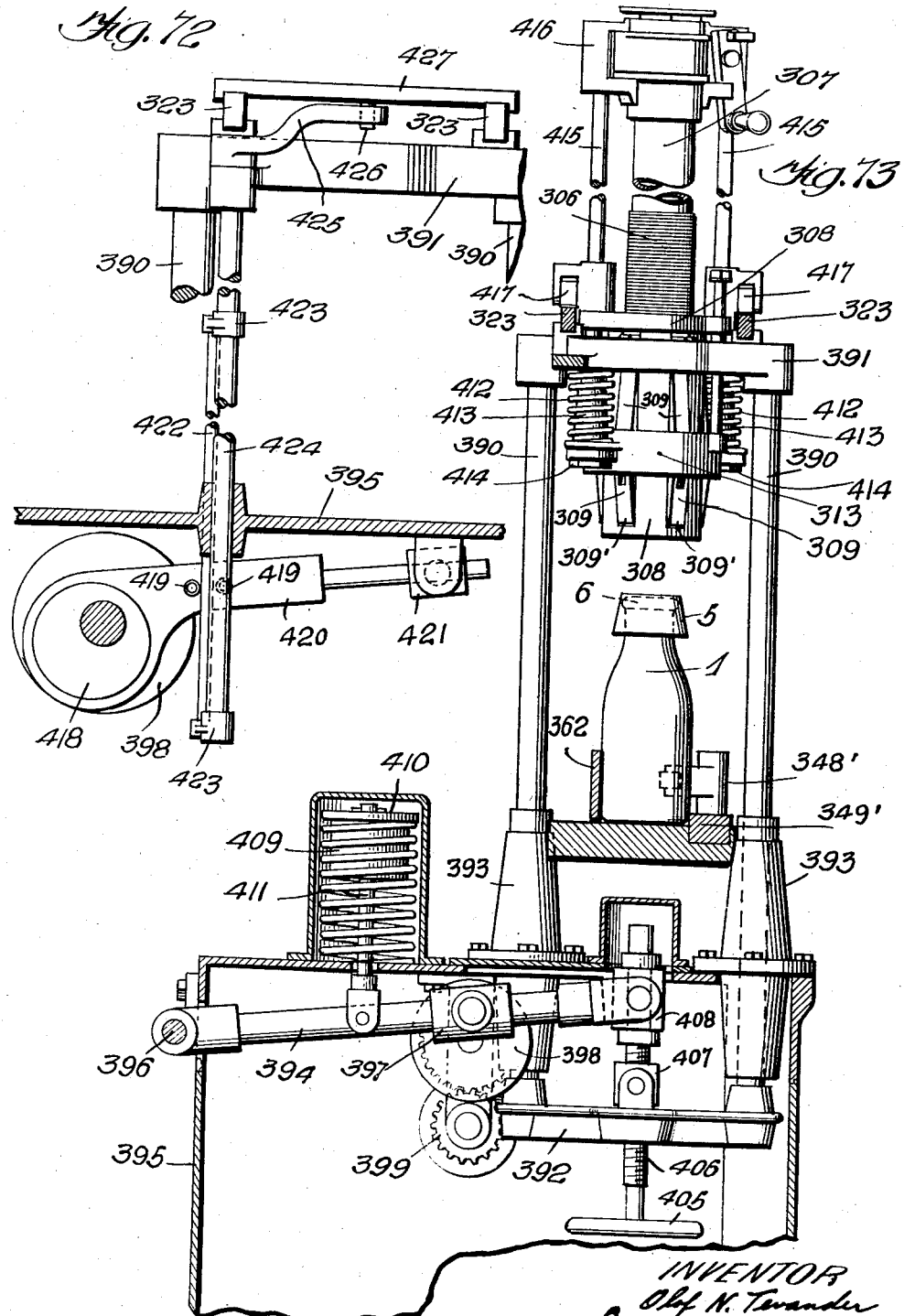

April 9, 1935.  O. N. TEVANDER  1,997,351
BOTTLE CAPPING MACHINE
Filed Feb. 5, 1935  35 Sheets-Sheet 34

Inventor
Olof N. Tevander
By Brasell m. Whitcomb Davis
Attorney

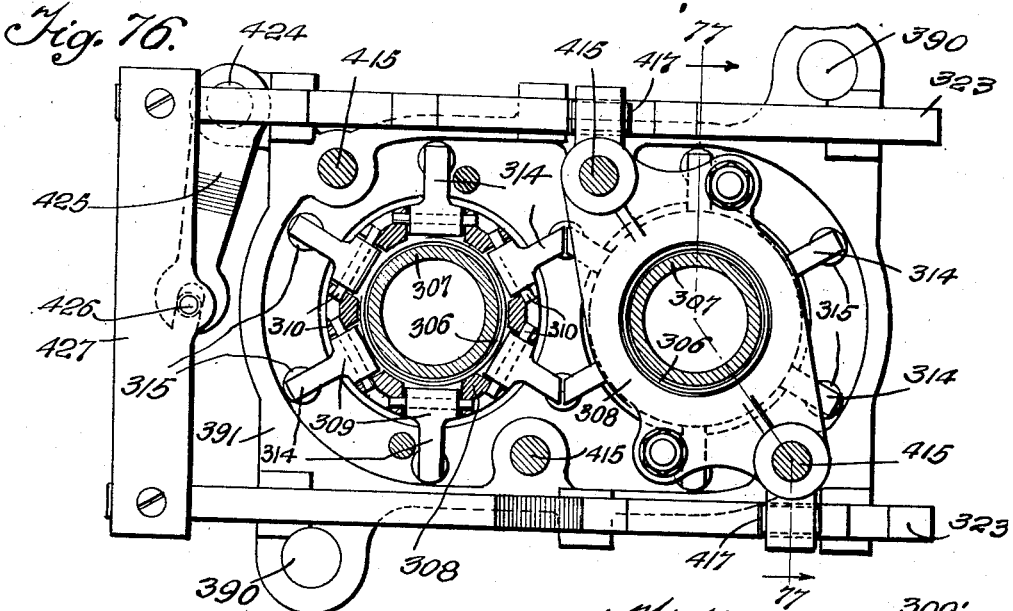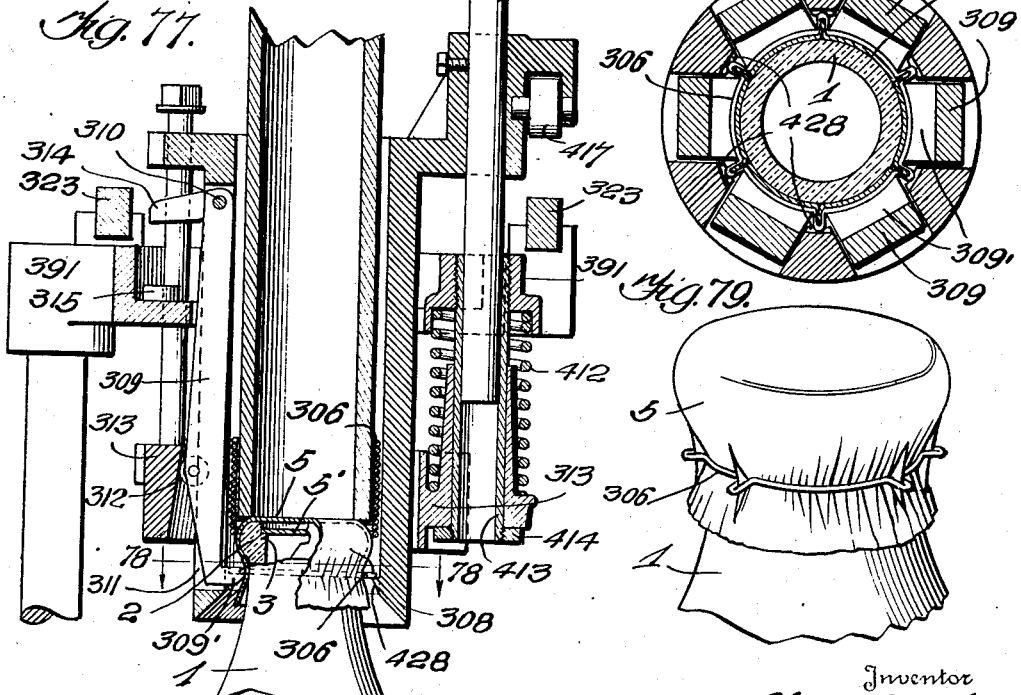

Patented Apr. 9, 1935

1,997,351

UNITED STATES PATENT OFFICE 1,997,351

BOTTLE CAPPING MACHINE

Olof N. Tevander, Chicago, Ill., assignor to Standard Cap and Seal Corporation, Chicago, Ill., a corporation of Virginia Application February 5, 1935, Serial No. 5,114

9 Claims. (Cl. 226—75)

This application is a continuation in part of my applications, including Serial No. 77,850, filed December 26, 1925, and Serial No. 649,159, filed July 2, 1923, and relates to a combination bottle filling mechanism, disc applying mechanism, conveying mechanism, hood applying mechanism and hood sealing mechanism in which the conveying mechanism and the other means referred to cooperate to permit effective and automatically correct positioning of the bottles irrespective of but coordinating with the various timed operations of the other mechanisms.

I have first illustrated certain embodiments of the hood sealing mechanisms and seriatim the machine involving the combinations aforesaid, and in this connection the general features of one form of hood sealing mechanism hereinafter more fully explained is first illustrated in Figures 1 to 26, in which Figure 1 is an elevation of one form of the hood sealing mechanism of this machine, parts being shown in section.

Fig. 2 is a view of a part of the mechanism shown in Fig. 1 in the direction of arrow 2;

Fig. 3 is a view on line 3—3 of Fig. 1;

Fig. 4 is a view on line 4—4 of Fig. 1;

Fig. 5 is a view on line 5—5 of Fig. 1;

Fig. 6 is a view on line 6—6 of Fig. 1;

Figure 11:
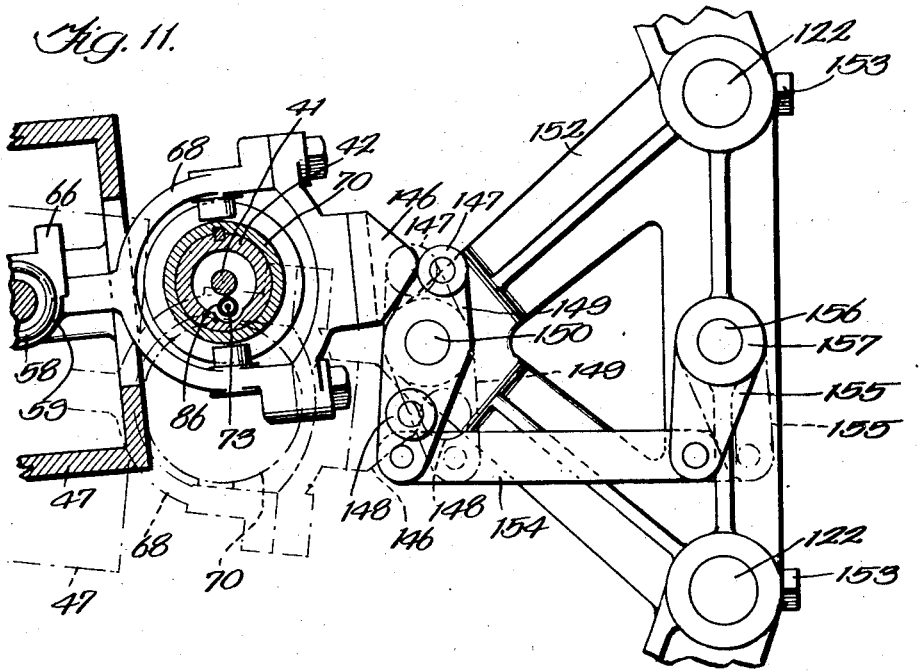
Figure 12:
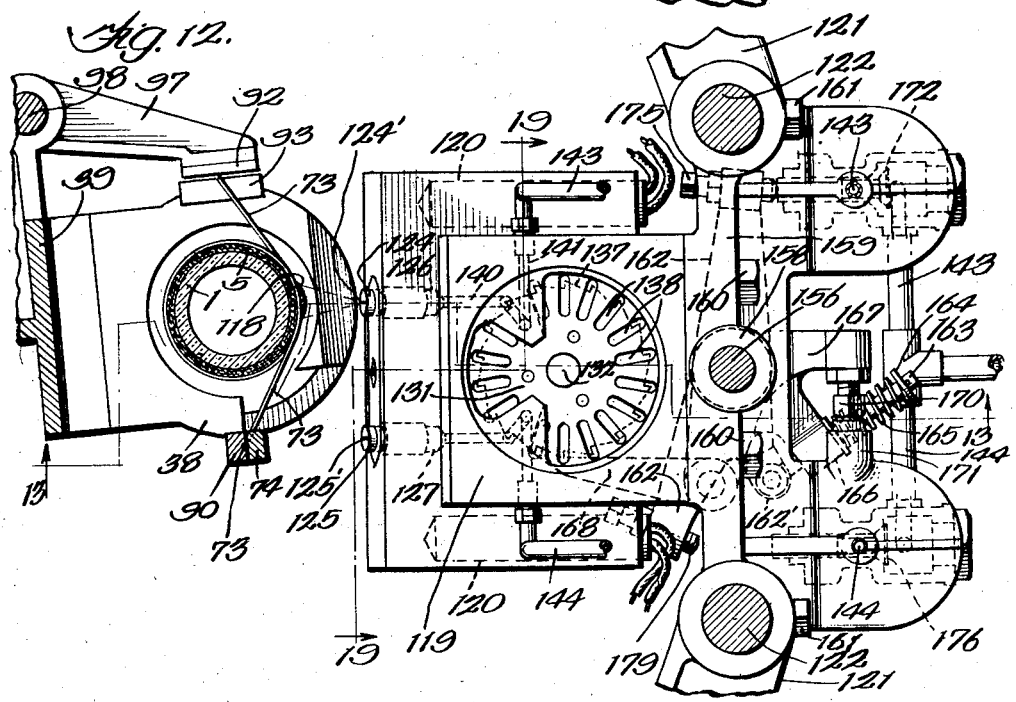
Figure 32:
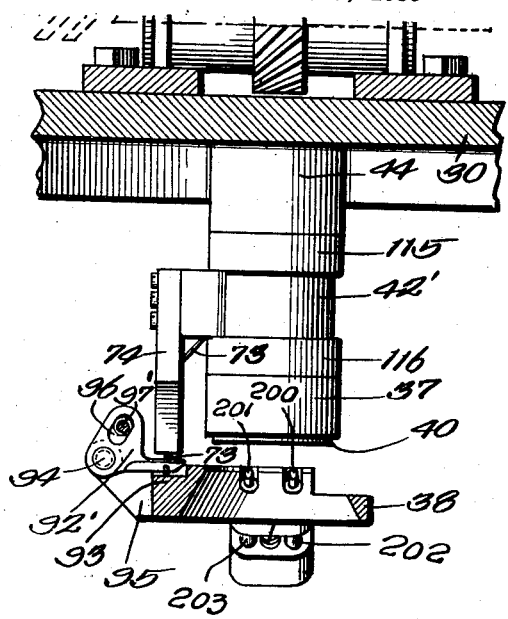
Figure 31:
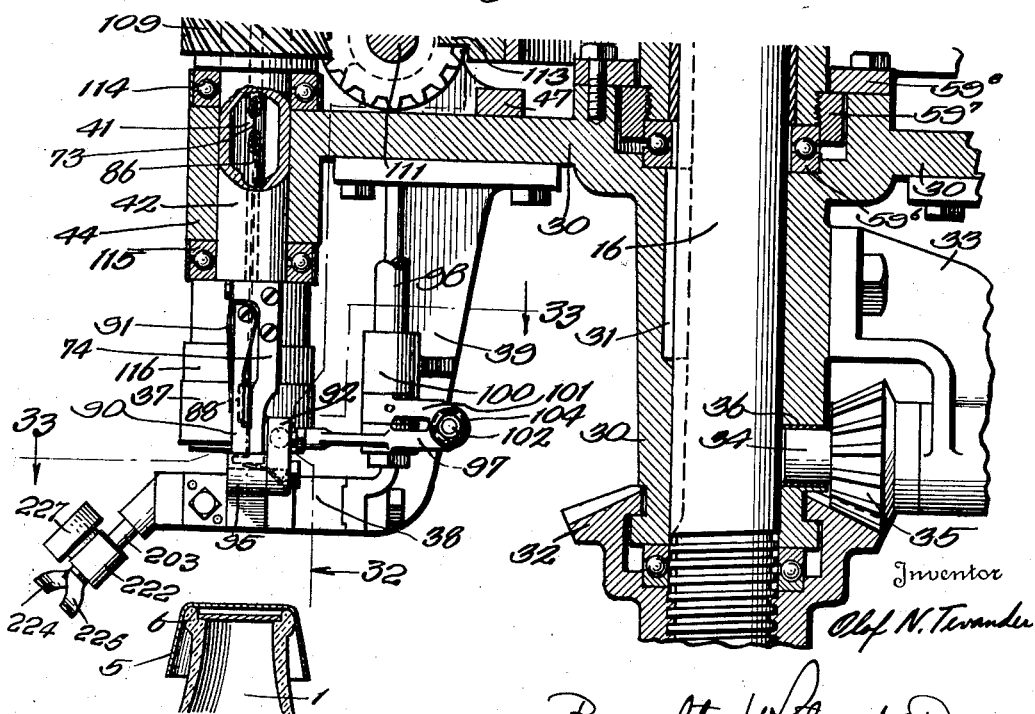
Figure 45:
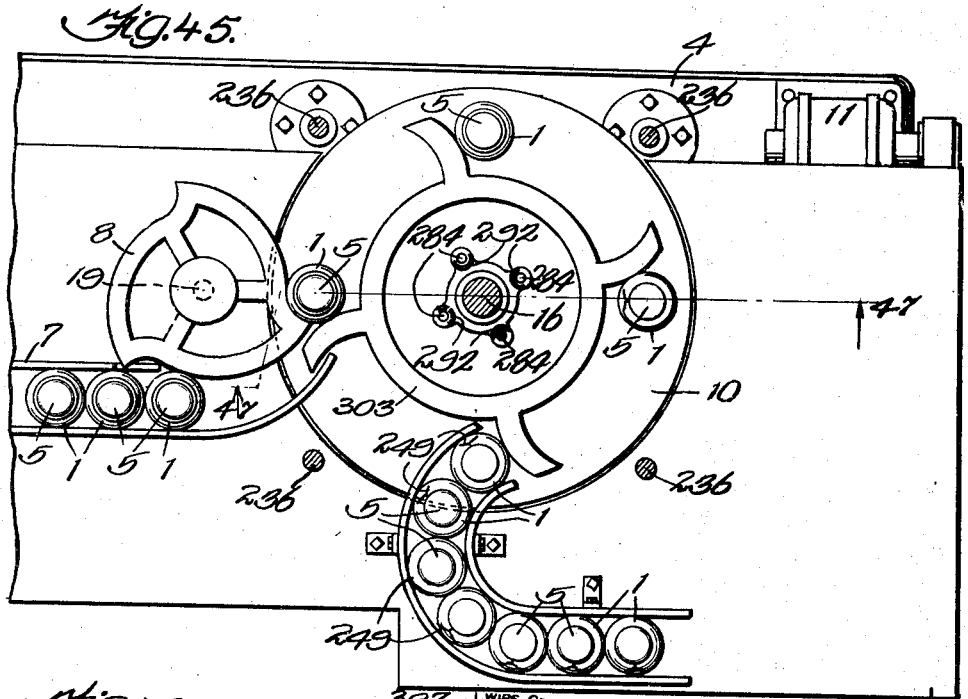
Figure 46:
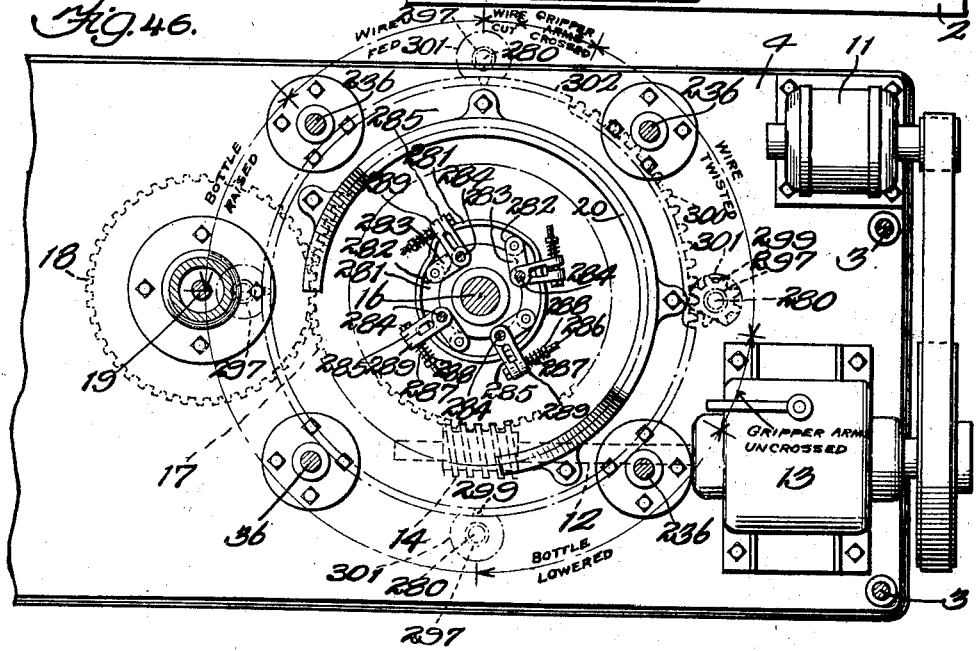
Figure 47:
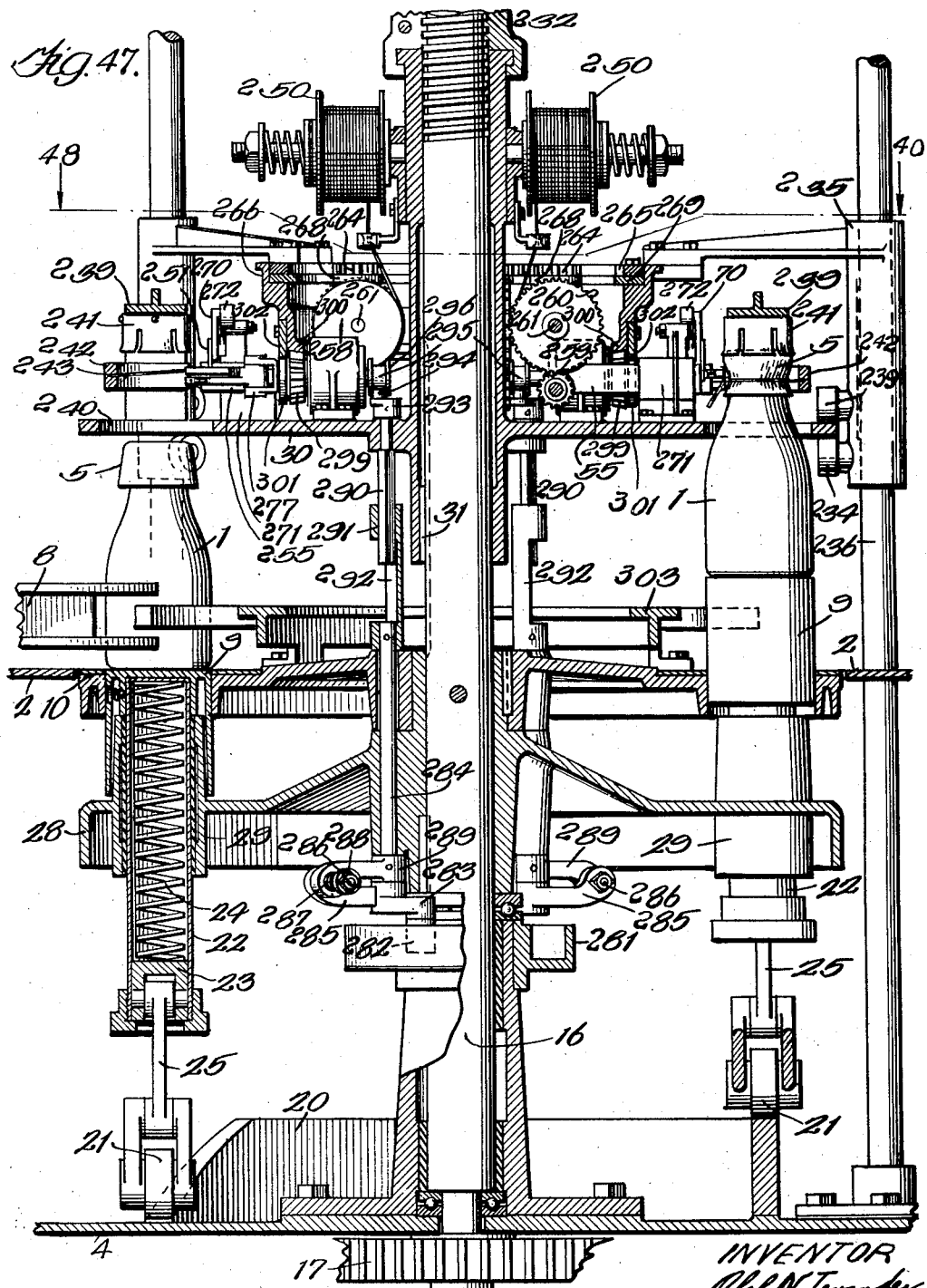
Figure 48:
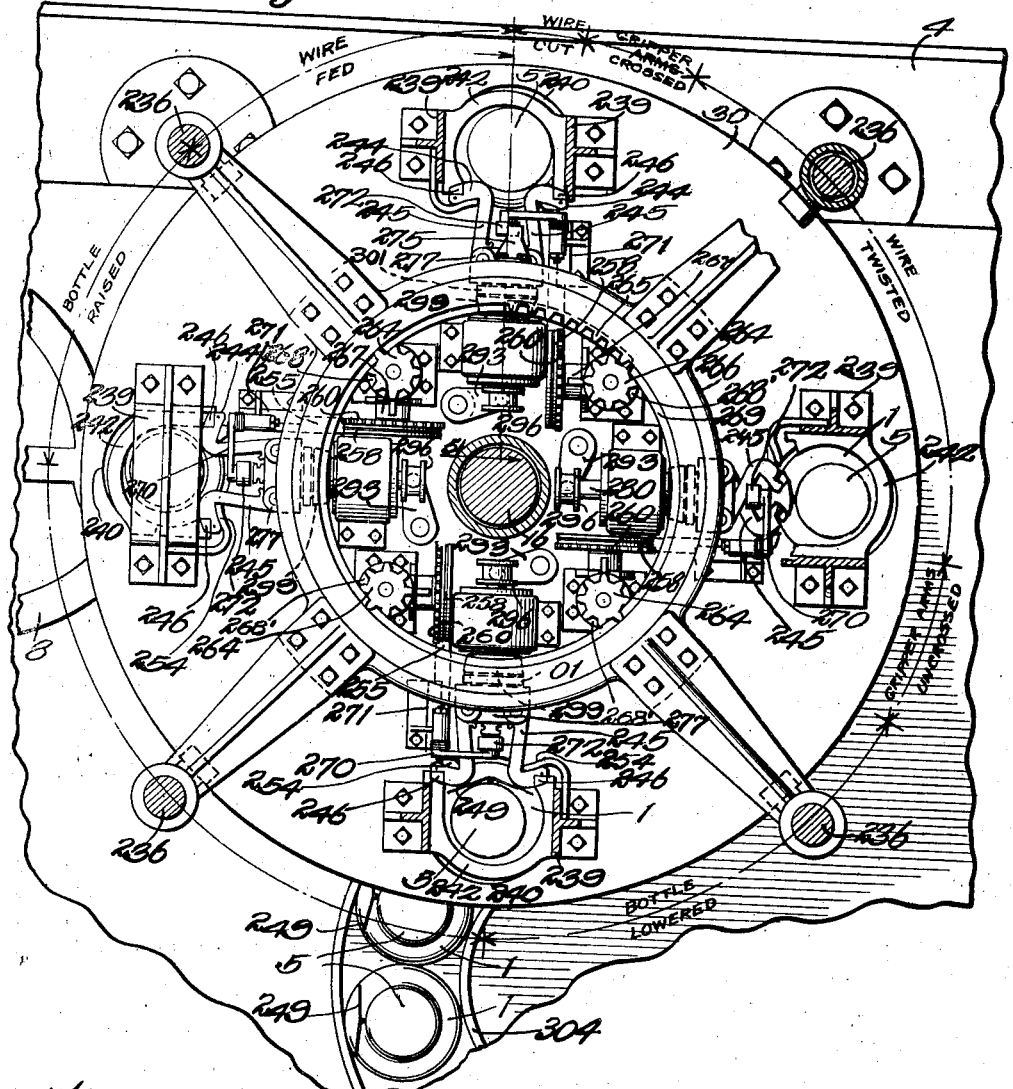
Figure 49:
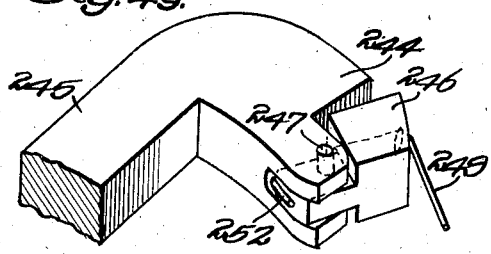
Figure 50:
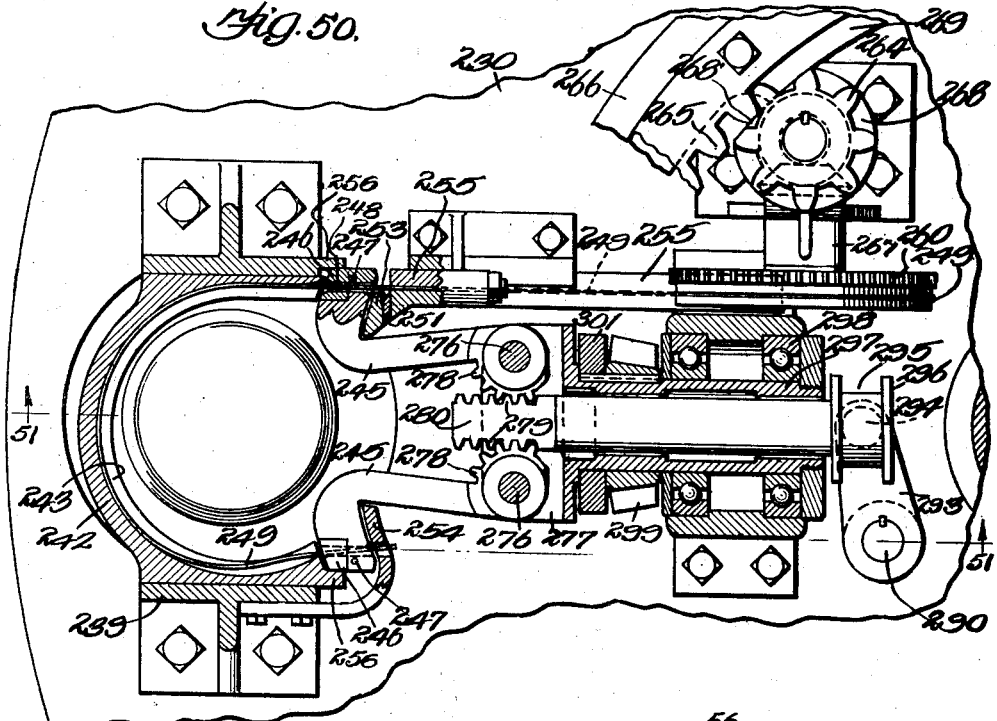
Figure 51:
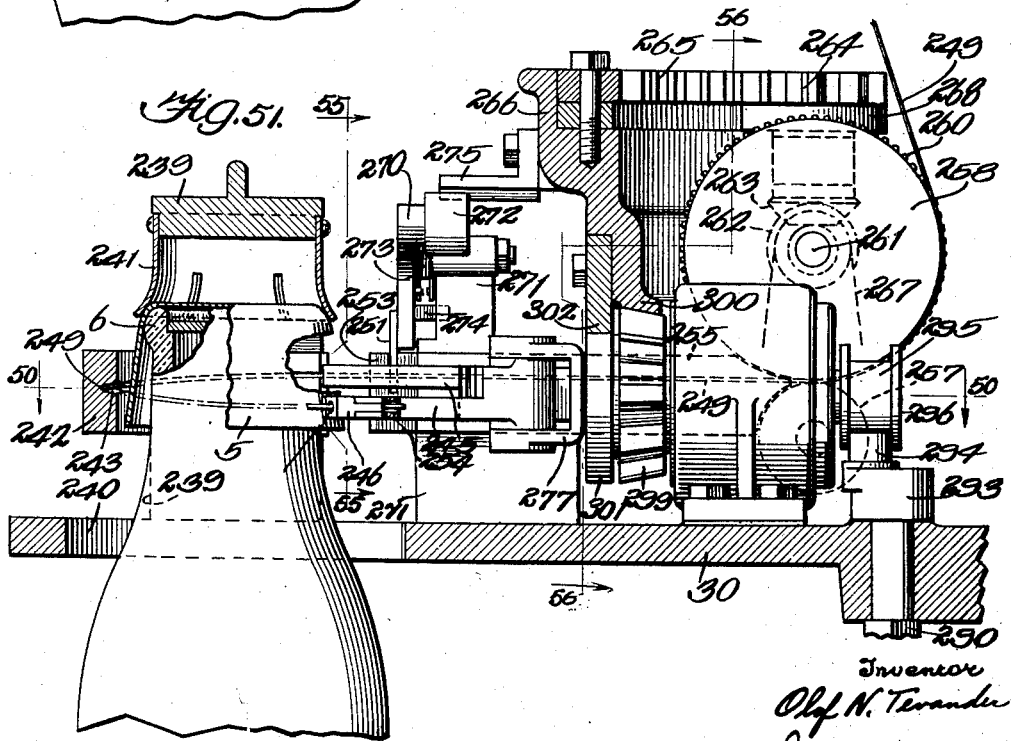
Figure 59:
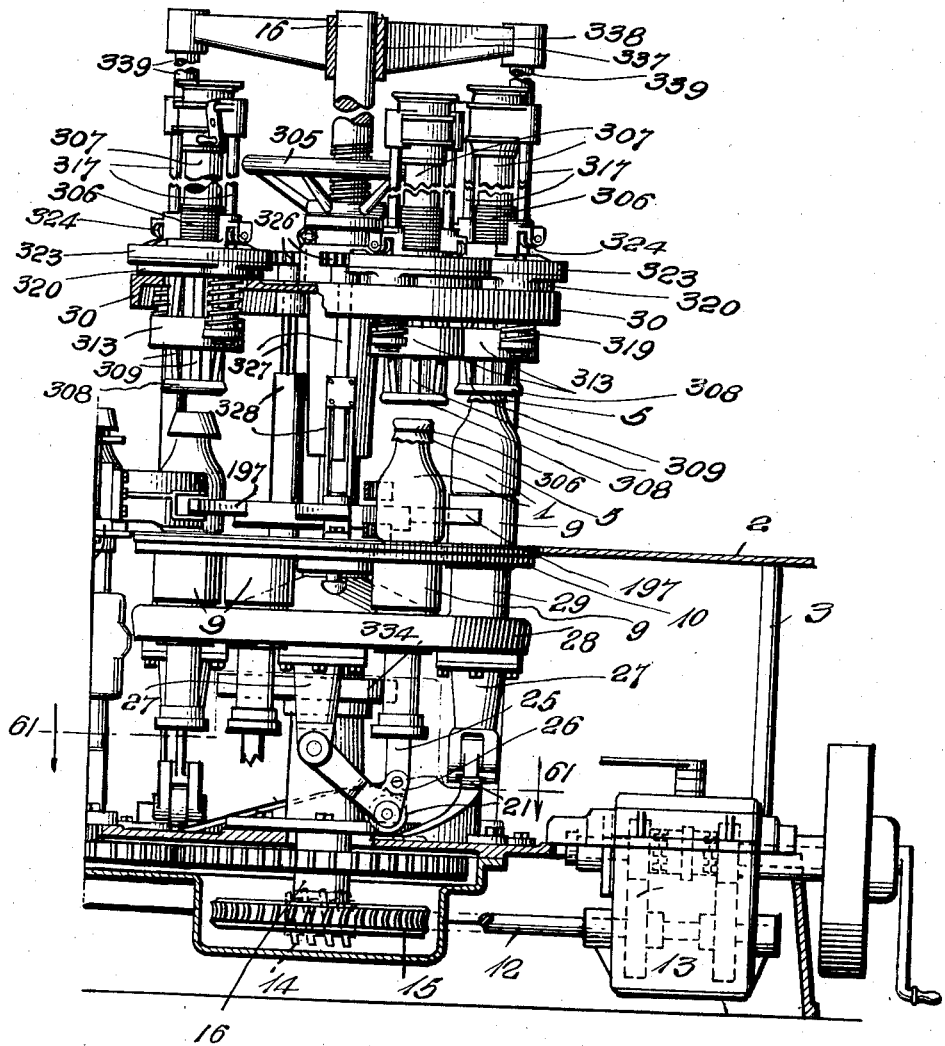
Figure 74:
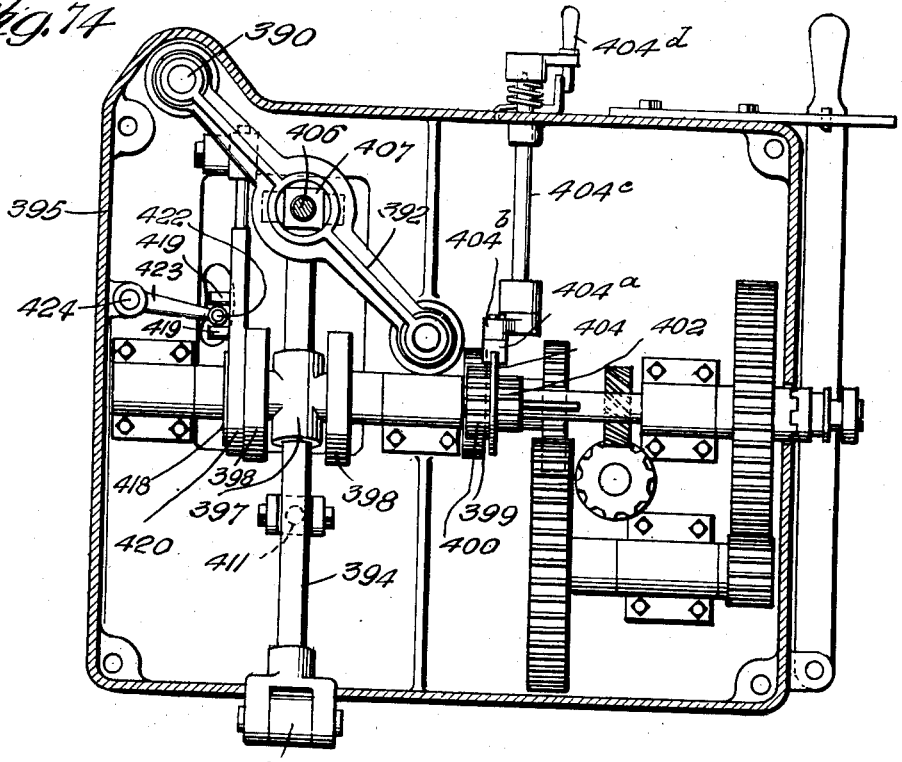
Figure 75:
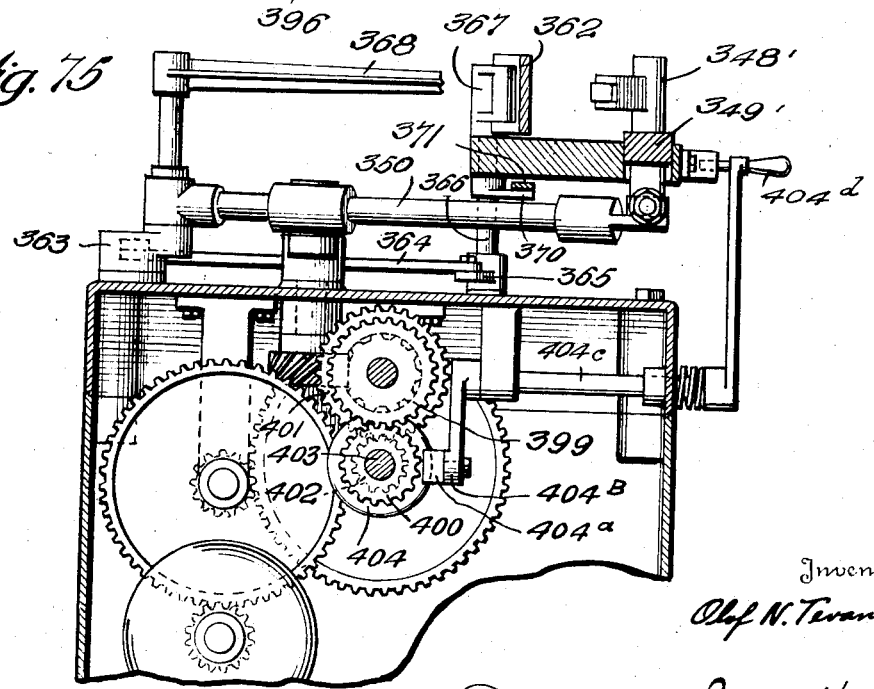

Fig. 7 and Fig. 7a, taken together, illustrate a view in elevation with parts shown in section and parts in full elevation, the bottom of Fig. 7 matching with the top of Fig. 7a;

Fig. 8 is a sectional view on line 8—8 of Fig. 7;

Fig. 9 is a sectional view on line 9—9 of Fig. 7;

Fig. 10 is a sectional view on line 10—10 of Fig. 7;

Fig. 11 is a sectional view on line 11—11 of Fig. 1 with parts in changed positions;

Fig. 12 is a view on line 12—12 of Fig. 1 with parts in changed positions;

Fig. 13 is a view on line 13—13 of Fig. 12;

Fig. 14 is a view on line 14—14 of Fig. 13, with parts omitted and some parts shown in full;

Fig. 15 is a view looking in the direction of arrow 15, Fig. 13;

Fig. 16 is an enlargement of a part of Fig. 13;

Fig. 17 is a sectional view on line 17—17 of Fig. 16;

Fig. 18 is a view similar to Fig. 12 with parts omitted, broken away and in changed positions;

Fig. 19 is a view on line 19—19 of Fig. 12;

Fig. 20 is a sectional view on line 20—20 of Fig. 18;

Fig. 21 is a view in elevation in the direction of arrow 21, Fig. 6;

Fig. 22 is a sectional view on line 22—22 of Fig. 21;

Fig. 23 is a sectional view on line 23—23 of Fig. 21;

Fig. 24 is a view in elevation of the upper portion of the bottle illustrating a cap applied to a bottle mouth by a string fastened by the machine of my invention;

Fig. 25 is a sectional view on line 25—25 of Fig. 24;

Fig. 26 is a fragmentary elevation, partly in section, of an embodiment of my invention showing the fastening of a metallic strand by means such as solder;

Fig. 27 is a view on line 27—27 of Fig. 26;

Fig. 28 is a view on line 28—28 of Fig. 26;

Fig. 29 is a view on line 29—29 of Fig. 26;

Fig. 30 is a view in elevation of a part of the mechanism which is shown in Fig. 29;

Fig. 31 illustrates a view in elevation with parts shown in section;

Fig. 32 is a sectional view on line 32—32 of Fig. 31;

Fig. 33 is a sectional view on line 33—33 of Fig. 31 the bottle and the cap skirt being shown in section for clearness in illustration;

Fig. 34 is a view on the line 34—34 of Fig. 35;

Fig. 35 is a view on the line 35—35 of Fig. 29 with parts omitted;

Fig. 36 is a view on line 36—36 of Fig. 33;

Fig. 37 is a view of a part of the mechanism looking in a direction of arrow 37 of Fig. 34;

Fig. 38 is a sectional view of a part of the bottle illustrating the union between the lapping ends of the string;

Fig. 39 is a sectional view on line 39—39 of Fig. 30;

Fig. 40 is a sectional view on line 40—40 of Fig. 30 and looking in the direction of arrow 40 of Fig. 39;

Fig. 41 is a view similar to Fig. 40 showing parts in changed positions;

Fig. 42 is a sectional view on lines 42—42 of Fig. 33 with parts in changed positions;

Fig. 43 is a view in elevation of the upper portion of a bottle with a closure cap as applied thereto by the machine;

Fig. 44 is a view partly in section of an embodiment of my invention showing a milk bottle capping machine in which the string or wire is fastened by twisting;

Fig. 45 is a sectional view on the line 45—45 of Fig. 44;

Fig. 46 is a view generally taken on line 46—46 of Fig. 44 but also somewhat diagrammatic;

Fig. 47 is a sectional view on line 47—47 of Fig. 45 but showing additional mechanism not appearing in Fig. 45 and with some of the parts omitted;

Fig. 48 is a sectional view on line 48—48 of Fig. 47 the sequence of operations being noted upon this figure;

Fig. 49 is a perspective view illustrating one of the two grippers which are similarly formed with a portion of the arm carrying this gripper;

Fig. 50 is a sectional view on line 50—50 of Fig. 51;

Fig. 51 is a sectional view on lines 51—51 shown in both Figs. 48 and 50;

Fig. 52 is a view showing a portion of the mechanism that appears in Fig. 50 with parts in changed positions but before the completion of the wire twisting operation;

Fig. 53 is a view showing some of the parts appearing in Fig. 52 after the twisting operation has been completed;

Fig. 54 is a view showing the mechanism portion illustrated in Fig. 52 and additional parts, this figure illustrating the grippers in their initial positions preparatory to the twisting operation;

Fig. 55 is a view on line 55—55 of Fig. 51;

Fig. 56 is a view on line 56—56 of Fig. 51;

Fig. 57 is a perspective view illustrating a cap fastener held in place by a metallic wire ring formed of a looped strand of wire whose ends are twisted by the operation of the machine;

Fig. 58 illustrates the application of the skirt of a bottle cap to a bottle neck by means of a non-metallic string operated upon by the machine and whose twisted ends are maintained together by means of a bead of sealing wax or other cementitious material;

Fig. 59 is a front elevation with parts shown in section of a further embodiment of my invention as used in applying metallic fasteners to the bottle caps by crimping;

Fig. 60 is a sectional elevation;

Fig. 61 is a sectional plane view on line 61—61 of Fig. 59;

Fig. 62 is a sectional elevation on line 62—62 of Fig. 60, on a larger scale;

Fig. 63 is a view showing part of the structure appearing in Fig. 62 to illustrate changed positions of the jaws and cooperating parts;

Fig. 64 is a perspective view of the upper portion of a bottle after it has been capped;

Fig. 64a is a plan view of a tubular band forming one of the above mentioned tubular fasteners;

Fig. 64b is a plan view of the band of Fig. 64a showing, somewhat exaggerated, the crimped position to which it is reduced by fastening it about the skirt of a sealing cap on a bottle;

Fig. 64c is a sectional view through the bottle or jar taken at the plane occupied by the fastening bar;

Fig. 64d is a perspective view of the cap before its application to the bottle;

Fig. 65 is a sectional view on line 65—65 of Fig. 63;

Fig. 66 is a sectional plan view on line 66—66 of Fig. 60;

Fig. 67 is a side elevation of a bottle capping machine embodying mechanism for crimping or otherwise contracting these bands or rings in combination with automatic means for applying the hood cap to the sealed and the disc cap;

Fig. 68 is a plan sectional view taken on line 68—68 of Fig. 67;

Fig. 68a is a view similar to Fig. 68 with the automatic hood cap applying mechanism shown;

Fig. 69 is a detail for illustrating the construction and arrangement of one of the pawls shown in Fig. 68;

Fig. 69a is a sectional view on the line 69a—69a of Fig. 68a;

Fig. 69b is a side elevation of a detail of the automatic hood cap applying mechanism;

Fig. 69c is a side elevation of the automatic hood cap applying mechanism shown on the line 69c—69c of Fig. 67;

Fig. 69d is a similar view to Fig. 69c with the parts in altered position and other parts in section;

Fig. 69e is an enlarged detail of portions of the mechanism illustrated in Figs. 69c and 69d with portions in section and in changed positions;

Fig. 69f is a side view of the structure shown in Fig. 69e, parts being broken away;

Fig. 69g is an enlarged sectional detail taken on a line 69g—69g of Fig. 67;

Fig. 69h is a sectional plan view taken on a line 69h—69h of Fig. 69f;

Fig. 70 is a sectional view on line 70—70 of Fig. 68 and showing a modified arrangement of motor drive and gearing from that illustrated in Fig. 69a;

Figs. 71, 72, 73, 74, 75 and 76 are sectional views taken, respectively, on lines 71—71, 72—72, 73—73, 74—74, 75—75 and 76—76 of Fig. 70;

Fig. 77 is a sectional view on line 77—77 of Fig. 76 but showing a changed position occurring upon insertion of a bottle;

Fig. 78 is a sectional view on line 78—78 of Fig. 77; and

Fig. 79 is a perspective view of the upper portion of a completely capped bottle.

Driving mechanism

The bottles 1 are suitably supplied to a stationary deck 2 carried upon posts 3 which are supported by the base 4 of the machine. These bottles have caps 5 initially loosely applied thereto, these caps being desirably constructed as disclosed in Figure 64d. The skirts of these caps are to be tightened about the bottle necks by the machine of my invention so as to underlie the beads 6 (Fig. 25) about the bottle mouths. The bottles, with the loose caps thereon, are fed through the chute 7 in position to be engaged by the teeth of the star wheel 8 which serve to continue the travel of the bottles as they leave the chute and to direct the same individually onto the vertically adjustable sections 9 of a disc-like table 10, these table sections being the preferred form of bottle positioners.

Any suitable mechanism may be employed for operating the various operating elements that are located above the deck 2. In the embodiment of the invention illustrated, an electric motor 11 may be employed for operating a main drive shaft 12. Power is transmitted to this drive shaft at adjustable speed through the intermediation of any suitable speed changing gearing 13. The shaft 12 has a worm 14 thereon which is in mesh with a worm wheel 15. The worm wheel is fixed upon a shaft 16 on which there are also fixed the spur gear 17 and the table 10. The shaft 16 is journalled at its upper end in a sleeve bearing 16′ carried by the spider 16² which is mounted upon the upper ends of the rods 16³ that are secured at their lower ends upon the base 4. This spur gear is in mesh with another spur gear 18 that is fixed upon a shaft 19 upon which shaft is also fixed the star wheel 8.

The bottle supporting table 10 is constantly turned and while turning, the sections 9 thereof are gradually elevated from the plane, proper, of the table and gradually restored to this plane, the final capping operation that is to be described occurring when said table sections are in their upper limits of their movements.

I provide a stationary cam track 20 upon which cam rollers 21 travel, to rise and fall. Each table section 9 is assembled with a cam roller so as to rise and fall therewith. As illustrated, each table section 9 is carried at the upper end of a spring barrel 22. A piston 23 is within the lower end of the spring barrel and is normally held in fixed relation therewith by means of a spring 24 which abuts at its lower end upon the piston and at its upper end against the top end wall of the spring barrel. A link 25 connects each piston 23 with one end of a bell crank 26 upon whose elbow the corresponding cam roller is journaled. The other end of this bell crank is pivoted upon arm 27 depending from a bearing support 28 which is fixed upon the shaft 16 and is located below the table 10.

As the shaft 16 turns, the cam rollers move bodily therewith over the cam track 20 to elevate and lower the table sections 9 to enable these table sections to function. As the shaft 16 and the parts thereon turn, the spring barrels 22 rise and fall due to the normally fixed relation of the piston 23 therewith. These spring barrels are guided in their movement by bearings 29 in the bearing support 28. If, in the final capping operation, the bottles should encounter undue strain, the springs 24 will yield to prevent the bottles from breaking, the pistons 23 then rising in the spring barrels.

A support 30 is in normally fixed relation with the shaft 16. This support has splined connection with the shaft 16 as indicated at 31 whereby it may be permitted movement lengthwise of the shaft. A bevel gear 32 has a nut formation 32' screwed upon the shaft 16 and has tongue and groove connection with the support 30 so that this support may be elevated and lowered along the shaft. A bracket 33 is carried by the support 30 and carries one bearing for the shaft 34 of the bevel pinion 35, the other bearing 36 for this shaft being provided in the support 30. The outer end of the shaft 34 is squared, Fig. 1, so that the bevel pinion 35 may be turned by hand to turn the bevel gear 32 that meshes therewith to turn nut 32' to elevate or lower the support 30. By this means, the chucks 37 which are carried by the support 30 through the intermediation of mechanism to be described, and which are provided to receive the tops of the bottles, may be elevated or lowered to suit the heights of the bottles being operated upon by the machine. Each table section 9 has a chuck 37 individual thereto and in vertical alignment therewith, each such table section and the chuck corresponding thereto co-operating to hold a bottle therebetween. A tapering guide 38 is interposed between each table section 9 and the chuck 37 individual to this table section, the guides being carried by brackets 39 that are carried by the support 30. The guides 38 serve to direct the upper ends of the bottles into the chucks 37 and also to gather the skirts of the caps about the bottle necks preparatory to the application of the tightening rings or bands about such cap skirts, in case these skirts flare too much.

Each cycle of operations occupies one revolution of the shaft 16 and support 30 and commences with the deposit of a bottle upon the table section 9 that is to receive it. After the bottle has been received upon the table section 9 that is to carry it, the table 10 and the table sections 9 turn a few degrees before the particular table section 9, in question, commences to rise to permit of some preparatory mechanical automatically effected adjustments. The bottle, in being raised, has its mouth end brought snugly into the chuck 37 overlying the table section 9 that carries such bottle. The bottle raises a solid plunger 40 which extends into the chuck 37. Each plunger has a stem 41 which is mounted to slide in a sleeve 42 which rotates in vertically aligned bearings 43 and 44. Each bearing 43 is held in place by a set nut 45 which passes through a sleeve 46. This sleeve 46 is an integral part of a bracket 47 which is bolted upon the top side of the support 30. When a plunger 40 is raised by the bottle beneath it, the upper end of the plunger stem 41 lifts the floating disc 48 that is co-axial with the plunger and the plunger stem. The disc 48 carries three upright pins 49 that slide within guiding holes formed in the inturned upper end of the extension 50 of sleeve 42. The upper ends of said pins thereupon lift the collar 51 which is loose upon the shaft 52 which is co-axial with and fixed with respect to the sleeve 42, this shaft being directly fixed upon the upper end of the sleeve extension 50. The groove of the collar 51 receives pins 53 provided upon the yoke lever 54 which is intermediately pivoted upon the shaft 55 that is journaled at the top end of the bracket 47. There is such a lever 54 at each bottle position, each lever constituting a part of a string or wire winding mechanism, there being as many such winding mechanisms as there are bottle positions. The base end of each yoke lever 54 carries an abutment 56 which is pressed upon by an upwardly spring pressed upright pin plunger 57. The spring 58 which presses upwardly upon the pin 57 is bottomed at its lower end upon the sleeve 59 which is slidable upon the pin 57 and presses at its upper end, upon the yoke 60 which is secured to the pin 57 and to the upright rod 61 which is slidable within bearing sleeves 62 and 63 carried by the bracket 47. When the plunger stem 41 is raised, the lever yoke 54 is turned clockwise to depress the pin 57 against the force of the spring 58. When thus depressed, the rod 61 is depressed. The adjustable nut 64 upon the rod 61 thereupon presses, at its lower end, upon one end of the bell crank 65 which is pivoted at its elbow upon the bracket 47. The other end of the bell crank is thereupon withdrawn from engagement with the detaining lug 66 which is provided upon the upper end of the sleeve 59. The bell crank lever 65, which thus functions as a detent normally to hold the sleeve 59 in its upper position, is withdrawn from its detaining position by the downward movement of the rod 61 to permit the spring 58 to depress the sleeve 59. This adjustment of the bell crank lever is effected against the force of the restoring spring 67 which is anchored at one end to the bracket 47.

A yoke 68 is carried by the sleeve 59 and itself carries pins 69 that are received within an annular groove formed in the clutch collar 70 that is splined upon the sleeve 42. Clutch collar 70 is formed with clutching formations upon each end thereof which are respectively complemental to the clutching formations upon the stationary clutch member 71 (constituting an extension of the bearing 43) and the rotatable clutch member 72. When the clutch collar or member 70 is in clutching engagement with stationary clutch member 71, said clutch collar is held from rotation so that the sleeve 42 is not then rotatable. The engagement of the members 70 and 71 is effected during the movement of the table section 9 from the time this table section has received a bottle and until such table section is about to be raised by the cam track 20. To this end, the sleeve 59 carries a cam member 59' which rides upon the roller 59$^2$ carried by the bracket 59$^3$ which, in turn, is carried upon the normally stationary gear carrier 59$^4$. This gear carrier is supported upon the non-rotating sleeve 59$^5$ to which it is keyed, a thrust ball bearing structure 59$^6$ intervening between the lower end of the sleeve and the support 30. A ring 59$^7$ is screwed upon the lower end of the sleeve and a collar 59$^8$ is secured upon the support 30 and overlies the ring to keep the sleeve 59$^5$ from rising. This sleeve is held from rotating by means of a pin 59$^9$ depending from the bearing 16' and which passes through and is in sliding relation with an arm 59$^{10}$ provided upon the sleeve 59$^5$. The members 70 and 72 are thus positively separated at the initiation of a cycle and are permitted to be engaged when the corresponding table section 9 rises providing there is a bottle upon this table section. If there is no bottle, the clutch member 70 will be held elevated by the detent lever 65 so that the cycle of operations, which is commenced by the inter-action of the elements 59' and 59$^2$, is not completed if the bottle is absent. When the clutch collar or member 70 is moved downwardly into clutching engagement with the clutch member 72, a result which occurs when a bottle lifts the corresponding plunger 40, said clutch collar is turned by said clutch member 72 to turn the sleeve 42. The clutch member 72 which is thus employed to drive the sleeve 42 is turned one and one-half times by the time the support 30 has turned a half of a revolution and is turned a half of a revolution during, approximately, the last one-sixth of the revolution of said support 30, all as will more fully hereinafter appear.

*Sealing element winding mechanism*

The sleeve 42 is provided for winding a strand of string or wire 73 about the skirts of bottle caps. The string is directed upon the skirts by being passed through a nozzle 74 which is carried upon the portion 42' of sleeve 42. The discharge end of the nozzle is located sufficiently away from the axis of the plunger stem 42 as to enable the nozzle, in being revolved around the bottle cap, to suitably apply the strand 73 to the skirt thereof. Each chuck 37, which is individual to each table section 9, has a string winding mechanism individual thereto. Each string winding mechanism has a reel 75 which is journaled upon the upright shaft 76 that is coaxial with the shaft 52, the shaft 76 being secured to the upper end of a yoke 77 whose lower end is secured to the shaft 52 whereby the two shafts turn together with the sleeve 42. A spring 78 abuts against a washer 79 which is positioned by a nut 80 screwed upon the upper end of the corresponding shaft 76. The lower end of said spring 78 presses down upon the disc 81 that bears against the upper side of the reel 75 to hold the lower side of the reel against the flange 82 of the yoke 77. The reel 75 is thus prevented from turning with respect to the shafts 76 and 52 any faster than it is so turned by the string 73 being withdrawn therefrom. The spring 78 also takes part in adjusting the tension upon the string being wound about the botle cap, the adjustment of the spring determining the degree of tightness of the winding of the string about such cap. The string 73 is passed from the corresponding reel 75 over the idler pulleys 83, 84 carried by the bracket 85 which is an integral part of the yoke 77. The string, after having left the idler pulley 84, is passed through the upright guide tube 86 which is fixed with respect to the sleeve 42 and which passes through this sleeve and the shaft 52. Said tube is disposed alongside of the axis of rotation of said sleeve and is located between this axis and the nozzle 74. The string, after issuing from the lower end of the tube, passes over the idler pulley 87 which is journaled upon the sleeve 42. The string, after having passed through the pulley 87, passes over the guiding lug 88 carried by the nozzle 74, this lug directing the string through the nozzle outlet opening 89. The string, where it is about to enter the nozzle end 89, is pressed against a side of the nozzle by the block 90 which, in turn, is pressed upon by the leaf spring 91.

By mechanism to be presently described, the leading end portion of the string which has passed through the nozzle, is clamped between the members 92 and 93 which constitute an anchorage for this leading end of the string in order that the string may be held, at one end, during the rotation of the nozzle, about the corresponding bottle neck, the string thus remaining clamped while the nozzle turns one and one-half times about the bottle neck. The nozzle and the clamp thus constitute strand holders. The clamping action effected by the members 92, 93 is accomplished at the initiation of a cycle of operations and during the time that the members 59', 59$^2$ interact to separate the clutch members 70 and 72. The clamping member 93 is stationary, being desirably part of the stationary tapering guide 38. The clamping member 92 is upon one end of a lever 97 which is intermediately journaled upon a shaft 98 that is itself journaled in bearings 99, 100 carried by the brackets 47 and 39 respectively. An arm 101 is fixed upon the shaft 98. The stem of a bolt 102 passes through the lever 97 and the arm 101 and is surrounded by a spring 103. This spring has one end in engagement with a washer 104 which is adjustable in position by a nut screwed upon the stem of the bolt. The other end of the spring engages the arm 101 and presses the head of the bolt against the lever 97. The spring, when permitted to function, operates through the bolt, lever and arm to apply the clamping member 92 to the spring. One end of a lever arm 105 is secured to the top end of the shaft 98 and carries a cam roller 106 at its other end. This cam roller enters a cam slot 107 formed in a normally stationary cam 108 which is carried by the upper end of the nonrotating sleeve 59$^5$. This cam slot is so shaped that the clamping member 92 will be applied just as soon as the cycle of operations is initiated and will remain applied until after the overlapping string ends are waxed or cemented together and the cement or wax is hardened. The string is severed, at the nozzle, just before the clamping member 92 is released, which release occurs upon the arrival of the cam roller 106 at a suitably shaped portion of the cam slot 107 as indicated in Fig. 4. When the nozzle has been turned once and a half times about the bottle neck, the cementing or waxing device is brought into operation, as will later appear.

The gearing for turning the clutch member 72 which turns the sleeve 42 through the intermediation of the clutch members 70 and 72, as hitherto described, is inclusive of a spiral gear 109 fixed upon and coaxial with the clutch member 72, a spiral gear 110 meshing with the gear 109 and fixed upon a shaft 111 which is journaled at its ends in the bracket 47 that bodily rotates with the support 30 carrying it, and the stationary segmental spiral rack 112 which is coaxial with the shaft 16 and which is carried by the normally stationary gear carrier 59[4]. A space intervenes between the entering end of the rack 112 and the gear 110 at the commencement of the cycle of operations so that there will be no rotation of the nozzle 74 while the bottle is being elevated. The gear 110 is positively held from rotation until it enters into mesh with the rack 112 by means of the stationary feather 113 which passes through a radial slot in said gear. Previously to the meshing of the gear 110 with the rack 112, the clutch members 70 and 72 were engaged by the action of the elevated bottle. If there happens to be no bottle in place upon a particular table section 9, the clutch members 70 and 72 will not be coupled so that there will be no rotation at all of the nozzle during the travel of said table section 9 owing to the separation of said clutch members. A thrust ball bearing structure 114 is interposed between the clutch member 72 and the support 30, another thrust ball bearing structure 115 is interposed between the support 30 and the enlargement 42' of the sleeve 42, and a third thrust ball bearing structure 116 is interposed between the sleeve enlargement 42' and the top of the chuck 37. The ball bearing structure 116 prevents the rotating sleeve 42 from turning the chuck 37, the rotation of the bottle by said sleeve 42 thus being prevented. It is understood that the cycle of operations commences at the left hand side of the constantly rotating support 30. The nozzle revolving operation ceases when said support 30 has about completed one-half of a revolution, that is, when the gear 110 leaves the stationary rack 112 whereupon said gear receives another stationary feather 117 to guard against incidental rotation of said gear.

*Cement applying mechanism*

I will first describe the mechanism that is employed to direct the flow of metal cement upon the wire after it has been applied to a bottle cap and the means by which the wire cement is prepared for its application to the wire. The metal cementing substance is received in a pot 119 which is heated by electrical resistance units 120 in close proximity to the pot, as illustrated most clearly in Figs. 12 and 19. The pot is carried by the yoke 121, being positioned upon this yoke by the upright rods 122 on the yoke that pass through eyes 123 formed upon the pot. The yoke 121 is carried by the clamps 121' which are clamped upon two of the rods 16[3] in order that the height of the pot may be suited to the level of the bottles being operated upon. The pot carries two nozzles 124 and 125 which are positioned to direct the heated sealing cement upon the wire 73 where this wire crosses, the nozzle 124 supplying a portion of the total sealing cement that is to be applied to the wire and the nozzle 125 supplying the remainder of the sealing cement that is to be applied to the wire, the preferred form of product being illustrated in Figs. 24 and 25. The nozzles are in the form of sleeves having inturned discharge ends where the nozzle orifices 124', 125' are provided. These sleeves enclose plugs 126, 127 which have spiral passages in their outer surfaces as indicated most clearly at 128 in Figs. 13, 14, 16 and 17. A space intervenes between the front or delivery end of each spiral passage and the corresponding discharge orifice. The melted sealing cement whirls in this space in a somewhat solid mass instead of sprayed form so that it will issue through the nozzle orifice in a somewhat solid stream, instead of in a spray. The flow of the melted or fluid cement through the orifices is promoted and directed by the truncated conical or tapering portions upon the front ends of the plugs, one of these conical portions 129 being shown in full lines in Figs. 13, 14, 16 and 17 and the other conical portion 130 being shown in dotted lines in Fig. 14. The nozzle orifices 124', 125' are of narrow elongated form and the nozzle sleeves 124, 125 are mounted in such relatively adjusted positions, in view of the distance the cement must travel between the nozzles and a bottle and in view of the tendency of the cement to whirl or rotate during such travel, that the cement will be applied to the wire in the form of an oval whose major axis is in the plane of the wire, this result being furthered by the cooperation of the truncated conical portions 129 and 130 as they are related to the nozzle orifices. The cement pot 119 has a revolving bottom 131 coaxial with the pot. This bottom is fixed upon the turns with an upright shaft 132 which is journalled upon bearings 133 carried by the bracket 134 which, in turn, is carried by the yoke 121. The shaft 132 carries a collar 135 which is pressed upwardly by a spring 136 which surrounds the shaft, the lower end of this spring being bottomed upon the lower one of the two bearings 133. The spring thus serves automatically to compensate for any wear upon the top of the bottom of the pot. The bracket 134 and yoke 121 have tongue and groove engagement whereby the tension of the spring may be adjusted. A ratchet wheel 137 is fixed upon and is coaxial with the pot bottom 131. The upper surface of the pot bottom is formed with radial grooves in the form of pockets 138, there being as many such pockets 138 as there are teeth upon the ratchet wheel 137. These pockets are normally uncovered so as to receive cement from the pot. Two of the pockets are, at a time, covered by the closures 139 formed upon the interior of the pot and, when any two pockets are thus covered, they communicate at their outer ends with the outlets 140 in the pot, which outlets are in communication with the spiral grooves 128 in the aforesaid plugs 127. The inner ends of the pockets that are covered by the closures 139 are in communication with the air passages 141 and 142 to which air is supplied under pressure from the pipes 143 and 144 that convey air from the pressure tank 145.

By mechanism which will be presently described, the air is first directed through the pipe 143 and the nozzle 124 to furnish a part of the cement for the overlying wire whereafter the air is directed through the pipe 144 and is cut off from the pipe 143, the air passing through pipe 144 directing the remainder of the cement that is to be applied upon the wire. After the two pockets that are covered by the closures 139 are thus emptied, the ratchet wheel 137 is turned another step, in the next cycle of operations, to replace the two filled pockets in their association with the nozzles and the air pipes.

The preferred form of mechanism for operating the ratchet wheel and for regulating the flow of air through the pipes 143, 144 will now be described. This mechanism includes a master cam 146 which serves to operate the mechanism, this master cam being provided upon the yoke 68, vertically movable in the manner hitherto described, whereby it is lowered to an operative position if there is a corresponding bottle in place and is held raised from this operative position if there is no corresponding bottle in place so that, in the latter event, no cement will be blown during the complete revolution of the support 30 that occurs during the operation cycle pertaining to such revolution which is rendered incomplete due to the absence of the bottle. When the yoke 68 has been lowered as a consequence of the presence of a bottle on the table section 9 beneath it, the master cam 146 is lowered into the zone of the cam rollers 147 and 148 upon the lever 149 which is secured between its ends to the pin 150 that is journaled in bearings 151 carried by the bracket 152. This bracket is secured upon the rods 122 by the set bolts 153 and is also secured upon two of the rods 16³ by means of clamps which are similar to clamps 121'. As will hereinafter appear, when the master cam 146 engages the cam rollers 147, it turns the lever 149 clockwise to turn the ratchet wheel 137 a tooth space and to admit cement ejecting air to the pipe 143. When the master cam 146 operates upon the cam roller 148, the lever 149 is turned counter-clockwise to admit cement ejecting air to the pipe 144, the ratchet wheel 137 then being held stationary by the action of the spring 136.

The end of the lever 149 which is adjacent the cam roller 148 is connected by means of a link 154 with one end of the lever arm 155 whose other end is secured to the shaft 156 which is journaled in the bearing 157 formed upon bracket 152 and the bearing 158 upon the support 159 which also carries the cement pot 119, this pot being bolted to the support by the bolts 160. The support 159 is also secured to the rods 122 by means of the set bolts 161. Another lever arm 162 is also fixed upon the shaft 156. As the gear 110 is about leaving the rack 112, the cam 146 is brought into engagement with the roller 147 to place the parts in the position shown by full lines in Fig. 11 and as illustrated in Fig. 12. When the parts are being placed in this position, the lever 162 is turned in a clockwise direction whereby the rod 163, which is pivotally connected to an extension 162' of the lever 162, is pulled upon to draw the flange 164 upon said rod 163 against one end of the spring 165 whose other end is bottomed upon the arm 166 that is integrally formed with a bell crank lever 167 which is journaled at its elbow upon the shaft 156. The lever 167 is thus moved, through the intermediation of the spring 165, in a clockwise direction, whereby the actuating pawl 168 operates upon the ratchet wheel 137 to move this wheel a tooth space whereby the cement receiving pockets 138 that were emptied upon the previous cycle of operations are moved from their connections with nozzles 124, 125 and the pipes 143 and 144 and whereby the succeeding pockets, which are filled with hot metallic cement, are placed in connection with said nozzles and pipes in substitution for the emptied pockets. The pawl is held in engagement with the ratchet wheel by the spring 169 which is connected at one end with the pawl and at the other end with lever 167.

The bell crank lever 167 should be limited to a normally fixed range of arcuate movement in order that the ratchet wheel may be turned exactly one tooth space each time it is operated by the pawl so that the cement holding pockets that are newly brought into connection with the nozzles and the pipes are accurately positioned.

To this end, the lever 167 is provided with an abutment post 170 which engages the fixed abutment 171 upon the support 159. The post 170 is desirably in the form of a bolt in order that it may be adjusted. After the ratchet wheel 137 has thus been turned to a new position, the lever 162 continues its clockwise movement, being permitted so to do by means of the spring 165 which thus constitutes a yielding coupling between the levers 162 and 167. Following the positioning of the ratchet wheel to its new position for the purpose stated, a valve 172 is opened, this valve being included in the pipe 143 that supplies cement ejecting air under pressure from the tank 145 to the cement holding pocket that is in communication with the nozzle 124. This valve is inclusive of a spring 173 which constrains the valve to a closed position and the stem 174 which is engageable by a post 175 carried by the outer end of the lever arm 162. As hitherto stated, the valve is opened after the ratchet wheel has been moved to its new position, the engagement of the post 175 with the valve stem 174 occurring after this turning movement of said wheel. During the initial portion of the engagement of the gear 110, employed in the cycle under description, with the feather 117, the cement supplied to the wire where lapped or crossed upon the cap skirt is allowed to cool. A little later and still during the engagement of said gear 110 with said feather 117, the valve 176, which is included in the pipe 144, is opened to permit air under pressure to pass through this pipe to eject cement through the nozzle 125 upon the patch of cement previously applied to the wire through the nozzle 124. The lever 162 is moved counter-clockwise to release the valve 172 and open the valve 176 by the cam 146 when this cam reaches and operatively engages the cam roller 148.

The mechanism of valve 176 is similar to the mechanism of valve 172, there being a spring 177 which constrains the valve 176 to a closed position, the valve 176 having a stem 178 which is engageable by a post 179 upon the lever 162 when this lever is moved counter-clockwise as stated. The posts 175 and 179 are adjustable in order to secure proper timing in the operation of the valves. The master cam 146 escapes the cam roller 148 while the gear 110 employed in the cycle being described is still in engagement with the feather 117, the spring 177 then being permitted to close the valve 176. While the aforesaid gear 110 is still in engagement with the feather 117, the second portion of cement that was applied to the wire has time to cool. The cap skirt desirably has nothing upon it except the wire that surrounds it and the cement which is allowed to spread upon the cap skirt so that the cement not only serves to cement the lapping or crossing portions of the wire together but also to secure the wire to the cap so that the wire may not be shifted with respect to the cap without detection. I do not wish to be limited to the cementing of lapping portions of the wire to each other since it is obvious that the wire may be cemented to the cap skirt without having lapping or crossing portions of the wire cemented to each other.

Sealing cement severing mechanism

The mechanism for severing the wire is inclusive of a normally stationary knife 180 and a swinging knife 181, these two knives together constituting a pair of shears. Both knives are carried upon the post 182 which is provided upon the end of a lever 183 which is journaled upon a shaft 184 carried upon a bracket 185 which is carried by a yoke 186. This yoke is carried by clamps 187 that are clamped upon two of the bars 16³ whereby the shears may be adjusted vertically to suit the adjustment of the other parts that are made to suit the bottles being operated upon. The knife 181 is a part of a bell crank which is journaled at its elbow 188 upon the post 182. The end of the bell crank which is opposite the end where the knife 181 is formed moves between two stops 189 and 190 which are provided upon and within the hollow carrier 191 which is secured upon the yoke 186. When the support 30 turns sufficiently, the arm of the knife 181 between the stops 189, 190 is moved into contact with the stop 189 with the result that the knife 181 is rotated on its pivot 188 and thus caused to cooperate with the stationary knife 180 to sever the wire which is received between the two knives. When the wire has been severed, the aforesaid arm of knife 181 is moved into contact with stop 190, causing knife 181 to swing away from knife 180. The two knives are normally withdrawn from the path of the wire and are positioned to receive the wire between them when the wire is to be cut. To this end, the lever 183 which carries the knives is controlled by the spaced apart cams 192 and 193, these cams being provided upon the rotating support 30. The cam 192 first engages the cam extension 194 of the lever 183 to swing the knives into a position in which the wire will be between them whereupon the knives are brought together in the manner described and as illustrated in Figs. 22 and 23. When the wire has been cut, the knives are together moved to their outer position away from the wire, the lever 183 being suitably swung for this purpose by the cam 193 which engages the cam 195 fixedly upon the shaft 184 upon which the lever 183 is fixed.

Very shortly after the knives have been withdrawn, the gear 110 leaves the feather 117 whereupon this gear engages the arcuate segmental gear rack 196 which is carried by the gear carrier 59⁴ and is in the same plane with the rack 112. During this engagement of the gear 110 with the rack 196, the nozzle is turned a half revolution to bring the end of the wire projecting from the nozzle between the clamping members 92, 93, whereupon this wire end is clamped in the manner hitherto described, this clamping operation occurring upon the initiation of the next cycle. After the wire cutting operation and before this clamping of the wire is effected, the table section 9 carrying the bottle operated upon is lowered and the bottle is discharged from the machine, this discharge of the bottle being the conclusion of the cycle of operations under description. This bottle is discharged by one of the teeth of the star wheel 197 which star wheel is secured to the table 10. The tooth of the star wheel that engages this bottle forces the bottle to leave the table 10 and causes the bottle to enter the chute 198 that directs the bottle upon the deck 2 from which the bottle may be moved by an attendant.

Where the material used by the machine of my invention for forming a fastening around the skirts of the closure caps, is a binder of metal, that is wire already coated with a suitable metallic cement, certain principles of the machine described above are employed. The general details and arrangements of the bottle positioner, bottle "chucking" mechanism, the revolving table 10 and allied mechanism, the strand winding mechanism and other parts of this embodiment illustrated in Figs. 27 to 43, each inclusive, are similar to those shown in Figs. 1 to 10 inclusive and described above. A change however is required in the clamping member 92' as shown in Figs. 31 and 32 which is pivoted at 94 upon a bracket 95 that is carried by the guide 38. Said clamping member is formed with a slot 96 which receives the spherical end of a lever 97' which is intermediately journalled upon a shaft 98 that is itself journaled in bearings 99, 100 carried by the brackets 47 and 39 respectively.

The operation of the clamping member 92' through the lever 97' is otherwise the same as already described with respect to the string, the operation of the clamp being effective during the rotation of the nozzle and until after the overlapping ring or wire portions are cemented together and the cement or solder hardened. The wire is severed at the wire nozzle just before the clamping member 92' is released. When the wire nozzle has been turned one and one-half times about the bottle neck the fluxing device is brought into operation as will later appear.

Cement applying mechanism

By mechanism which will be presently described, the lapping or crossing portions of the wire that has been passed about a bottle cap are soldered together, this soldering operation occurring during the initial portion of the engagement of the gear 110 with the feather 117, the cooling of the solder occurring during an ensuing portion of this engagement and the severing of the wire at the wire nozzle occurring during the concluding portion of such engagement as will hereinafter appear.

The cement employed is desirably one which will fuse in response to heat and is desirably in the nature of solder, as indicated at 118. The string is preferably metallic, particularly if the cement is in the nature of solder. The solder is desirably present upon and about the wire before the wire is employed in the machine. That is, the wire is so-called tinned wire and is supplied as such from the reels 75. The invention is not to be thus limited, however, nor is it to be limited to the soldering or cementing of lapping ring portions nor to the lapping ring portions. By the winding mechanism which has been described, the wire is closely wrapped about the cap skirt about one and one-fifth times the circumference of the cap skirt so that there is provided a cap contracting ring having mutually lapping portions, Fig. 43, it being these mutually lapping portions that are soldered together by fluxing the solder that is on the wire and allowing the solder to cool to hold said lapping portions in ring contracting relation. The wire of the ring is continued beyond the soldered together mutually lapping portions of the ring so that the wire may be grasped, where unattached, to tear the mutually lapping portions of the ring apart when access is to be had to the bottle.

Where the cement is fluxed by heat and the heat is furnished by an electric current, I employ two contacts 200, 201 which project from metallic spring barrels 202, 203, these contacts being inwardly pressed toward the wire by springs 204 within said spring barrels. The spring barrels slide within insulating sleeves 205, 206 which are carried by and are in fixed relation to the guide 38, Fig. 34. The sleeves 205 and 206 are desirably so positioned that the contacts 200 and 201 are at the ends of the lapping portions of the wire ring that are to be soldered together. Current is passed through the circuit that includes the spring barrels 202, and 203 and the contacts 200 and 201 from the battery 207, mechanism being provided for withdrawing the contacts from engagement with the wire when the circuit has endured sufficiently long to melt the solder in order that the solder may be allowed to cool, these results occurring while the gear 110 still engages the feather 113. The mechanism for thus controlling the circuit is desirably inclusive of two arcuate contacts bars 208 and 209 which are assembled by bolts 210 which pass through circular openings in bar 209 and the arcuate opening 211 in bar 208. These bars are suitably insulated from the bolts by means of the insulating sleeves 212 and the insulating washers 213, the sleeves 212 being shouldered to receive the bar 209, the reduced ends of these sleeves passing through the circular holes in this bar. The two bars may be relatively adjustable longitudinally of each other to regulate their aggregate length, the two bars being thus in effect a bar whose effected length is adjustable.

The mechanism for controlling the circuit is also inclusive of a single bar 214 (Figs. 34 and 37) which is mounted upon a yoke 215 by the aforesaid bolts 210. This yoke is carried by clamps 216 that are clamped to two of the rods 163. By means of these clamps, the yoke 215 may be adjusted vertically to suit other adjustments that are made according to the size of the bottles being operated upon. The bars 208 and 209 are also carried by the yoke 215 through the intermediation of the insulating sleeves 212 which have other reduced ends that are received in circular holes in the bar 214. The bolts 210 after passing through the sleeves 212 pass through insulating washers 217, and are screwed into the cam extension 218 of the yoke 215. The bars are thus insulated from the yoke 215 and the bar 214 is likewise thus insulated from bars 208, 209, the latter two bars being in electrical connection. An additional bolt 219 may be employed for directly assembling the far end of the bar 214 with the yoke, this bar 219 being insulated from the yoke 215. The spring barrels 202, 203 are provided with shanks 220 of reduced diameter, these shanks being received in insulating sleeves 221 that are provided in the cross head 222. The spring barrels are clamped in assembly with the cross head by means of nuts 223 which are screwed upon the outer threaded ends of the shanks of spring barrels. Wipers 224 and 225 are clamped into electrical and mechanical assembly with the spring barrels by means of nuts 226 that are also screwed upon the threaded ends of the shanks of spring barrels. The wiper 224 has sliding contact with the arcuate contact bar 214. The wiper 225 has sliding contact with the arcuate contact bars 208, 209. A cam roller 227 is carried by the cross head 222 and is adapted to ride upon the cam 218. During the initial portion of the engagement of the gear 110 with the feather 117, the cam roller 227 is in engagement with the cam 218, to press the cross head inwardly to engage the contacts with the wire. Current from a battery opposed by the resistance of the wire and its solder causes sufficient heat to melt the solder which fluxes where the wire laps. The duration of the circuit is adjusted by relatively adjusting the two bars 208, 209, as will be apparent. When the contact wiper 225 leaves the contact bar 208, the circuit is opened. The contacts are also separated at this time, a result which is accomplished by means of the spring 228 that surrounds the post 229 which is screwed into the guide 38 and which has a head upon its outer end against which the spring thrusts the cross head when the cam roller 220 has left the cam 218.

After the circuit is opened, the gear 110 continues in engagement with the feather 117, the solder cooling after the circuit is opened. After the cooling of the solder has been completed which occurs near the termination of the engagement of the gear 110 and the feather 117, the wire is severed at the nozzle while still under tension between the wire nozzle and the clamp 92, 93.

The mechanism for severing the wire has already been described above in connection with Figures 1 to 25 and requires no further specific description. In like manner the movement of the wire nozzle for a half revolution to bring the end of the wire projecting from the wire nozzle between the clamping members 92, 93 occurs through the engagement of gear 110 with the rack 196 and thus prepared for a subsequent cycle of operation as has already been described.

*Sealing element applying mechanism*

In the modified form of my machine illustrated in Figs. 44-58 inclusive in which the strand ends are twisted together, the bottles 1 are supplied to the deck 2 and advanced by the star wheel 8 onto the disk-like table 10 as previously described. It will be understood that the bottle supporting table 10 is turned and the sections 9 thereof elevated and lowered during the cycle in which the capping operation is carried out.

A support 30 (Fig. 47) is in normally fixed relation with the shaft 16. This support has splined connection with the shaft 16 as indicated at 31 whereby it may be permitted movement lengthwise of the shaft. A large split nut 232 is screwed upon the upper end of the shaft 16 and has tongue and groove connection with the support 30 so that this support may be elevated and lowered along the shaft. A hand wheel 233 is provided upon the nut 232 to facilitate the turning thereof. The support 30 carries the balance of the mechanism that is complemental to the table sections 9 and the mechanism for fastening the caps upon the bottles. The support 30 is circular and concentric with the shaft 16. The periphery of this support is closely received between rollers 234 that project laterally from the sleeves 235, whereby these sleeves are assembled with and are carried by said support. These sleeves are adapted to slide upon the upright guide rods 236. Those guide rods carry the spider 237 at their upper ends, this spider carrying the sleeve bearing 238 for the upper end of the shaft 16.

Yokes 239 are bolted to the upper side of the support 30, each table section 9 having a yoke individual thereto and located immediately above the same to be in line therewith. Each yoke straddles an opening 240 in line with the corresponding table section 9, this opening being sufficiently large to permit of the free passage of the bottle neck therethrough. Each yoke carries a chuck 241 also constituting a bottle positioner and which is in the form of a shell in line with the corresponding underlying table section 9. The chucks are somewhat in the shape of bells that are flared at their lower ends and which are slotted at their lower ends to be spring-like. When the table sections 9 are elevated to a predetermined extent, the mouth ends of the bottles and the caps thereon are snugly received in the chucks so that the bottles and their caps are properly centered with respect to the wire or string applying mechanism of my invention. Each yoke carries a horse-shoe or looped shaped guide 242 formed with a wire receiving groove 243, the spaces within these guides being aligned with the corresponding chucks 241 and table sections 9. The loop shaped guide 242 is in alignment with the underlying bottle supporting table section when this table section is brought to rest to have the closure cap secured to the mouth of the bottle on this table section. Each chuck 241 and guide 242 is in association with the wire shaping and applying mechanism of my invention, there being one such mechanism individual to each such chuck and guide, numerals applied to each such mechanism being similarly applied to other of such mechanisms. Each wire applying mechanism, in addition to the guide 242, also employs two holders preferably in the form of grippers constructed as illustrated in Fig. 49. Each gripper is inclusive of a jaw 244 integrally formed with a gripper supporting arm 245 and a jaw 246 complemental to the jaw 244 and pivotally connected therewith by the pin 247. The jaw 246 of each gripper is formed with a cylindrical opening 248 through the front half thereof. The strand of wire 249 which is fed from the reel 250 and is threaded through the openings 248 is received in the corresponding groove 243 to form a loop which is initially U-shaped as shown in Fig. 50. When the strand of wire has received this initially U-shaped loop, it is severed by the knife 251 to make the loop of desired length and to give the loop its second free end, it being preferable to have two free ends upon the loop before exercising the twisting operation thereof. The wire cutting operation will be later more fully set forth. The loop which is formed in the strand is in a plane which is angular to the axis of the neck of the bottle on the positioner in order to receive said bottle neck when the positioner and loop forming mechanism have been suitably relatively adjusted along the bottle axis. After the loop has been severed, the ends thereof are twisted together, by mechanism which will be described, to form the loop into a ring and to contract the ring about the skirt of the cap.

After the wire cutting operation, the gripper or holder supporting arms 245 are moved from the initial positions shown in Fig. 50 to their crossed relation shown in Fig. 52 in which operation the jaws 246 are turned by the wire from their positions shown in Fig. 50 to the positions thereof shown in Figs. 52 and 53 whereby the ends of the wire loops are gripped. To ensure the hold of the grippers upon the ends of the wire loop, these loop ends are bent as indicated at 252. The bending of the wire is caused by the shoes 253, 254 which are carried upon the support 30 the shoe 253 being carried by and integrally formed with the wire guide 255 that directs the wire from the corresponding reel 250, while the shoe 254 is carried by the corresponding yoke 239. The gripper arms, in being crossed, tightly encircle the wire loop about the corresponding bottle cap, the bends at 252 in the wire preventing the wire from being withdrawn from the grippers. After the gripper arms have been crossed to cross the sides of the loop as indicated in Fig. 52, the gripper arms are turned to twist the wire as indicated in Fig. 53, the gripper arms being turned, say, to twist the wire twice, as indicated in Fig. 53. After the wire has been twisted as indicated in Fig. 53, the rotation of the gripper arms is stopped whereafter they are uncrossed, as indicated in Fig. 54. In this uncrossing operation, the twisting of the wire loses one-half of a turn and the bends at 252 are somewhat straightened. When the gripper arms are uncrossed, the jaws 246 are brought into their initial adjustment to permit of the passage of the wire therethrough, Figs. 50 and 54, by means of the stops 256 carried by the yoke 239.

The mechanism for operating the grippers and the knife 251 and the mechanism for feeding the wire will now be described. Each cycle of operations commences with the bottle that is placed upon the table section 9 by the star wheel 8, that is, each cycle of operations commences with the bottle that is in the extreme left hand position with the table section 9, that supports the bottle, in its lowermost position. The table 10, together with its movable sections 9, and the support 30 are rotated together constantly and at a uniform rate. During the first portion of the turning movement of said table and support, about one-eighth of a revolution, the table section 9 which supports the left hand bottle is raised by the cam track 20. During the next one-eighth of the revolution of said table and support, the wire is caused to be fed from the reel 250 that is individual to said raised table section 9. Each mechanism for feeding wire is inclusive of grooved wire feeding discs 257 and 258 turning in the same plane with the wire grooves thereof matching to receive the wire together, meshing spur gears 259 and 260 respectively fixed upon and coaxial with said discs, a shaft 261 carrying the disc 258 and spur gear 260, a bevel pinion 262 fixed upon the shaft 261, a bevel pinion 263 meshing with the pinion 262, a mutilated spur pinion 264 fixed upon the shaft that carries the pinion 263, and the stationary arcuate gear segment or rack 265 carried by the normally stationary gear carrier 266, this gear carrier being carried by the sleeves 235 so that it may be adjusted together with the support 30, to suit the height of bottles being operated upon. A bracket 267 carries the shafts upon which the elements 258 to 264 inclusive, of each wire feeding mechanism, are respectively fixed. A disc 268 is fixed upon and is coaxial with each mutilated pinion 264. The pinions 264 and rack 265 are in one zone and the discs 268 are in another zone. Each disc 268 has a flattened edge portion 268' which is engageable with a normally stationary segmental track 269 in the same zone therewith, the track 269 and the rack 265 being coaxial. During the rotation of the support 30 and table 10, the mutilated pinions 264 are brought into mesh with the rack 265, this meshing occurring during the second one-eighth revolution of said support and table. During this one-eighth of a revolution, the wire feeding discs 257 and 258 are turned to feed the wire through the guide 255 a length corresponding to the length of the loop of wire that is to be wrapped about a bottle neck. At the conclusion of this one-eighth of a revolution, the flattened side of the corresponding disc 268 is brought into engagement with the arcuate track 269 to prevent further rotation of the corresponding pinion 264 so that the corresponding wire feeding mechanism will be arrested from further feeding operation until the next cycle of operations. After the wire has been thus fed, the knife 251 is operated to shear the wire, this operation occurring during a few degrees of the succeeding turning movement of the table 10 and support 30. The knife 251 is carried by one end of the bell crank lever 270 which is pivoted at its elbow upon the bracket 271. The other end of the bell crank carries a roller 272. A spring 273 presses the bell crank in a counter-clockwise direction, Fig. 55, to an extent which is limited by the engagement of the lug 274 on the bell crank with the bracket 271. The various rollers 272 upon the various bell cranks 270 are normally positioned to be in the same zone by the various springs 273. A single cam post 275, common to all the rollers 272, is stationarily mounted upon the stationary gear carrier 266 and extends into the normal zone of the rollers 272 to an extent to depress the roller presented thereto sufficiently to move the corresponding knife 251 in a wire shearing direction. After the post 275 has been passed, the corresponding spring 273 restores the corresponding knife to normal position.

During the next few degrees of the turning movement of the table 10 and support 30, the gripper arms 245 are crossed. To this end the two gripper arms of each wire applying mechanism are journaled on spaced apart pins 276 carried by a head or support 277 which is preferably in the form of a rotatable yoke. The pivoted ends of the arms are provided with arcuate gear segments 278 that mesh with the racks 279 carried upon and preferably integrally formed with a reciprocable rod 280. When the arms are to be adjusted from the uncrossed position illustrated in Fig. 50 to the crossed position illustrated in Fig. 52, to interchange the positions of the grippers with respect to support 277, the rod 280 is moved inwardly and when the arms are to be uncrossed, said rod is moved outwardly. As the arms are being crossed, the angular ends thereof contact with the skirt of the cap 5 in the region where the wire is initially crossed so that the cap skirt is depressed at this place against the bottle neck. By this means, the cap skirt is prevented from bunching where the wire is crossed and sufficient clearance is afforded between the wire where crossed and the cap skirt to permit the twisting of the wire to come close against the cap skirt as illustrated in Fig. 53. Means for moving the rod 280 of each wire applying mechanism is inclusive of a fixed cam 281 having a cam groove receiving a roller 282 upon one end of an arm 283. The other end of this arm is coupled with a shaft 284 through the intermediation of an angular extension 285 provided upon the arm, a rod 286 passing through this angular extension, a spring 287 surrounding the rod and bearing at one end against a nut 288 on the rod, and an arm 289 fixed upon the shaft 284 and pressed upon by the other end of the spring 287. A square shaft 290 is received and slidable within a sleeve 291 having a square bore and carried upon the upper end of the extension 292 of the shaft 284. An arm 293 is fixed, at one end, upon the upper end of shaft 290 and carries a pin 294 at its other end. This pin 294 is received within an annular groove 295 formed in a collar 296 that is secured upon the corresponding rod 280. The shafts 284 pertaining to the various wire applying mechanisms on the machine are journaled in the bearing support 28 to turn with respect thereto and to travel therewith. The cam 281 being stationary, the rods 280 of the various wire applying mechanisms are lineally moved at proper intervals to cross and uncross the gripper arms 245.

The gripper arms which have been crossed to draw the loop tightly against and almost completely about the bottle neck, as indicated in Fig. 52, are together turned to twist the wire whereafter these arms are uncrossed. The mechanism for turning each pair of gripper arms is inclusive of the head or support 277, the sleeve extension 294 in which sleeve extension the corresponding rod 280 is slidable, the roller bearing 298 in which said sleeve extension is journaled, this roller bearing being mounted upon the support 30, the mutilated bevel pinion 299 fixed upon said sleeve extension and employed to turn such extension to turn the corresponding gripper arms at the proper time, the arcuate or segmental rack 300 upon the normally stationary gear carrier 266, the disc 301 also fixed upon said sleeve extension 297 and located alongside of said pinion 299, and the segmental arcuate track 302 located in a different circle from the circle that contains the rack 300, these circles being coaxial. When the support 30 has been turned sufficiently to complete the crossing of the jaws, the pinion 299 that is to be operated in the cycle of operations being described, engages the rack 300 whereby the corresponding head 277 is turned to turn the gripper arms to twist the wire as indicated in Fig. 53. When the gripper arms have been turned twice, the flattened edge of the disc 301 is brought into engagement with the track 302 to prevent the pinion 299 from being further turned in order to arrest further rotation of said arms.

In Fig. 56, rack 300 is not illustrated in the position it actually occupies in Fig. 51 but is so shown for sake of illustration, Fig. 56 being correct in this respect if it is not coupled with Fig. 51. In Fig. 56, the pinion 299 is entering upon its revolution.

The twisting revolutions of the gripper arms are concluded shortly after the first half of the cycle of operations being described has been completed. During the succeeding few degrees of turning movement of the support 30, the arms, which are not now being revolved, are uncrossed by the outward movement of the corresponding rod 280, a result which is due to the co-action of the cam elements 281 and 282 which control said rod in the manner hitherto described. By the time the support 30 has completed three-quarters of its revolution, the bottle having the cap secured thereto by the twisted wire is lowered, the corresponding cam roller 21 then riding down on the cam track 20. During the remaining quarter of the revolution of the support 30, the fully capped bottle is discharged from the table 10 by the star wheel 303, this star wheel serving to transfer the bottle to the table 2 from where it can be removed by an attendant.

The table 10 with its section 9 are preferably rotated to bring the bottle to the various stations at which the wire is fed, cut, twisted and released from the grippers or holders; but the invention is not to be limited to the direction of travel of the bottles and the table members 9 to the va-

Sealing band applying mechanism

As shown in my application Serial No. 77,850 filed Dec. 26, 1925, Bottle capping machine, of which this application is a continuation in part, the seal may be a metallic band such as for example the telescoped ring with merged ends as shown in my prior Patent 1,117,147, Figs. 9, 10, 15 and 21 of which are shown herein as Figs. 64a, 64b, 64c and 64d to illustrate said rings or bands 5 which may be used in the embodiment of Figs. 59 to 66 hereof as well as that of Figs. 67 to 79, hereafter described.

In the embodiment shown in Figs. 59 to 66 inclusive the bottle 1 has the cap 5 loosely applied with the disc-like cap 5' both as shown in Fig. 62. The motive power from motor (not shown in Fig. 59) drives the vertical shaft 16 as before described through gear box 13, shaft 12, worm 14 and worm wheel 15. The support 30 (Fig. 59) as in the other embodiments, is in normally fixed relation with the shaft 16. The large split nut 32' screwed upon the upper end of the shaft 16 and has tongue and groove connection with the support 30 so that this support may be elevated and lowered along the shaft. A hand wheel 305 is provided upon the nut 32' to facilitate the turning thereof. The support 30 is provided for the balance of the mechanism, complemental to the table sections 9 and the mechanism that operates these table sections, employed for applying the skirted caps 5 to the bottles. These caps 5 are fastened upon the bottles by means of the non-resilient metallic rings 306 which are supplied from the magazine 307, there being one magazine individual to each table section 9 and in vertical alignment therewith. Each magazine is in the form of a tube surrounded by the rings and from which the rings drop in a manner to have them applied singly to the bottles.

Each magazine 307 is in fixed relation with a jaw carrier 308 (Fig. 62) individually thereto. Jaws 309 are pivoted at their upper ends at 310 upon the jaw carrier. The lower ends of the jaws are formed with ring receiving spaces 311 in which the lowermost ring that has left the magazine is to be held in readiness for application to the skirt of the bottle cap that is about to be applied to the alined bottle. When each table section 9 has been raised to its upper limit, the corresponding bottle, with a cap thereon, has been received within the bore of the jaw carrier 308, the bottle having caused, in the completion of its upper movement, the complete upper movement of magazine 307 and the jaw carrier 308 moving with this magazine. When the bottle or the cap thereon engages the bottom of the magazine, it and the cap thereon are in proper position with respect to the jaws 309 to have the ring in the jaw recesses 311 applied to the cap. As the magazine and the jaw carrier are moved upwardly together following the initial engaging of the bottle cap with the magazine, the cam rollers 312 ride upwardly upon the normally stationary cam 313 whereby the roller ends of the jaws are moved inwardly to crimp the ring about the cap and assemble it with the cap as illustrated in Fig. 64. When this operation has been performed, the bottle is lowered to permit the magazine and the jaw carrier to be lowered of their own weight, the angular extension 314 of the jaws 309 engaging the abutments 315 to swing the lower ends of the jaws outwardly to remove the ring engaging ends of the jaws out of the path of downward movement of the rim of the bottle.

The normally stationary cam 313 is provided with guiding rods 316 that themselves are guided in their movement by being in snug sliding fit within openings provided in the bearing support 30. The rods 317 are fixed upon the jaw carrier 308 and pass through sleeves 318 which are carried upon the support 30. Springs 319 intervene between the cam 313 and the block 320 that constitutes the means through which the sleeves 318 are held by the support 30. These springs 319 serve normally to fix the cam 313 with respect to the support 30. The downward movement of the cam is limited by the heads of bolts 321 which are screwed into the lower ends of the sleeves 318. If any unusual strain should be imposed upon the cam, the springs 319 would yield.

In preparing for the next ring applying operation, the lower ends of the jaws 309 are brought into engaging and holding position for the lowermost ring below the magazine, such lowermost ring resting upon shoulder 322 of the jaw carrier which positions this ring in the zone of the jaw formations 311. To this end I employ an annular cam track 323 which is co-axial with the magazine and upon which cam rollers 324 turn, these cam rollers being carried upon the jaw carrier 308. Each cam track 323 is oscillated to bring the jaws 309 into light holding engagement with the lowermost ring, as described, and to move the jaws outwardly from this position, after the ring crimping operation to permit a new ring to drop into place by the ensuing capping operation. To this end each cam track 323 is provided with a segmental gear 325 which is oscillated by a segmental pinion 326.

As illustrated, (Fig. 66) one segmental gear 326 may be in cooperating relation with two segmental gears 325. Each segmental gear 326 is fixed upon a square shaft 327 which slides within a bearing 328, this shaft and this bearing, however, turning together. Each bearing 328 is carried upon the upper end of a shaft 329. Each shaft 329 is mounted to turn in a bearing 330 in the bearing support 28. The lower end of the bearing support 329 carries a crank 331. A cam roller 332 is mounted upon the outer end of each crank. These cam rollers travel in a cam groove 333 formed in the stationary cam element 334. The shafts 329 are oscillated by the cam element 334 as the shafts turn bodily about the shaft 16. The shafts 327, being journaled upon the support 30 and being driven upon the shafts 329, also turn with the shaft 16 so that the properly timed movement of the cams 323 occur as the apparatus is operating. Any suitable means may be employed for journaling the shaft 16. I have illustrated a sleeve bearing 335 and a step bearing 336 at the lower end of the shaft and a sleeve bearing 337 at the upper end of the shaft (Fig. 59), this sleeve bearing being carried by a stationary spider 338 which is carried upon the rods 339, supported in the bed of the machine.

After the bottles have been capped, they are discharged from the table 10 by the star wheel 197 which is fixed with respect to the shaft 16. The bottles are directed from the table 10 by means of a chute onto an extension of the deck 2.

Filling, feeding and disc applying

Referring more particularly to the duplex machine illustrated in Figs. 67-79, the milk bottles 1 are formed each with an outsetting bead 6 at its mouth and there is an annular shoulder within the bead upon which a closure disc 5' may be seated. Each bottle is also desirably further closed by means of a closure cap 5 whose skirt surrounds the bottle and extends below the bead 5 6. A metallic band 306 is passed around the skirt of each cap and is contracted by being crimped as indicated whereby the cap skirt is gathered and held in close assembly with the bottle. Generally, portions of the cap skirt are gathered in with the crimps. The cap serves very effectively to close the bottle but, further to guard against the access of foreign matter to the interior of the bottle, the disc 5' is employed.

The bottles which are to be filled are initially placed upon a deck by hand, these bottles being located between the fingers that project laterally from an endless conveying sprocket. Each bottle engaging finger pushes the bottle into the spaces between the large teeth 340 upon a constantly and clockwise rotating wheel 342. Each bottle is snugly bottomed by its actuating finger against the bottom of the intertooth space that receives it. A rotating table 341 is co-axial with and located beneath the wheel 342 to receive the bottles. The table and wheel are in fixed relation to enable the table to be provided with plungers 343 in register with the bottles whereby the bottles may be lifted to engage valve heads 344 which depend from suitable valves that control the flow of liquid, such as milk, from the container 345 into the bottles.

As illustrated, (Fig. 68) four of the bottles are filled simultaneously and the filled bottles are removed singly from the rotating table by means of the bottle dislodging fork 346 which straddles the teeth of the wheel 342. This fork acts in cooperation with the curved side of the tooth engaging the bottle that is being moved to shift this bottle from the rotating table 341 to the stationary deck 347. A plurality of pushing pawls 348, are mounted upon the common bar 349 which is reciprocated in a direction parallel with the bottle engaging face of the fork 346. The mechanism for reciprocating the bar 349 includes a connecting rod 350 which is joined with the bar at one end and at its other end is connected with one end of a link 351 whose other end is pivoted at 352 upon the frame 353 which carries the mechanism so far specifically described. The link 351 is in sliding relation with a sleeve 354 that is mounted to oscillate upon a suitably driven disc 355. The pawls 348 are pressed by a light spring pressure in a clockwise direction and, in the preferred embodiment of the invention, each pawl has a hollow hub portion 356 carried upon a stationary pin 357 through the intermediation of a coiled spring 358, one end of this spring being secured to the hub 356 and the other end to the pin 357. This spring, when free to function fully, presses the pawl 348 against the stationary stop 359 in a clockwise direction. As the bottles are forced upon the deck 347 they depress the pawls 348 in a counterclockwise direction in opposition to the force of their springs 358, this action continuing until the bottles clear the pawls upon the springs 358 and restore the pawls that are then in pushing relation to the bottles engaging the same when the pawl bar 349 is moved in a bottle pushing direction, that is to the left as illustrated in Fig. 67.

There are three pawls 348 for pushing the bottles on the deck 347 to the left. The two right handed pawls serve to position two bottles beneath the disc applying machine 360. This disc applying machine includes two tubular magazines 361 for containing the discs 5'. The bottles, after being supplied with the discs 5', are moved to the left on the deck 347 into the range of another set of pawls 348' constructed and operating similarly to the pawl 348. There are a number of pawls 348' each adapted to engage a filled bottle that has a disc cap applied thereto and move the same to the hood applying station 510. It will be noted that the mechanism which moves the bottles to the disc applying mechanism is the same feeder which transfers the bottles to the carriers for moving them to the hood cap supplying mechanism 510, thus eliminating either manually handling the bottles, or a special carrier mechanism therefor.

*Automatic hood cap applying*

This hood cap applying mechanism 510 is desirably inclusive of two upright cap holding magazines 514 which are located abreast and in the line of travel of the bottles, the mechanism to be described serving to place caps upon two bottles at a time. In the preferred embodiment of the invention, the bottles that are having caps placed thereon are supported by the deck 347 in positions vertically beneath the magazines and in register with the caps contained in the magazines, these caps being transferred, one by one, from the magazines to the bottles. With this arrangement of the magazines, the caps, in nested relation, are held in inverted positions thereby. Each magazine is desirably inclusive of four upright bars 515 which are equally spaced apart in a circle surrounding the caps. These bars are formed with prongs 516 which engage intermediate portions of the cap skirts, these prongs serving to position the lowermost cap in readiness to be seized for transfer to the mouth of the underlying bottle. The bars 515 are serrated upon the slides thereof that are engaged by the cap skirts, the serrations having horizontal faces and faces which slope upwardly and outwardly from the horizontal faces. The serrations thus sloping and arranged, permit the inverted skirted caps to be supported to the magazines but hold the caps against upward pressure as the lowermost caps are being seized for transfer to the bottles. The cap seizing members are desirably in the nature of rubber suction cups 517 arranged in a pair. The stems 518 of these cups have terminating sleeve portions 519 which receive a horizontal shaft 520 to which the sleeves are secured. The cup stems 518 are desirably metallic and are threaded adjacent the cups to receive nuts 521 which serve to clamp the base portions 522 of the cups into assembly with the cup stems 518. The nuts 521 desirably also serve to clamp the tapered cap centering device 523 against the shoulders 524 upon said stems. In Figs. 69c and 69g, a suction cup is shown in the act of seizing a cap, the centering device 523 serving to locate the cap undergoing seizure centrally with respect to the cup, said cup being desirably arranged to engage the bottom of the lowermost cap. When the cup has seized the cap, by means hereinafter more particularly described, it is moved downwardly from the position of Figure 69c to the position indicated in full lines by Fig. 69d and is subsequently turned as indicated by dotted lines in Figs. 69d and 69e into register with the underlying bottle and then lowered upon the bottle with the bottom of the cup upon the top of the bottle as indicated by full lines in Fig. 69e. When two bottles have thus been capped, they are transferred to the band applying machine illustrated at 375 in Fig. 75.

67, which operates in a manner well-understood hereinafter described.

The mechanism for moving the suction cup from the position occupied by the lowermost skirted cap seized by the cup to the position occupied by the bottle mouth is desirably inclusive of a stationary upright rack bar 525 having an untoothed bar 526 along side of it and formed with a recess 527 co-extensive with the toothed portion of said rack bar. A tubular slide 528 is arranged to travel vertically upon the upright rod 529 and is reciprocated along this rod by means of the rotated crank 530 (Fig. 69c) operating upon the cross head through a link 531. This crank 530 is mounted on shaft 503 suitably journalled in the gear box 395 containing the electric driving motor 11 and illustrated gearing and change speed mechanism. This gearing includes means for automatically operating the sealing mechanism or metallic wire applying means shown in Figs. 70 to 78 and hereafter described. Referring again to Figs. 69f and 69h, the slide 528 (Fig. 69f) has a transfer yoke portion 532 whose ends are shaped into bearings 533 in which the aforesaid horizontal shaft 520 is journalled. A sleeve 534 is disposed between the bearings 533 and is fixed upon the central portions of the shaft 520. This sleeve carries a mutilated pinion 535 (Figs. 69e and 69f) and a square block 536 along side of this pinion. The pinion 535 is adapted to mesh with the teeth upon the rack bar 525 and the square block 536 is close beside the pinion and in the plane of the bar 526. When the cross head 528 is in its intermediate position, the pinion 535 is in mesh with the rack bar. While the pinion and rack bar are in mesh and the cross head is in vertical movement, the shaft 520 is rotated to rotate the block 536, the rotation of this block being permitted by the recess 527 in the bar 526. When the pinion is moved out of mesh with the rack bar, a side of the block 536 will be in full sliding engagement with the bar 526 either above or below the recess 527 according to the direction in which the cross head is being moved. When the cross head is being moved upwardly, the block 536 so engages the bar 526 as to place the suction cups 517 above the cross head and in register with the magazines. After the cups are thus initially placed in register with the magazines, they are moved upwardly in straight lines into contact with the bottom walls of the lowermost caps in the magazines, the cups then seizing the caps by suction preferably by the aid of the instrumentalities hereinafter described. Having seized the caps, the cups are lowered, upon downward movement of the cross head, carrying with them the caps seized thereby, these caps being withdrawn from between the prongs 516 singly, the serrations 515' in the bars 515 of the magazines preventing material upward movement of the caps as they are undergoing seizure. The cups are moved vertically downward until the pinion 535 re-engages the rack bar 525 whereupon the shaft 520 is turned to bring the cups below the cross head 528 and in vertical alignment with the bottle mouths, the block 536 engaging the bar 526 below the recess 527 when the pinion 535 loses its meshing engagement with the rack bar, the block 536, in further downward movement of the cross head, maintaining sliding engagement with the bar 526 so that the caps seized by the cups are placed upon the bottle mouths that are in vertical alignment with the magazines.

I desirably provide a vent passage 537 which communicates with the interiors of the suction cups through the cup bottoms, this passage being continued through the cup stems 518 and the hollow bridge portion 538 joining these stems. This bridge portion carries a vent valve 539 (Fig. 69g) in the nature of a split rubber nipple which spreads apart at its split when the air is pressed through the vent passage 537 as the cups are pressed against the bottoms of the caps being seized. When the seizing operation ceases, the valve 539 will automatically close to maintain the established suction. This suction is maintained during the downward travel of the cups and the caps seized thereby and until the caps have been placed nearly in their lowermost positions upon the bottles. When the caps are nearing the lower limit of their travel, a stationary lug 540 (Fig. 69e) carried by the bar 526 engages the other hanging lip 541 of the valve, the lug opening the valve to permit the access of air to the passage 537 in order to relieve the vacuum in the cups to thereby permit the release of the cap from the cups. When the return upward movement of the cups is initiated, the valve lip 541 will leave the lug 540 to cut off the passage 537 from the external air at this point. The guard 542 will guide any caps that fall from the cups toward and upon the bottles on which these caps may be properly placed by hand if necessary.

*Feeding to wire sealing applying mechanism*

The bottles with the hoods are fed directly beneath the sealing mechanism to be described, the adjustment of the extent of oscillation of the rod 350' being determined according to the sizes of bottles that are to be sealed. At the same time the channel way for the bottles that are being fed toward the sealing machine has its width adjusted according to the size of the bottles traversing the channelway. This adjustment is effected by a movement of the bar 362 tranversely of the pawl bar 349'. To this end one end of the bell crank 363 is connected with one end of a link 364 whose other end is connected with a lever 365 fixed upon a shaft 366 that is in fixed connection with one end of another lever 367 whose other end is pivotally connected with the bar 362. Whenever the arm 368 is moved to adjust the extent of oscillation of the end of the rod 350' that is pivotally connected with the bar 349' the lateral position of the bar 362 is also adjusted. A pin may be employed to hold the arm 368 in selected adjustment, this pin passing through the outer end of the arm and into a selected one of the arcuate row of holes 369 formed in the deck.

The movement of the bar 362 should be at right angles to its length, to which end an arm 370 is fixed upon the shaft 366, this arm 370 being connected by a rod 371 with an arm 372 rigid upon a shaft 373. An arm 374 is rigidly connected at one end with the shaft 373 and at its other end is pivotally connected with the bar 362. By means of the linking rod 371 and the parts by which this rod is connected with the bar 362, the bar 362 is constrained to move transversely in a direction that is perpendicular to its length so that any adjustment made in the width of the channel that conveys the bottles to the sealer is uniform throughout the length of the channel. The extent of reciprocal movements of the bar 349' is such that the entire row of bottles engaged by the pawls 348' is moved the space of two bottles and two bottles are newly positioned, each time, under the hood applying mechanism 510 and simultaneously a pair of hood capped bottles are fed under the sealer device 375.

The sealer device 375 is equipped to secure two caps upon each operation, these caps being positioned upon the bottles by the hood cap applying mechanism 510 just described.

Metal band sealer

As hitherto stated, and as shown in the previous embodiment, each hood cap is secured to the bottle by means of a metal band or ring 306. These rings are contained in magazines 307 from which they are singly applied to the caps that have been placed upon bottles. Each magazine is surrounded by the rings and the rings themselves are loosely housed in a jaw carrier 308. There are a number of jaws 309' upon each jaw carrier, each of these jaws being provided upon the lower end of an arm 309 which is pivoted at its upper end to the jaw carrier as indicated at 310. There are desirably six of these arms spaced sixty degrees apart and each arm plays in a slot 311 formed in the side of the jaw carrier 308.

Each arm 309 carries a cam roller 312. A cam member 313 surrounds the rollers 312 and is downwardly and outwardly sloped where these rollers are located. By effecting relative movement between the rollers 312 and cam member 313 in a direction that will bring the rollers nearer the top of the cam member the jaws 309' are caused to engage the lowermost one of the rings 306 and by suitable downward movement of the arms 309 effected by downward movement of the jaw carrier 308 this ring is forced downwardly over the bottle cap 5, the rings above this one being usually prevented from following by resting upon the top of the bottle cap as illustrated in Fig. 77. The initial movement of the cam member 313 with respect to the cam roller 312 is only slight, just sufficient to engage the jaws 309' with the lowermost ring or band 306. After the lowermost ring has been placed in the desired zone the jaws 309' are forced toward the bottle neck to crimp the ring 3—6 about the cap skirt.

The mechanism for effecting the desired relative movements of the jaws 309', the magazines for the rings, the jaw holder 308, the cam member 313, etc. will now be described.

The main carrier for the capping mechanism includes two upright rods 390 joined at their upper ends by a crosshead 391 and at their lower ends by a crosshead 392. These rods are mounted to reciprocate within bearing sleeves 393. As the eccentric operates, the rod 422 is moved in the plane of rotation thereof and as this rod is connected with the outer ends of the arms 423, said rod 424 is caused to oscillate. This rod is connected with the cam tracks through the intermediation of the arm 425, the pin 426, and the cross bar 427 rigidly secured to said cam tracks. The cam tracks, the jaw carrier 308 and the jaws 309' cooperate to position the ring that is next to be applied. When the jaw carrier 308 is stopped by the bottle engaging the magazine within it, the downward movement of the cam 313 continues to bring the jaws 309' closer about the bottle to crimp the band, as illustrated in Fig. 79. When the cam rollers 417 are in the bottoms of the cam recesses in the cam tracks as the band applying mechanism is being elevated, the jaws 309' will spread apart, permitting the next ring to fall upon the horns 428 in the jaw carrier 308, these horns positioning the ring resting thereon in place to be engaged by the jaws 309', the jaws having ring holding formations in the zone of the ring that is upon the horns 428. The arms which carry the jaws 309' have extensions 314 engageable by the abutments 315 when the jaw carrier is lowermost to spread the jaws apart to release the ring therein.

Each pair of bottles arrested below the jaw carriers 308, while the fingers 348' are being moved backward to contact with another pair of bottles which have just received a hood cap, is in register with these jaw carriers and the ring holding magazines 307 that move as a unit with said carriers. When the bottles are thus positioned with respect to the jaw carriers and the magazines, said magazines and carriers are lowered as a unit by lowering the rods 390 in the manner described together with the cross head 391 fixed on these rods, the horizontal cam tracks 323 upon the cross head and the jaw carriers 308 which are supported upon the cross head through the intermediation of the cam rollers 417 and the tracks 323. The jaw carriers and magazines are moved up slightly with respect to the cam 313 upon corresponding horizontal adjustment of the cam tracks which brings the high parts of the tracks beneath the rollers to slightly lift them together with the carriers and magazines. This adjustment of the cam tracks occurs during the initial part of the lowering of the cross head 391 and is retained during the balance of the downward movement of the crosshead, the jaws 309' being thereupon given the initial part of their inward movement by the cam 313 merely to lightly engage the jaws with the bottommost rings that rest upon the horns 428 without then crimping these rings, whereby the caps upon the bottles are prevented from placing these lowermost rings out of the zone of said jaws 309' in which they are to be held while the rings are afterward being crimped or contracted by the jaws upon the bottle caps. The jaw carriers, magazines, the cam member 313, crosshead 391 and the adjusted cam tracks thereafter continue downwardly until the tops of the two bottles engage the bottoms of the magazines 307, whereupon the jaw carriers 308 and the magazines 307 are arrested by the latter from further downward movement, the cam member 313, however, continuing to move downwardly, as the rods 390 and crosshead 391 have not yet completed their downward movement. This crosshead operates during the continuation of its downward movement through the springs 412 to move the cam member 313 downward to move the ring holding ends of the jaws 309' in the final and ring crimping portions of their inward movements. After the rings have been crimped around the bottle cars, the jaw carriers, magazines and the cam member 313 are raised and restored to their initial positions, the cam tracks 323 also being shifted to their initial positions in which their depressed portions engage the rollers 417 upon the jaw carriers, whereby the ring applying mechanism is placed in readiness to operate upon a succeeding pair of bottles.

Referring to Figs. 73 and 77 it will be observed that the bottle caps 5 are illustrated as holding all of the rings around the magazines except the lowermost rings that are caught by the jaws 309'. This is due to the initial conical tapering of the caps illustrated in Fig. 73. However, the holding of all except the bottom rings by the caps is not an essential result as in some cases some of the rings above the bottom rings may rest upon the tops of the jaws 309 without interfering with the operation of the machine.

As illustrated, the bottles serve to position the jaw carriers by engaging the magazines that are coupled with the jaw carriers. If a bottle is absent the corresponding cam 313 and the corresponding jaw carrier 308 will both move without crimping the ring held by the jaws.

I am claiming other subject matter in my copending case Serial No. 683,649.

What I claim is:

1. In combination, mechanism for filling bottles; mechanism for applying discs in the mouths of said bottles; conveying means for moving said bottles to hood cap applying mechanism, said mechanism including a magazine for preformed hood caps and automatic means operable in accordance with the movement of said bottles whereby each bottle receives a single preformed hood cap from said magazine; mechanism for sealing hood caps on said bottles; and mechanism for discharging said sealed bottles.

2. In combination, mechanism for applying discs to mouths of bottles, conveying means for moving said bottles to a hood cap applying mechanism, said mechanism including a magazine for preformed hood caps and automatic means operable in accordance with the movement of said bottles whereby each bottle receives a single preformed hood cap from said magazine; mechanism for sealing said hood caps on said bottles; and means for discharging said sealed bottles from said mechanism.

3. In combination, mechanism for filling bottles; mechanism for applying discs in the mouths of bottles; means for moving said bottles to hood cap applying mechanism, said mechanism including a magazine for preformed hood caps and automatic means operable in accordance with the movement of said bottles whereby each bottle receives a single preformed hood cap from said magazine; mechanism for sealing said hood caps on said bottles, said sealing mechanism being inoperative in the absence of a bottle to be sealed; and means whereby said sealed bottles are discharged from said mechanism.

4. In combination, means for substantially continuously moving bottles through a series of mechanisms in the same horizontal plane, said mechanisms including bottle filling apparatus, disc cap applying mechanism, hood cap applying mechanism and metal band applying mechanism adapted to seal hood caps on said bottles; said bottle moving means being effective to discharge a sealed bottle therefrom.

5. In combination, means for substantially continuously moving bottles through a plurality of mechanisms, said mechanisms including bottle filling and disc cap applying means, a skirted hood cap applying mechanism effective to temporarily confine the skirts of said hood caps and to place a skirted hood cap on each of said bottles, means to transfer said bottle with a skirted hood cap loosely over the mouth and neck thereof, and a band sealing mechanism including means to preliminarily confine said skirt and means to apply a metal band to said skirt whereby said skirt is retained in substantially maximum confinement on said bottle neck.

6. In combination, a mechanism for filling bottles; mechanism for applying discs in the mouths of said bottles; conveying mechanism for moving said disc capped bottles to hood applying mechanism, said mechanism including apparatus adapted to retain a source of hoods for said bottles and automatic means operable in accordance with the movement of said bottles whereby each bottle receives a single hood over the mouth of the bottle; and mechanism for sealing said hoods on said bottles.

7. In combination, mechanism for filling bottles; mechanism for applying discs in the mouths of said bottles; conveying means for moving said bottles to hood cap applying mechanism, said mechanism including a magazine for preformed hood caps and automatic means operable in accordance with the movement of said bottles whereby each bottle receives a preformed hood cap from said magazine, said automatic means including mechanism whereby a hood cap is removed from said magazine; and mechanism whereby said separated hood cap is deposited over the mouth of said bottle; mechanism for sealing hood caps in place on said bottles; and mechanism for discharging said sealed bottles.

8. In combination, mechanism for filling bottles; conveying means for moving said filled bottles to a hood applying mechanism, said mechanism including a magazine for preformed hood caps and pneumatic means automatically controlled and operable in accordance with the movement of said bottles whereby each bottle receives a single hood cap from said magazine; mechanism for sealing said hood caps on said bottles; and mechanism for discharging said sealed bottles.

9. In combination, mechanism for filling bottles; mechanism for applying discs in the mouths of bottles; means for moving said bottles to hood cap applying mechanism, said mechanism including apparatus adapted to retain a source of hoods for said bottles and automatic means operable in accordance with the movement of said bottles whereby each bottle receives a single hood over the mouth of said bottle; mechanism for sealing said hoods in place on said bottles, said sealing mechanism arranged whereby the same is inoperative in the absence of a bottle to be sealed; and means whereby said sealed bottles are discharged from said mechanism.

OLOF N. TEVANDER.